(12) United States Patent
Katayama et al.

(10) Patent No.: US 6,788,828 B2
(45) Date of Patent: Sep. 7, 2004

(54) ADAPTIVE IMAGE COMBINATION ACCORDING TO IMAGE SENSING CONDITION

(75) Inventors: Tatsushi Katayama, Tokyo (JP); Hideo Takiguchi, Kawasaki (JP); Kotaro Yano, Yokohama (JP); Kenji Hatori, Hatogaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 10/101,222

(22) Filed: Mar. 20, 2002

(65) Prior Publication Data

US 2002/0126890 A1 Sep. 12, 2002

Related U.S. Application Data

(62) Division of application No. 08/864,470, filed on May 28, 1997, now Pat. No. 6,389,179.

(30) Foreign Application Priority Data

May 28, 1996 (JP) .............................. 8-133646
May 28, 1996 (JP) .............................. 8-133647

(51) Int. Cl.$^7$ .................................................. G06K 9/36
(52) U.S. Cl. ..................... 382/284; 382/276; 348/36; 358/450
(58) Field of Search ................................ 382/284, 154, 382/276, 294, 293; 386/117; 348/36–39, 42, 43–52, 64, 218.1, 239, 229.1, 113, 118, 120, 159, 148, 149, 142; 358/540, 450, 1.11; 396/55; 355/54; 345/419, 629–630

(56) References Cited

U.S. PATENT DOCUMENTS 5,107,293 A   4/1992  Sekine et al. ................ 396/55
5,201,031 A   4/1993  Kasaki ....................... 358/1.11
5,202,928 A * 4/1993  Tomita et al. ............... 382/154
5,262,867 A  11/1993  Kojima ........................ 348/39
5,469,274 A  11/1995  Iwasaki et al. .............. 358/450
5,502,486 A   3/1996  Ueda et al. .................. 348/239
5,548,409 A   8/1996  Ohta et al. .................. 386/117
5,646,679 A   7/1997  Yano et al. ................... 348/47
5,657,402 A   8/1997  Bender et al. ............... 382/284
5,682,198 A  10/1997  Katayama et al. ............ 348/47
5,694,530 A  12/1997  Goto .......................... 345/419
5,694,531 A  12/1997  Golin et al. ................. 345/419
5,745,220 A   4/1998  Okazaki et al. .............. 355/54
5,801,773 A   9/1998  Ikeda ....................... 348/229.1
5,963,664 A  10/1999  Kumar et al. ................ 382/154
6,335,754 B1 * 1/2002  Endo et al. ................... 348/37

FOREIGN PATENT DOCUMENTS

EP  0 462 905 B1 * 1/1997  ............ H04N/7/18
JP     4-52635     2/1992  ............ G03B/37/04
JP     5-14751     1/1993  ............ H04N/3/00
JP     5-122606    5/1993  ......... H04N/55/265

OTHER PUBLICATIONS

Pinz et al. Information fusion in image understanding, Aug. 1992, IEEE 0–8186–29–X/92, pp. 366–370.*

* cited by examiner

Primary Examiner—Leo Boudreau
Assistant Examiner—Ishrat Sherali
(74) Attorney, Agent, or Firm—Morgan & Finnegan, LLP

(57) ABSTRACT

There is disclosed an image combining apparatus for generating a single image by combining a plurality of sensed images. When the panoramic image sensing mode is set, the image sensing angle is detected, and is stored together with a plurality of sensed image obtained in the panoramic image sensing mode. Upon combining the plurality of sensed images, a combining method is adaptively selected on the basis of the angle information.

26 Claims, 42 Drawing Sheets

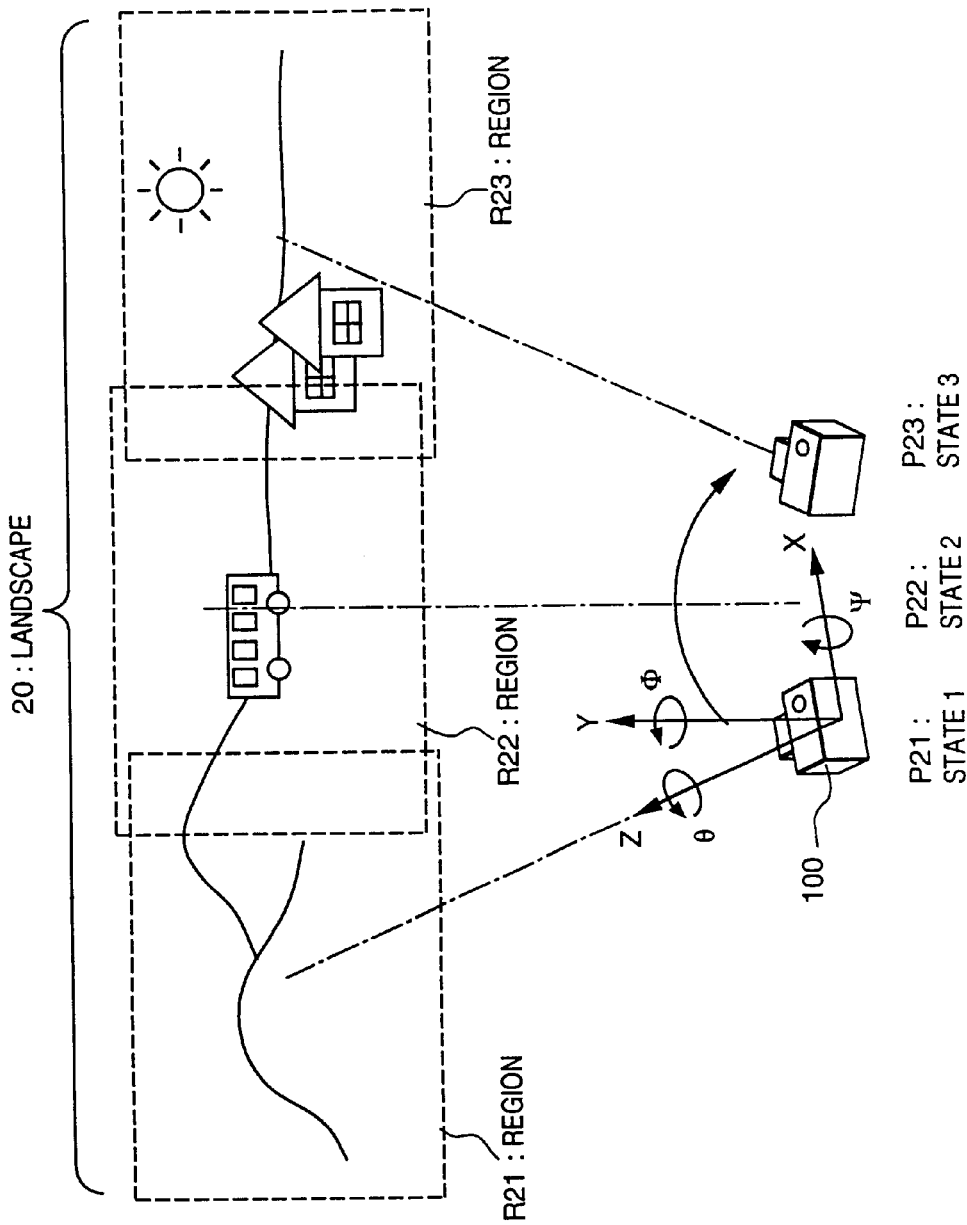

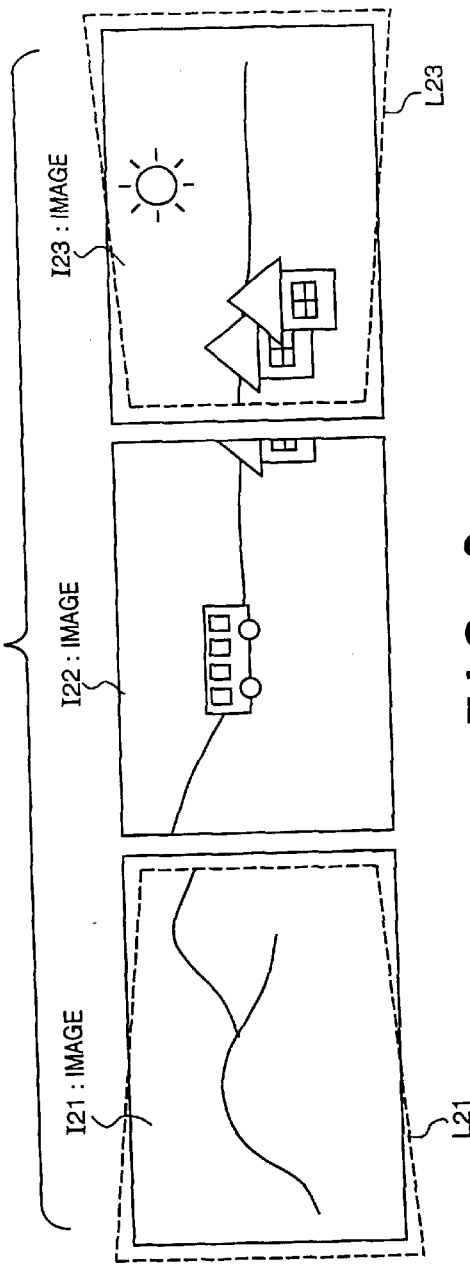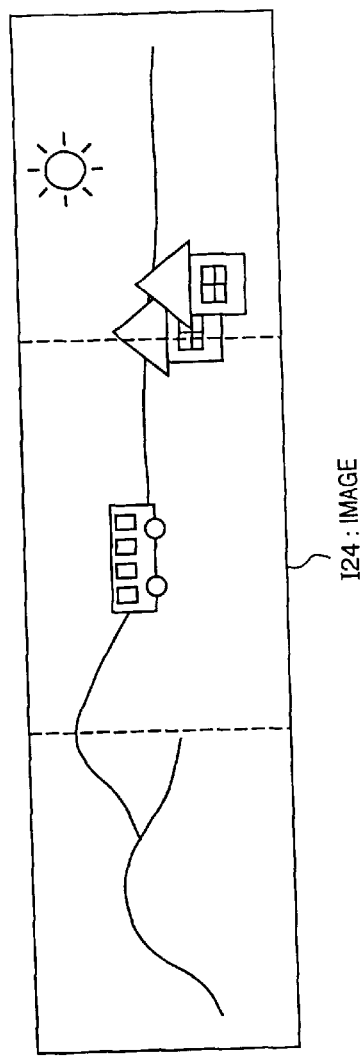

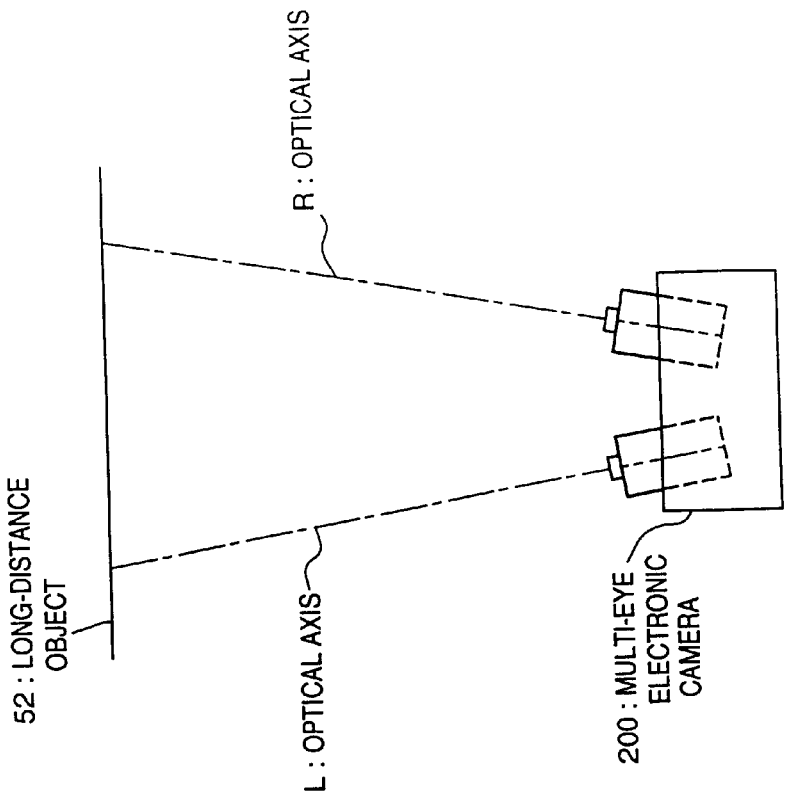
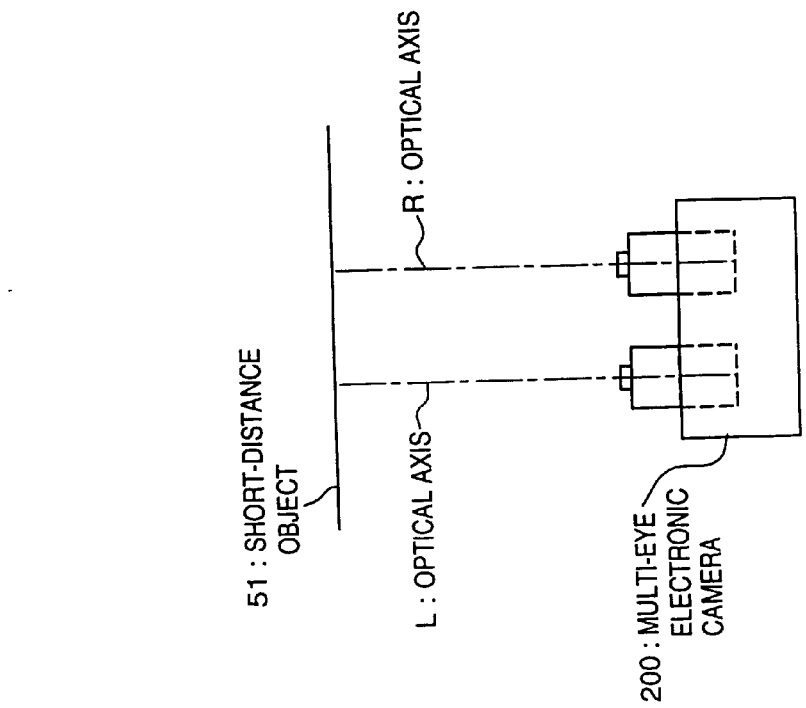

I61  I62

S141 — DISPLAY RIGHT AND LEFT IMAGES
S142 — READ CORRESPONDING POINT COORDINATE FROM CURSOR
S143 — EXTRACT TEMPLATE FROM LEFT IMAGE
S144 — SET SEARCH AREA FROM RIGHT IMAGE
S145 — DETECT CORRESPONDING POINT POSITION
S146 — CHECK RELIABILITY

I71

I72

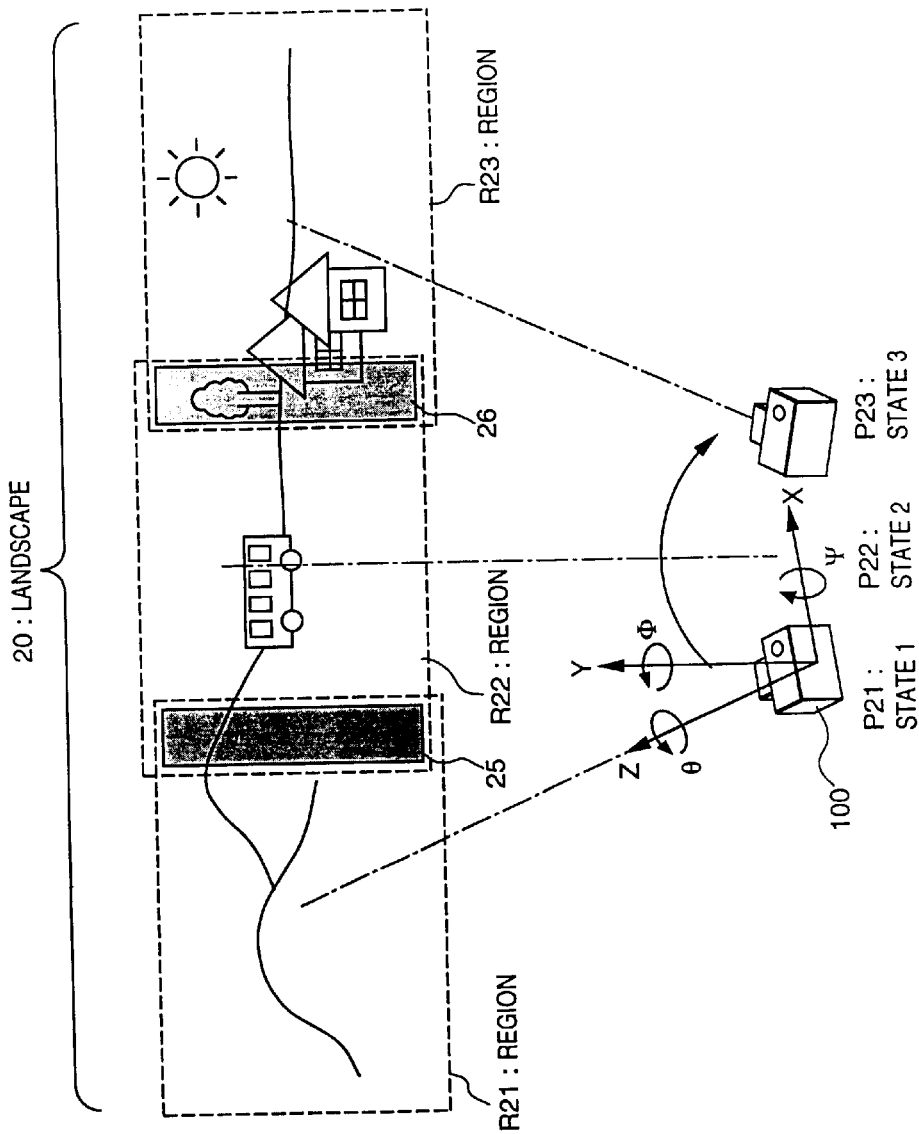

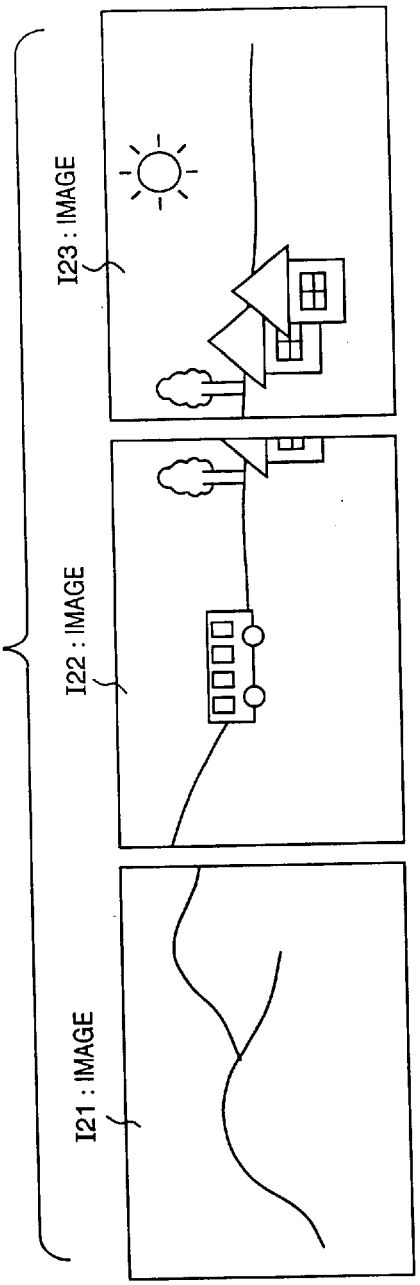
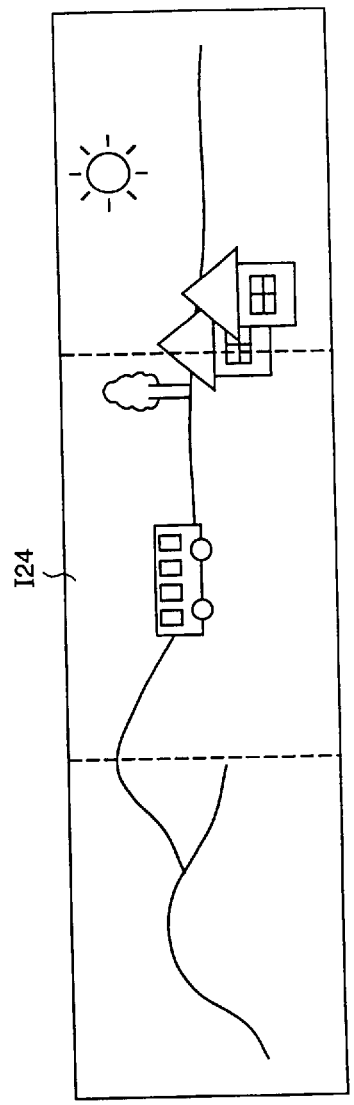

ADAPTIVE IMAGE COMBINATION ACCORDING TO IMAGE SENSING CONDITION

This is divisional of application Ser. No. 08/864,470, filed May 28, 1997, now U.S. Pat. No. 6,389,179.

BACKGROUND OF THE INVENTION

The present invention relates to an image combining apparatus suitably used in an electronic camera system having a panoramic image sensing mode and, more particularly, to an image combining apparatus for generating a panoramic image by connecting a plurality of images which partially overlap each other.

As conventional image combining apparatuses for generating a panoramic image (to be also referred to as a combined image hereinafter) by combining a plurality of images obtained by sensing an object image so that the images partially overlap each other, image combining apparatuses disclosed in, e.g., Japanese Patent Laid-Open Nos. 4-52635 and 5-122606 are known.

An image combining apparatus disclosed in Japanese Patent Laid-Open No. 4-52635 detects information of, e.g., the three--dimensional position, direction, or the like of a camera apparatus, i.e., information for defining the relationship between adjacent frames or scenes, upon sensing images by an electronic camera, stores such information together with image signals, and reproduces the image signals on the basis of the stored information. With this operation, the image signals are reproduced while holding the positional relationship between adjacent frames or scenes of the sensed images, and various applications, e.g., reconstruction of an image in a three-dimensional space, and the like, can be achieved.

However, in the conventional image combination represented by Japanese Patent Laid-Open No. 4-52635, upon generating a panoramic image by combining a plurality of images, when the individual images are converted into equal-magnification images on the basis of zoom magnification information, and the converted image signals are recorded on a frame memory, information of the three-dimensional positions, directions, and the like is simultaneously recorded in correspondence with each image, and the recorded image signals are merely combined to generate a panoramic image.

More specifically, in the electronic camera system of Japanese Patent Laid-Open No. 4-52635, since a plurality of panoramically sensed images are merely pasted on the frame memory in accordance with the information of their three-dimensional positions, directions, and the like, the panoramic image obtained by combining these images is nothing but the one obtained by simply laying out the individual images. Accordingly, the joint portions become discontinuous, and a panoramic image with only poor appearance is obtained.

On the other hand, an image combining apparatus disclosed in Japanese Patent Laid-Open No. 5-122606 senses a plurality of images to be connected to partially overlap each other, and obtains the luminance difference or chromaticity difference between areas (to be referred to overlapping areas hereinafter) at the end portions of the images to be connected. Upon combination, these images are connected to make the overlapping areas overlap each other, so that the luminance difference or chromaticity difference between the overlapping areas of the images to be connected assumes 0 or a minimum value.

In this manner, the image combining apparatus is convenient since an image sensing device or the object to be sensed need not be precisely moved and aligned for the purpose of connecting a plurality of images. In addition, since the connecting position is determined using the luminance difference or chromaticity difference between adjacent images, the images can be accurately combined without impairing connectability.

In the above-mentioned image combining apparatus, when a panoramic image of a wide field angle is to be generated on the basis of a plurality of images sensed so that their image fields partially overlap each other, the following processing is executed. That is, two images are connected on a plane by performing geometric transformation such as the affine transformation for the two images, so that identical points in the overlapping areas of the two images match each other.

More specifically, when the image of an object is sensed by panning the camera in the horizontal direction, two images are obtained by sensing the image of the object so that an object-side principal point $0$ of the camera lens does not substantially move during panning, as shown in FIG. 51.

In FIG. 51, $I_1$ and $I_2$ represent image sensing planes before and after panning, $h_1$ represents the horizontal field of view of the image sensed before panning, and $h_2$ represents the horizontal field of view of the image sensed after panning. If $\theta$ represents the horizontal field angle of the camera lens, images each having a horizontal field angle $\theta$ are obtained from the image sensing planes $I_1$ and $I_2$. Therefore, if $\alpha$ represents the overlapping angle between the two images, the horizontal field of view of the combined image obtained by these two images is $(2\theta-\alpha)$.

Assume that a plane having a rectangular frame is placed in front of the camera. This frame is placed in front of the camera at a substantially equal angular position with respect to the two image sensing planes $I_1$ and $I_2$. In this case, images obtained by the two image sensing planes $I_1$ and $I_2$ are expected to be images a and b shown in FIG. 52. As for the image sensing plane $I_1$, since the right side of the frame is closer to the camera, the right side of the image a is sensed to be vertically larger than its left side. Conversely, as for the image sensing plane $I_2$, since the left side of the frame is closer to the camera, the left side of the image b is sensed to be vertically larger than its right side. More specifically, the two straight lines, which are originally parallel to each other, of the frame are sensed as two straight lines which are not parallel to each other in the images a and b.

For this reason, when the two images a and b are combined by performing the affine transformation of translation processing alone (i.e., the affine transformation which does not include enlargement and rotation in the image plane) for these two images a and b, a combined image ab including two straight lines which cross each other is obtained, as shown in FIG. 53. In this combined image ab, frame lines duplicate themselves in an overlapping portion $P_{ab}$, resulting in an unnatural image. This is because images cannot be accurately combined by translation in the image plane since the two image sensing planes $I_1$ and $I_2$ are not spatially present in a single plane. Even when image enlargement or rotation within the image plane is performed, the unnaturalness cannot be eliminated.

In order to alleviate the unnaturalness in the overlapping portion $P_{ab}$ produced by the image combining apparatus of Japanese Patent Laid-Open No. 5-122606, Japanese Patent Laid-Open No. 5-14751 discloses a panoramic image combining apparatus, which combines images by performing geometric transformation for projecting a plurality of images sensed to partially overlap each other onto a single columnar surface.

More specifically, the panoramic image combining apparatus of Japanese Patent Laid-Open No. 5-14751 obtains a combined image free from any unnaturalness without double frame lines in the overlapping portion $P_{ab}$ by temporarily projecting images a and b obtained by the two image sensing planes $I_1$ and $I_2$ onto a common columnar surface.

However, in the conventional image combining apparatuses in Japanese Patent Laid-Open Nos. 122606, 5-14751, and the like, since the individual images are combined by setting and connecting overlapping areas, so that the luminance difference or chromaticity difference in the overlapping portion of images assumes 0 or a minimum value, i.e., since two areas whose luminance difference or chromaticity difference assumes 0 or a minimum value are simply connected, a panoramic image obtained by combining the images is merely the one obtained by laying out the individual images, as in the case of Japanese Patent Laid-Open No. 4-52635. Therefore, the joint portions become discontinuous, and a panorama image with poor appearance is obtained. For example, when the image to be connected rotates from an original image or the enlargement factor of the original image is different from that of the image to be connected, the image quality of the combined image considerably deteriorates.

On the other hand, in the image combining apparatus of Japanese Patent Laid-Open No. 5-14751, which combines images by projecting the individual images onto a columnar surface to geometrically transform them, when a plurality of images obtained by sensing an object image while panning the camera in both the horizontal and vertical directions are combined, an unnatural image in which frame lines are doubled in the overlapping portion of a combined image is obtained like in the combined image $P_{ab}$ in FIG. 53, which is obtained by only translating the sensed images.

When a rectangular frame is sensed at, e.g., four framing positions using the image combining apparatus of Japanese Patent Laid-Open No. 5-14751, four images $c_1$ to $c_4$ are obtained, as shown in FIG. 54. When these images $c_1$ to $c_4$ are combined by only translating them without any projection of images onto a columnar surface, an unnaturally combined image c in which frame lines are doubled in overlapping portions $P_c$ is obtained, as shown in FIG. 55. Even when the images $c_1$ to $c_4$ are combined by temporarily projecting the images onto a columnar surface and then translating them, an unnaturally combined image c' in which frame lines are doubled in overlapping portions $P_c'$ is obtained, as show in FIG. 56.

This means that even when two images obtained by sensing an object image by panning the camera are to be combined in the horizontal direction, if the camera has been tilted slightly during image sensing, an unnatural image in which frame lines are doubled in the overlapping portion of the combined image is obtained.

SUMMARY OF THE INVENTION

The present invention has been made to solve the above-mentioned problems, and has as its object to provide an image combining apparatus which can always easily obtain a high-quality panoramic image.

It is another object of the present invention to provide an image combining apparatus, which stores a series of images and image sensing conditions of the series of images in correspondence with each other, so that one of a plurality of combining means can be adaptively selected on the basis of the image sensing conditions corresponding to the individual images upon combining the images.

According to a preferred aspect of the present invention, corresponding points in the overlapping portions of a series of images to be combined are detected, image sensing parameters used upon executing combining processing are generated on the basis of the detected corresponding points, and the combining processing is executed using the image sensing parameters.

According to a preferred aspect of the present invention, focal point position information upon image sensing is detected as an image sensing condition. Therefore, a storage means stores the focal point position information in correspondence with the individual images. A control means discriminates based on the focal point position information corresponding to a series of images to be combined if these images are obtained by short- or long-distance image sensing. If it is determined that the images are obtained by short-distance image sensing, the control means selects a first combining means for short distances on the basis of the discrimination result; otherwise, the control means selects a second combining means. The series of images obtained by short-distance image sensing are combined by appropriate combining processing by the first combining means, and the series of images obtained by long-distance image sensing are combined by appropriate combining processing by the second combining means for long distances.

According to a preferred aspect of the present invention, a transforming means transforms pixel values of the overlapping portions of the individual images on the basis of image sensing conditions corresponding to a series of images to be combined. With this processing, an image near the connecting portions of adjacent images is transformed.

According to a preferred aspect of the present invention, a detection means detects exposure information upon image sensing as an image sensing condition. Therefore, the storage means stores focal point position information corresponding to the individual images. The transforming means corrects the density levels of the overlapping portions of the individual images on the basis of the exposure information corresponding to a series of images to be combined.

According to a preferred aspect of the present invention, an image combining means combines a plurality of spherical projection images obtained by a spherical projection transforming means on the basis of the image sensing conditions corresponding to a series of images to be combined.

According to a preferred aspect of the present invention, the spherical projection transforming means projects and transforms the individual images onto a spherical surface having the focal point position upon image sensing as a center, thereby generating a plurality of spherical projection images to be combined.

According to a preferred aspect of the present invention, the image combining means combines a plurality of spherical projection images obtained by the spherical projection transforming means, and a plane projection transforming means projects and transforms the combined image onto a plane again to generate a plane projection combined image.

According to a preferred aspect of the present invention, an adding means adds projection plane type information indicating a spherical projection image to images obtained by the spherical projection transforming means, and adds projection plane type information indicating a plane projection combined image to an image obtained by the plane projection transforming means.

According to a preferred aspect of the present invention, the image combining means combines a plurality of spherical projection images obtained by spherical projection transforming means to obtain a combined image, and selectively outputs one of the combined image and the plane projection combined image via an output means in correspondence with the field of view of the combined image.

According to a preferred aspect of the present invention, an optical axis control means controls the directions of the optical axes of a plurality of image sensing means on the basis of image sensing conditions detected by the detection means. Accordingly, an image is divisionally sensed by the plurality of image sensing means so that the sensed images partially overlap each other.

According to a preferred aspect of the present invention, the angle of the apparatus is detected, and the detected angle information is held together with images sensed in the panoramic image sensing mode. Upon combining these images, a combining scheme is adaptively selected on the basis of the angle information. With this control, image combination is done by an optimal combining scheme with respect to the angle of the apparatus.

According to a preferred aspect of the present invention, the position of the apparatus is detected, and the detected position information is held together with images sensed in the panoramic image sensing mode. Upon combining these images, a combining scheme is adaptively selected on the basis of the position information. With this control, image combination is done by an optimal combining scheme with respect to the position of the apparatus.

In order to achieve the above objects, according to another image combining apparatus of the present invention, a condition detection means detects the attitude of the apparatus produced upon movement of the apparatus as moving state information. A storage means stores the moving state information of the apparatus detected by the condition detection means and image sensing conditions as additional information in correspondence with the sensed images. A prediction means predicts the overlapping area between adjacent images to be combined on the basis of the additional information stored in the storage means. A correspondence detection means detects corresponding points in the overlapping area predicted by the prediction means. An image combining means combines a series of images on the basis of the corresponding points detected by the correspondence detection means.

According to a preferred aspect of the present invention, the condition detection means detects an angular component of the movement of an image sensing means produced upon rotation of the apparatus during image sensing.

According to a preferred aspect of the present invention, the condition detection means detects the angular component using an angular velocity sensor.

According to a preferred aspect of the present invention, the condition detection means detects a translation component of the apparatus produced upon translation of the apparatus during image sensing.

According to a preferred aspect of the present invention, the condition detection means detects the translation component using an acceleration sensor.

According to a preferred aspect of the present invention, a position detection means detects the position of the apparatus produced upon movement of the apparatus during image sensing. The storage means stores position information obtained by the position detection means as the additional information.

According to a preferred aspect of the present invention, the position detection means detects the three-dimensional position of the apparatus produced upon movement of the apparatus during image sensing.

According to a preferred aspect of the present invention, an overlapping area detection means sequentially detects the degree of overlapping between sequentially input images by calculations on the basis of the moving state information of the apparatus detected by the condition (moving information) detection means and image sensing conditions detected by an image sensing condition detection means. A comparison means compares the degree of overlapping detected by the overlapping area detection means with a predetermined threshold value. A control means makes the operation control of the overall apparatus to set the apparatus in the image sensing state at the timing at which the control means determines based on the comparison result of the comparison means that the degree of overlapping is equal to the threshold value.

According to a preferred aspect of the present invention, an image sensing situation detection means detects the image sensing situation of a plurality of images to be combined, in accordance with the additional information stored in the storage means. When it is determined based on the detection result of the image sensing situation detection means that the plurality of images to be combined are obtained by rotation, a switching control means controls a spherical projection transforming means to generate a spherical projection image by projecting and transforming the plurality of images onto a spherical surface, and controls a switching means to select and output the spherical projection image obtained by the spherical projection transforming means.

According to a preferred aspect of the present invention, an output means outputs a panoramic image generated by the image combining means to an external device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a plan view for explaining the image sensing situation of long-distance panoramic image sensing;

FIG. 7 is a plan view showing three images obtained by the long-distance panoramic image sensing;

FIG. 8 is a plan view showing a combined image obtained by combining the three images;

FIGS. 18A and 18B are views for explaining the processing for controlling the optical axes of two image sensing units;

FIG. 37 is a view for explaining the case wherein panoramic image sensing of a long-distance object is done by panning;

FIG. 38 is a view for explaining a series of images obtained by the panoramic image sensing;

FIG. 39 is a view for explaining a panoramic image obtained by combining the series of images;

DETAILED DESCRIPTION OF THE INVENTION

An image combining system to which the present invention is applied will be explained hereinafter with reference to the accompanying drawings. The first embodiment of the present invention will now be described with reference to the accompanying drawings.

<Electronic Camera System> . . . First Embodiment

Figure 1:
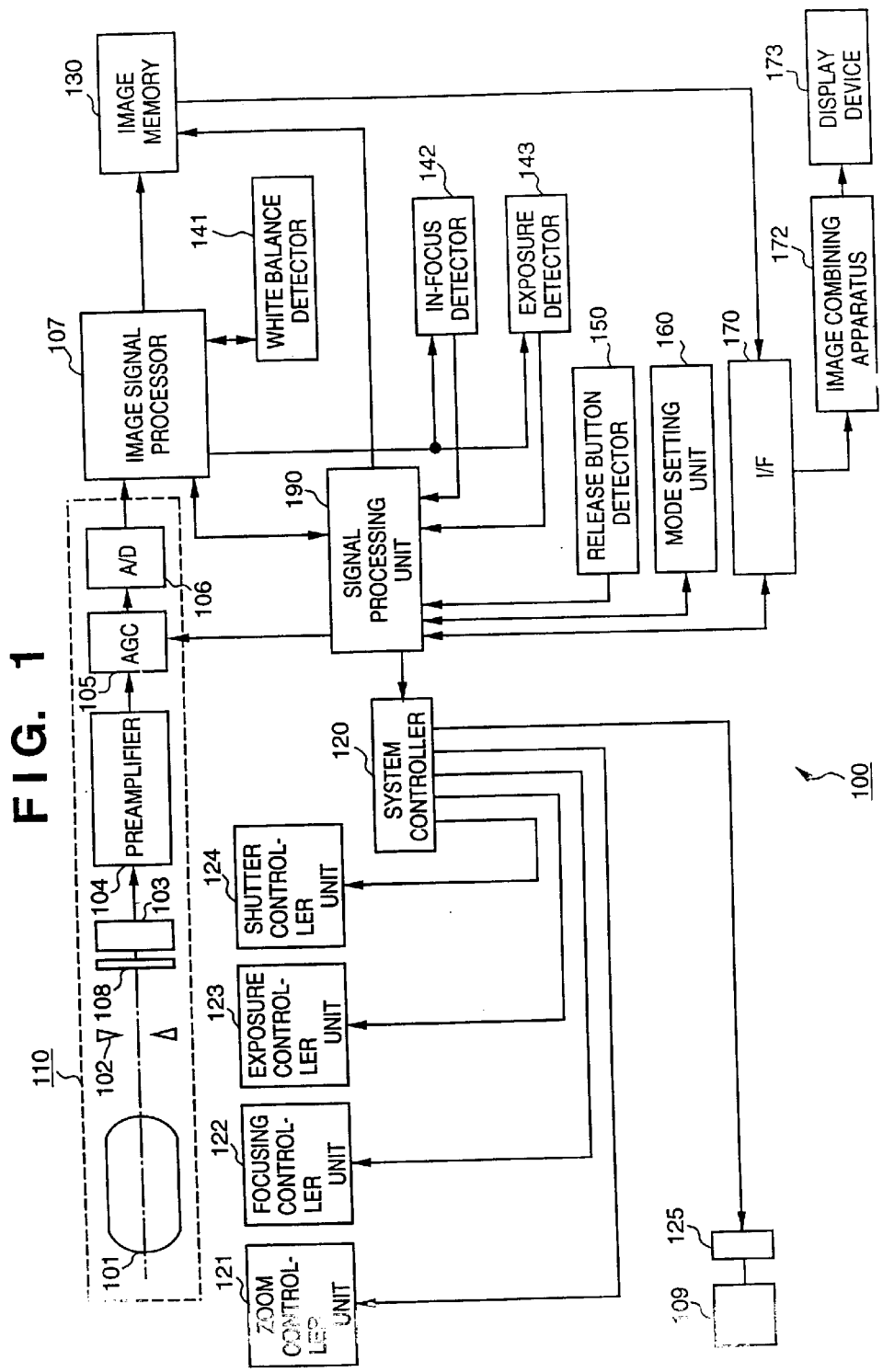
FIG. 1 is a block diagram showing the arrangement of an electronic camera system to which an image combining apparatus according to the present invention is applied in the first embodiment of the present invention.

An image combining apparatus according to the first embodiment is applied to, e.g., an electronic camera system 100 shown in FIG. 1.

The electronic camera system 100 comprises an electronic still camera which can obtain the individual pixel data as the luminance information of R, G, and B components of the sensed object image as two-dimensional digital pixel data.

In the electronic camera system 100, an image combining apparatus 172 comprises a computer, and operates in accordance with pre-set programs. Furthermore, the image combining apparatus 172 comprises an image memory 130 serving as an external storage device, which stores digital pixel data.

As shown in FIG. 1, the electronic camera system 100 comprises an image sensing unit 110, an image signal processor 107 which receives the output from the image sensing unit 110, the image memory 130 which receives the outputs from the image signal processor 107, an in-focus detector 142, an exposure detector 143, a white balance detector 141 and a signal processing unit 190 which are connected to the image signal processor 107, a system controller 120 which receives the output from the signal processing unit 190, a zoom controller unit 121, a focusing controller unit 122, an exposure controller unit 123, a shutter controller unit 124, and a flash controller unit 125, which receive the outputs from the system controller 120, a mode setting unit 160 and an input/output interface (I/F) 170 which are connected to the signal processing unit 190, the image combining apparatus 172 which receives the output from the I/F 170, and a display device 173 which receives the output from the image combining apparatus 172. The output from the signal processing unit 190 is also supplied to the image sensing unit 110 and the image memory 130, the outputs from the in-focus detector 142 and the exposure detector 143 are supplied to the signal processing unit 190, and the output from the image memory 130 is supplied to the I/F 170.

The electronic camera system 100 comprises a flash 109 controlled by the flash controller unit 125, and a release button detector 150. The output from the release button detector 150 is supplied to the signal processing unit 190.

The image sensing unit 110 comprises an image sensing lens 101, a stop 102, a shutter 108, and an image sensing element 103, which are arranged in turn from the object side, a preamplifier 104 which receives the output from the image sensing element 103, an automatic gain control (AGC) circuit 105 which receives the output from the preamplifier 104, and an analog/digital (A/D) converter 106 which receives the output from the AGC circuit 105. The AGC circuit 105 receives the output from the signal processing unit 190, and the output from the A/D converter 106 is supplied to the image signal processor 107.

The above-mentioned electronic camera system (to be simply referred to as an electronic camera hereinafter) 100 can set the normal image sensing mode and the panoramic image sensing mode by operating the mode setting unit 160.

A case will be briefly described below wherein the electronic camera 100 is set in the panoramic image sensing mode to perform panoramic image sensing of a short-distance object or long-distance object.

<Control According to Image Sensing Mode> . . . First Embodiment

Figure 2:
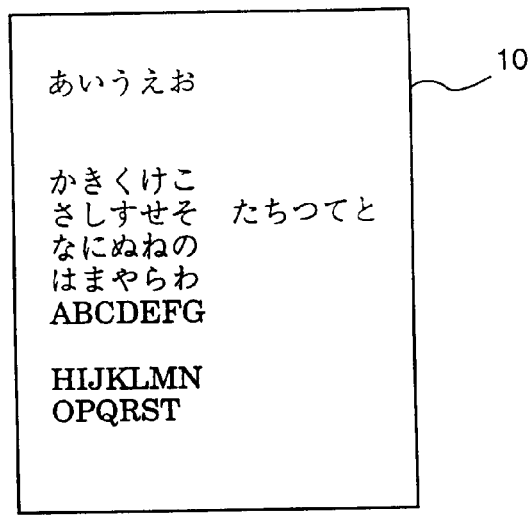
FIG. 2 is a plan view showing the object to be subjected to short-distance panoramic image sensing.
Figure 3:
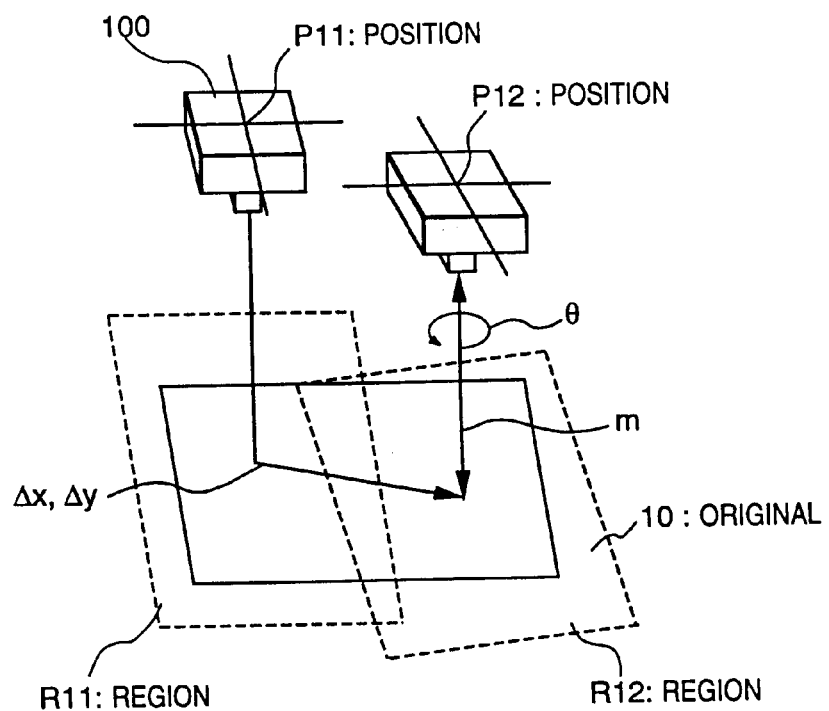
FIG. 3 is a view for explaining the image sensing situation of the short-distance panoramic image sensing.
Figure 4:
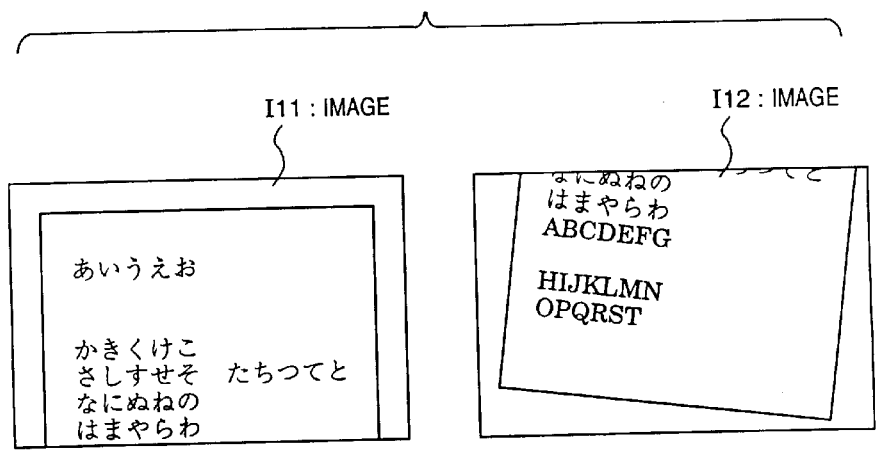
FIG. 4 is a plan view showing two images obtained by the short-distance panoramic image sensing.

For example, when the image of an original 10 (placed at the short-distance position with respect to the camera) with characters, as shown in FIG. 2, is to be sensed using the electronic camera 100, the electronic camera 100 is set at a position $P_{11}$ to sense a region $R_{11}$ of the original 10, as shown in FIG. 3. Subsequently, the electronic camera 100 is set at a position $P_{12}$ to sense a region $R_{12}$ of the original 10. At this time, the regions $R_{11}$ and $R_{12}$ are sensed to partially overlap each other. Accordingly, the image sensing at the position $P_{11}$ produces an image $I_{11}$, and the image sensing at the position $P_{12}$ an image $I_{12}$, as shown in FIG. 4.

Figure 5:
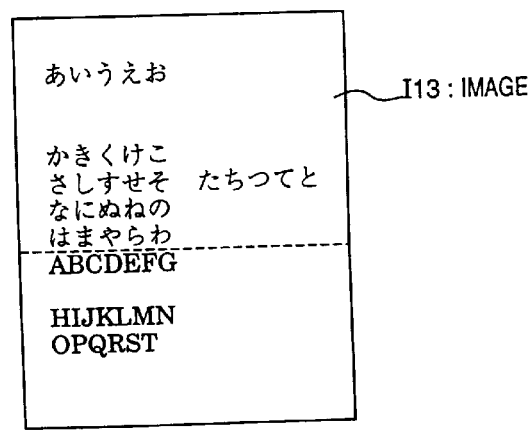
FIG. 5 is a plan view showing a combined image obtained by combining the two images.

When the electronic camera 100 panoramically senses the image of an object at the short distance position (to be referred to as short-distance panoramic image sensing hereinafter), it uses, as parameters upon moving the electronic camera 100, vertical and horizontal translation amounts $\Delta x$ and $\Delta y$, a rotation angle $\theta$ about the optical axis, and changes f in magnification upon translation along the optical axis, as shown in FIG. 3, and performs coordinate transforming processing of the images $I_{11}$ and $I_{12}$ to obtain a combined image $I_{13}$, as shown in FIG. 5.

On the other hand, when the electronic camera 100 panoramically senses the image of a landscape 20 at the long-distance position, as shown in FIG. 6, the image sensing region changes little even if the electronic camera 100 translates in the vertical and horizontal directions, unlike in the short-distance panoramic image sensing.

More specifically, as shown in FIG. 6, the electronic camera 100 is set at a position $P_{21}$, and then rotates about the Y-axis (panning) or about the X-axis (tilting) (the coordinate system is defined by the X-, Y-, and Z-axes, and $\Psi$, $\Phi$, and $\theta$ respectively represent the rotation angles about the X-, Y-, and Z-axes), thereby sensing a region $R_{21}$ of the landscape 20. At positions $P_{22}$ and $P_{23}$, regions $R_{22}$ and $R_{23}$ of the landscape 20 are sensed by panning or tilting the camera 100 as in the case at the position $P_{21}$. At this time, the regions $R_{21}$, $R_{22}$, and $R_{23}$ are sensed so that the regions $R_{21}$ and $R_{22}$ partially overlap each other, and the regions $R_{22}$ and $R_{23}$ partially overlap each other. Accordingly, the image sensing at the position $R_{21}$ yields an image $I_{21}$, the image sensing at the position $P_{22}$ an image $I_{22}$, and the image sensing at the position $P_{23}$ an image $I_{23}$, as shown in FIG. 7.

When the images of an object at the long-distance position are to be panoramically sensed (to be referred to as long-distance panoramic image sensing hereinafter), trapezoidal distortions indicated by dotted lines $L_{21}$ and $L_{23}$ are produced in the object images of the images $I_{21}$ and $I_{23}$ corresponding to the regions $R_{21}$ and $R_{23}$ at the two ends of the landscape 20 with reference to the image $I_{22}$ corresponding to the central region $R_{22}$ of the landscape 20, as shown in FIG. 7.

Since such trapezoidal distortion is generally not taken into consideration in image combination in the short-distance panoramic image sensing, if the three images $I_{21}$ to $I_{23}$ are combined in the same manner as in the image combination in the short-distance panoramic image sensing, the combined image has poor image quality.

To solve this problem, in this electronic camera 100, the rotation angles $\Psi$, $\Phi$, and $\theta$ about the X-, Y-, and Z-axes are used as parameters upon moving the electronic camera 100, and when the three images $I_{21}$ to $I_{23}$ are combined, coordinate transforming processing is made on the basis of the parameters, thus obtaining a combined image $I_{24}$ (FIG. 8) free from any trapezoidal distortion.

More specifically, the electronic camera 100 discriminates in the panoramic image sensing mode if the image sensing state corresponds to the short- or long-distance image sensing, and performs image combination corresponding to the discrimination result.

<Operation of Electronic Camera>

The electronic camera 100 will be described in detail below with reference to FIG. 1.

An object image is projected by the image sensing lens 101 onto the light-receiving surface of the image sensing element 103 via the stop 102. At this time, the zoom position and focusing position of the image sensing lens 101 are controlled by the zoom controller unit 121 and the focusing controller unit 122, and the aperture value of the stop 102 is controlled by the exposure controller unit 123. The image sensing element 103 comprises, e.g., a CCD (Charge Coupled Device) or the like, which converts the received object image into an electrical signal, and supplies the electrical signal to the preamplifier 104. The preamplifier 104 amplifies an image signal from the image sensing element 103, and supplies the amplified image signal to the AGC circuit 105. The AGC circuit 105 amplifies or attenuates the image signal from the preamplifier 104 on the basis of the control signal from the signal processing unit 190, and supplies the signal to the A/D converter 106. The A/D converter 106 converts the image signal from the AGC circuit 105 into digital image data, and supplies the digital image data to the image signal processor 107. At this time, the signal processing unit 190 detects the signal level of the image data supplied to the image signal processor 107. When the detected signal level is lower than a predetermined level, the signal processing unit 190 generates a control signal for raising the gain of the image signal in the AGC circuit 105 and supplies the control signal to the AGC circuit 105; when the detected signal level is higher than the predetermined level, the signal processing unit 190 generates a control signal for lowering the gain of the image signal in the AGC circuit 105 and supplies the control signal to the AGC circuit 105. With this control, the image signal output from the AGC circuit 105 becomes a signal having a predetermined level width, which is suitable for signal processing executed in the image signal processor 107.

The image signal processor 107 executes predetermined signal processing for the image data supplied from the A/D converter 106, and stores the processed data in the image memory 130. Also, the image signal processor 107 supplies the image data to the white balance detector 141, in-focus detector 142, and exposure detector 143. The white balance detector 141 detects the white balance state of the image data supplied from the image signal processor 107, and supplies the detection result to the image signal processor 107. The in-focus detector 142 detects the focal point of the image sensing lens 101 on the basis of the image data supplied from the image signal processor 107, and supplies the detection result to the signal processing unit 190. The exposure detector 143 detects the exposure amount in the image sensing element 103 on the basis of the image data supplied from the image signal processor 107, and supplies the detection result to the signal processing unit 190. The image signal processor 107 adjusts the color balance of the image data supplied from the A/D converter 106 on the basis of the detection result from the white balance detector 141.

Therefore, the image memory 130 stores the image data whose color balance has been adjusted. The signal processing unit 190 generates a control signal for setting image sensing conditions on the basis of the detection results form the in-focus detector 142 and the exposure detector 143, and supplies the control signal to the system controller 120. The signal processing unit 190 stores information associated with image sensing conditions (to be described later) in the image memory 130.

The system controller 120 supplies control signals to the zoom controller unit 121, the focusing controller unit 122, the exposure controller unit 123, the shutter controller unit 124, and the flash controller unit 125 on the basis of the control signal from the signal processing unit 190.

Accordingly, the zoom controller unit 121, the focusing controller unit 122, and the exposure controller unit 123 respectively control the zoom position of the image sensing lens 101, the focusing position of the image sensing lens 101, and the aperture value of the stop 102 to attain appropriate states on the basis of the control signals from the system controller 120.

As described above, the image sensing conditions in the electronic camera 100 are appropriately set.

The photographer operates the mode setting unit 160 to set the image sensing mode in the normal or panoramic image sensing mode, and starts image sensing.

Also, the photographer instructs locking of the image sensing conditions or execution of image sensing by controlling the operation amount of a release button. More specifically, the detector 150 detects the operation amount of the release button using two different values (the first and second stroke amounts). The release button detector 150 detects whether the photographer presses the release button to its first or second stroke position, and supplies one of two, first second detection signals corresponding to the first and second stroke positions to the signal processing unit 190.

The mode setting unit 160 detects the image sensing mode set by photographer's operations, and supplies the detection signal to the signal processing unit 190. The signal processing unit 190 generates a control signal corresponding to the set image sensing mode on the basis of the detection signal from the mode setting unit 160, and supplies the control signal to the system controller 120. Also, when it is determined based on the first detection signal from the release button detector 150 that the release button is pressed by the first stroke amount, the signal processing unit 190 generates a control signal for locking the image sensing conditions; when it is determined based on the second detection signal from the release button detector 150 that the release button is pressed by the second stroke amount, the signal processing unit 190 generates a control signal fox executing a shutter operation, and supplies the control signal to the system controller 120.

The system controller 120 supplies control signals to the zoom controller unit 121, the focusing controller unit 122, the exposure controller unit 123, the shutter controller unit 124, and the flash controller unit 125 on the basis of the control signals from the signal processing unit 190, and also supplies control signals to the shutter controller unit 124 and the flash controller unit 125. Therefore, the zoom position and focusing position of the image sensing lens 101, and the aperture value of the stop 102 are set in the states corresponding to photographer's operations. When the shutter controller unit 124 controls the shutter 108 on the basis of the control signal from the system controller 120, the shutter 108 is controlled to a shutter speed corresponding to photographer's operations. When the flash controller unit 125 controls the flash 109 on the basis of the control signal from the system controller 120, the ON/OFF operation of the flash 109 is controlled in accordance with photographer's operations.

<Format of Image Data> . . . First Embodiment

Figure 9:
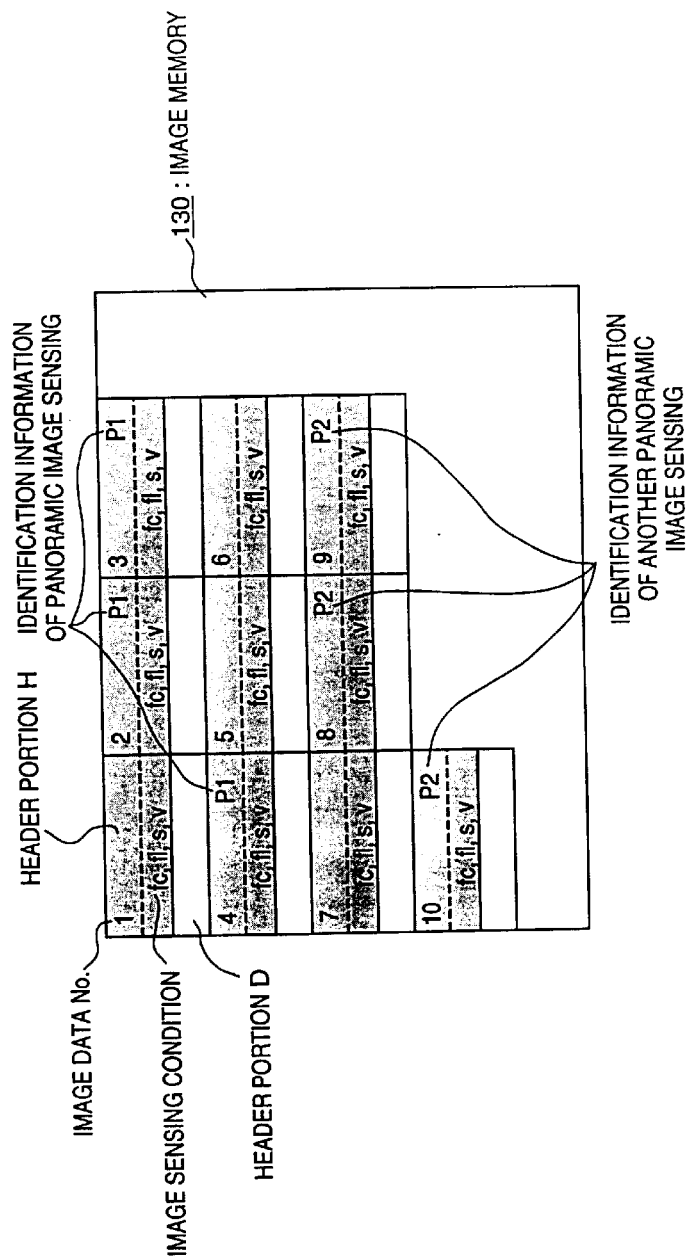
FIG. 9 is a view for explaining image data stored in an image memory of the electronic camera system.

When image sensing is started, as described above, image data output from the image signal processor 107 is stored in the image memory 130 together with the image sensing conditions pre-stored by the signal processing unit 190. More specifically, the image memory 130 stores image data made up of a header portion H and a data portion D, as shown in FIG. 9.

In the header portion H, image data number No., identification information $P_x$ corresponding to the image sensing mode, and a plurality of pieces of information $f_c$, $f_l$, s, and v associated with the image sensing conditions are written by the signal processing unit 190. The plurality of pieces of information $f_c$, $f_1$, s, and v associated with the image sensing conditions are assumed to be, e.g., focusing information $f_c$, a focal length $f_l$, a stop s, and a shutter speed v.

On the other hand, in the data portion D, for example, data of a series of images $I_{21}$, $I_{22}$, and $I_{23}$ (FIG. 7) obtained in the panoramic image sensing mode are written in correspondence with image data Nos. 2, 3, and 4.

The identification information $P_x$ written in the header portion H is written as identification information $P_1$ which indicates that the images $I_{21}$, $I_{22}$, and $I_{23}$ are a series of panoramic images. Hence, in a plurality of image data which are stored in the image memory 130, images having an identical identification information value $P_x$ are a set of panoramic images.

<Image Combining Apparatus> . . . First Embodiment

In this electronic camera 100, when a panoramic image is generated by combining a plurality of image data stored in the image memory 130, image combination can be automatically done by discriminating the identification information $P_x$ added to each image data. Such image combination is performed by the image combining apparatus 172 when the user operates an image output operation unit (not shown).

More specifically, when the user operates the image output operation unit, the image output operation unit supplies a signal corresponding to the operation to the signal processing unit 190. The signal processing unit 190 supplies a control signal indicating, e.g., output of a panoramic image to the image memory 130 and the I/F 170 on the basis of the signal from the image output operation unit. In response to this control signal, a plurality of image data stored in the image memory 130 are supplied to the image combining apparatus 172 via the I/F 170.

Figure 10:
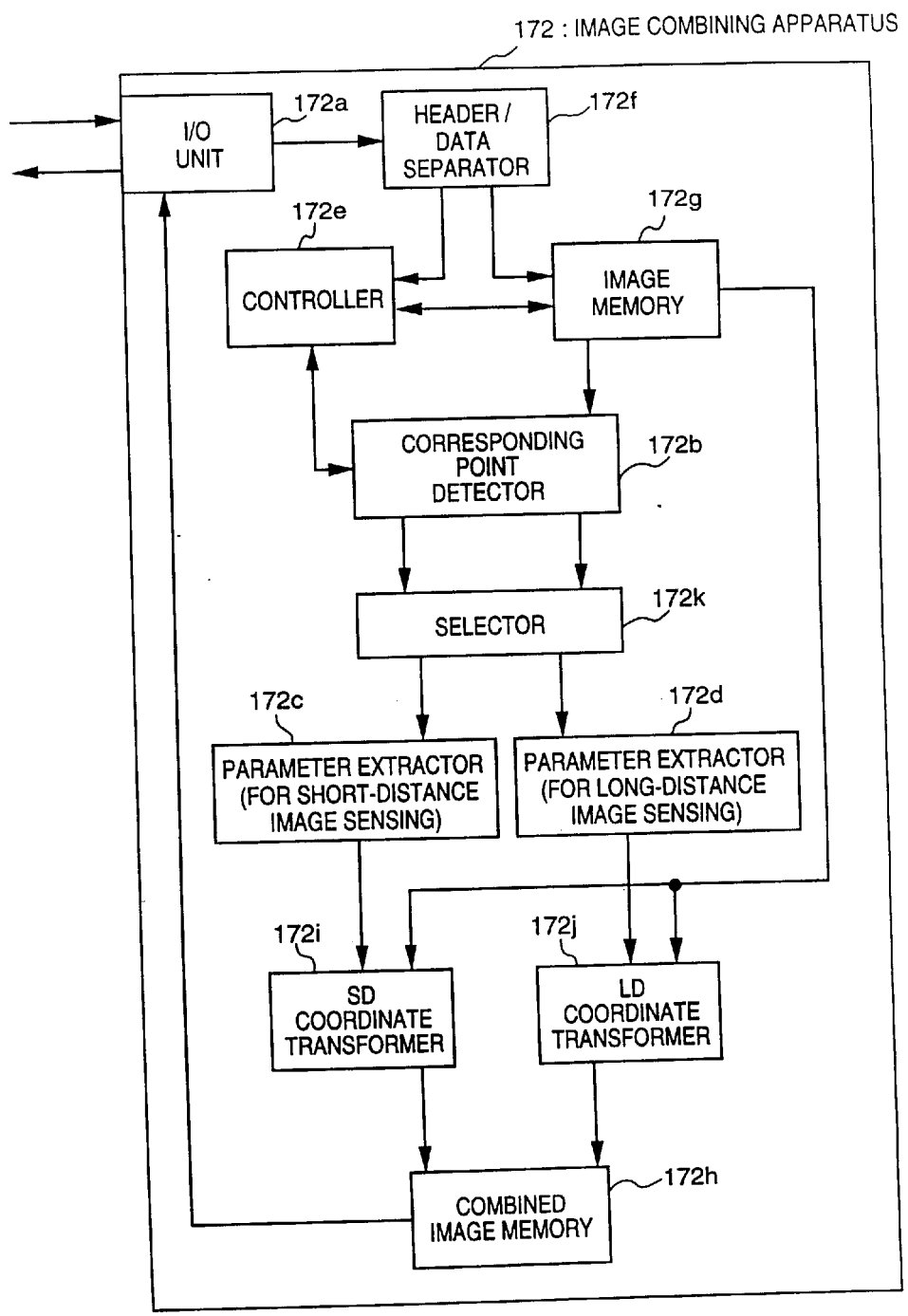
FIG. 10 is a block diagram showing the arrangement of an image combining apparatus of the electronic camera system.

As shown in, e.g., FIG. 10, the image combining apparatus 172 comprises a header/data separator 172f which receives image data from the I/F 170 shown in FIG. 1 via an input/output (I/O) unit 172a, a controller 172e and an image memory 172g which receive the output from the header/data separator 172f, a corresponding point detector 172b, an SD coordinate transformer 172i for short-distance image sensing, and an LD coordinate transformer 172j for long-distance image sensing, which receive the output from the image memory 172g, a combined image memory 172h which receives the outputs from the SD and LD coordinate transformers 172i and 172j, a selector 172k which receives the output from the corresponding point detector 172b, and a parameter extractor 172c for short-distance image sensing and a parameter extractor 172d for long-distance image sensing, which receive the output from the selector 172k. The SD coordinate transformer 172i also receives the output from the parameter extractor 172c, and the LD coordinate transformer 172j also receives the output from the parameter extractor 172d.

The controller 172e is connected to the image memory 172g and the corresponding point detector 172b.

The output from the combined image memory 172h is supplied to the display device 173 (FIG. 1) or the like via the I/O unit 172a.

In this image combining apparatus 172, the header/data separator 172f separates image data from the I/O unit 172a, i.e., each of the image data shown in FIG. 9, into a header portion and a data portion. The header/data separator 172f stores information in the data portion (to be referred to as image information hereinafter) in the image memory 172g, and supplies information in the header portion (to be referred to as header information hereinafter) to the controller 172e. The controller 172e controls the individual units of the image combining apparatus 172 on the basis of the header information from the header/data separator 172f. For example, the controller 172e reads out a series of a plurality of pieces of image information obtained by panoramic image sensing from the image memory 172g on the basis of the header information from the header/data separator 172f, and supplies them to the corresponding point detector 172b. The corresponding point detector 172b detects corresponding points in overlapping portions of the individual images in the plurality of pieces of information from the controller 172e. The corresponding points are detected using, e.g., the correlation method, template matching method, or the like. The corresponding point detector 172b supplies the detected corresponding points to the selector 172k.

As described above, in order to execute optimal image combination corresponding to short- or long-distance panoramic image sensing, the controller 172e discriminates based on the header information from the header/data separator 172f if a series of images to be processed are obtained by short- or long-distance panoramic image sensing.

More specifically, the controller 172e compares the focusing information $f_c$ included in the header information from the header/data separator 172f with a predetermined threshold value. When the focusing information $f_c$ is equal to or larger than the threshold value, the controller 172e determines long-distance panoramic image sensing; when the focusing information $f_c$ is smaller than the threshold value, the controller 172e determines short-distance panoramic image sensing. The controller 172e then supplies the discrimination result to the selector 172k. The controller 172e supplies the series of the plurality of pieces image information read out from the image memory 172g to the SD or LD coordinate transformer 172i or 172j on the basis of the discrimination result. The selector 172k supplies the corresponding points from the corresponding point detector 172b to the parameter extractor 172c or 172d in accordance with the discrimination result from the controller 172e.

Accordingly, when the controller 172e determines that the series of images to be processed are obtained by short-distance panoramic image sensing, the corresponding point detector 172b supplies the corresponding points to the parameter extractor 172c, and the series of the plurality of pieces of image information are supplied to the SD coordinate transformer 172i.

In this case, the parameter extractor 172c extracts, as parameters, the vertical and horizontal translation amounts Δx and Δy, the rotation angle θ about the optical axis, and the changes f in magnification by translation along the optical axis, as shown in FIG. 3, from the corresponding points from the corresponding point detector 172b, and supplies the extracted parameters to the SD coordinate transformer 172i.

The SD coordinate transformer 172*i* generates a combined image by performing coordinate transforming processing of the series of the plurality of pieces of image information supplied from the controller 172*e* on the basis of the parameters from the parameter extractor 172*c*, and writes the combined image in the combined image memory 172*h*.

On the other hand, when it is determined based on the discrimination result of the controller 172*e* that the series of images to be processed are obtained by long-distance panoramic image sensing, the corresponding points obtained by the corresponding point detector 172*b* are supplied to the parameter extractor 172*d*, and the series of the plurality of pieces of image information are supplied to the LD coordinate transformer 172*j*. In this case, the parameter extractor 172*d* extracts, as parameters, the rotation angles Ψ, Φ, and θ about the X-, Y-, and Z-axes shown in FIG. 6 from the corresponding points from the corresponding point detector 172*b*, and supplies the extracted parameters to the LD coordinate transformer 172*j*.

The LD coordinate transformer 172*j* generates a combined image by performing coordinate transforming processing of the series of the plurality of pieces of image information supplied from the controller 172*e* on the basis of the parameters from the parameter extractor 172*d*, and writes the combined image in the combined image memory 172*h*.

Accordingly, the combined image obtained by appropriate image combination corresponding to the image sensing situation is written in the combined image memory 172*h*, and is supplied to the display device 173 (FIG. 1) via the I/O unit 172*a* to be displayed on the screen by the display device 173.

As described above, in the electronic camera 100, when sensed image data are stored in the image memory 130, identification information $P_x$ corresponding to the image sensing mode is stored in correspondence with each image data, and the focusing information $f_c$, focal length $f_l$, stop s, shutter speed v and the like are also stored in correspondence with each image data. For this reason, the image sensing mode of the image data to be processed, and the image sensing situation of the panoramic image sensing mode, i.e., short- or long-distance panoramic image sensing, can be easily determined. By checking if the identification information $P_x$ assumes an identical value, a series of panoramic images can be easily discriminated from a plurality of image data stored in the image memory 130, thus attaining automatic image combination.

In the electronic camera 100, upon executing image combination, since an appropriate image combination method is automatically selected in correspondence with the image sensing situation, a plurality of image data obtained by short-distance panoramic image sensing can be appropriately combined, and a plurality of image data obtained by long-distance panoramic image sensing can be appropriately combined.

In the electronic camera 100, in a plurality of images to be combined, image sensing parameters are extracted from the corresponding points of the overlapping portions of the individual images, and image processing is executed using the extracted image sensing parameters. For this reason, the user need not perform any special operation for combining images.

Therefore, the electronic camera 100 can always easily obtain a panoramic image with high image quality without impairing image quality independently of whether a plurality of images to be combined are obtained by short- or long-distance panoramic image sensing.

In the image combining apparatus 172 shown in FIG. 10, the image memory 172*g* for storing the images to be combined, and the combined image memory 172*h* for storing a combined image are independently arranged. Alternatively, a single image memory may be shared by the images to be combined and the combined image.

The combined image output from the I/O unit 172*a* may be stored in a recording unit such as a hard disk or the like.
<Modification of First Embodiment> . . . First Modification The first modification of the first embodiment will be described below with reference to the accompanying drawings.

Figure 11:
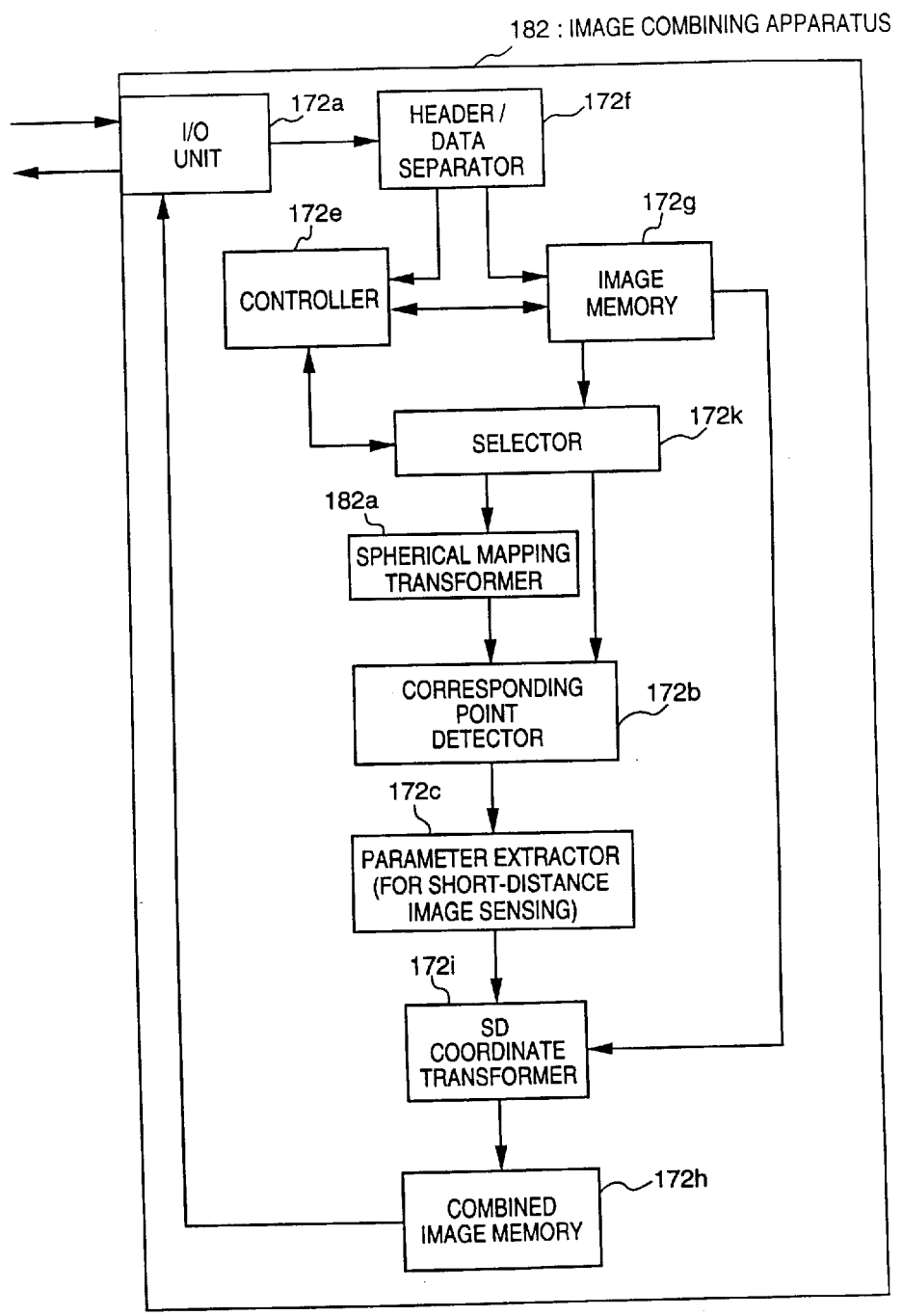
FIG. 11 is a block diagram showing the arrangement of an image combining unit in an electronic camera system to which an image sensing apparatus according to the present invention is applied in the first modification of the present invention.

An image combining apparatus according to the first modification is applied to an electronic camera system comprising an image combining unit 182, as shown in, e.g., FIG. 11.

In this electronic camera system (to be simply referred to as an electronic camera hereinafter), the image combining unit 182 shown in FIG. 11 is arranged in place of the image combining apparatus 172 (FIG. 10) arranged in the above-mentioned electronic camera 100.

In this electronic camera, since the arrangement and operations other than those of the image combining unit 182 are the same as those of the above-mentioned electronic camera 100, a detailed description of the individual units other than the image combining unit 182 will be omitted. In the image combining unit 182 shown in FIG. 11, the same reference numerals denote the units that perform the same operations as those in the image combining apparatus 172 shown in FIG. 10, and a detailed description thereof will be omitted.

More specifically, as shown in FIG. 11, the image combining unit 182 comprises a spherical mapping transformer 182*a*, which receives the output from the selector 172*k*.

The corresponding point detection unit 172*b* is arranged at the output side of the selector 172*k*, so that the outputs from the controller 172*e* and the image memory 172*g* are supplied to the selector 172*k*, and the output from the selector 172*k* is directly supplied to the corresponding point detector 172*b* and is also supplied thereto via the spherical mapping transformer 182*a*.

Furthermore, in the image combining unit 182, as the parameter extractor 172*c* and the SD coordinate transformer 172*i* alone are arranged as the parameter extractor and the coordinate transformer. The output from the corresponding point detector 172*b* is supplied to the parameter extractor 172*c*, and the output from the parameter extractor 172*c* is supplied to the SD coordinate transformer 172*i*. Therefore, the output from the image memory 172*g* is supplied to the SD coordinate transformer 172*i*, and the output from the SD coordinate transformer 172*i* is supplied to the combined image memory 172*h*.

The operation of the image combining unit 182 will be explained below.

In the same manner as in the image combining apparatus 172 shown in FIG. 10, the header/data separator 172*f* separates image data from the I/O unit 172*a* into a header portion and a data portion. The header/data separator 172*f* stores image information in the image memory 172*g*, and supplies header information to the controller 172*e*.

The controller 172*e* discriminates using the focusing information $f_c$ included in the header information from the header/data separator 172*f* if a series of images to be processed are obtained by short- or long-distance panoramic image sensing, and supplies the discrimination result to the selector 172*k*.

The controller 172*e* also supplies the focal length $f_l$ included in the header information from the header/data separator 172*f* to the selector 172*k*.

When it is determined based on the discrimination result from the controller 172e that the series of images to be processed are obtained by short-distance panoramic image sensing, the selector 172k reads out a series of a plurality of pieces of image information from the image memory 172g, and directly supplies them to the corresponding point detector 172b.

On the other hand, when it is determined that the series of images to be processed are obtained by long-distance panoramic image sensing, the selector 172k reads out a series of a plurality of pieces of image information from the image memory 172g, and supplies them to the spherical mapping transformer 182a. Also, the selector 172k supplies the focal length $f_l$ from the controller 172e to the spherical mapping transformer 182a.

Accordingly, the spherical mapping transformer 182a receives a plurality of pieces of image information and the focal length $f_l$ when a plurality of images obtained by short-distance panoramic image sensing are to be combined.

Figure 12:
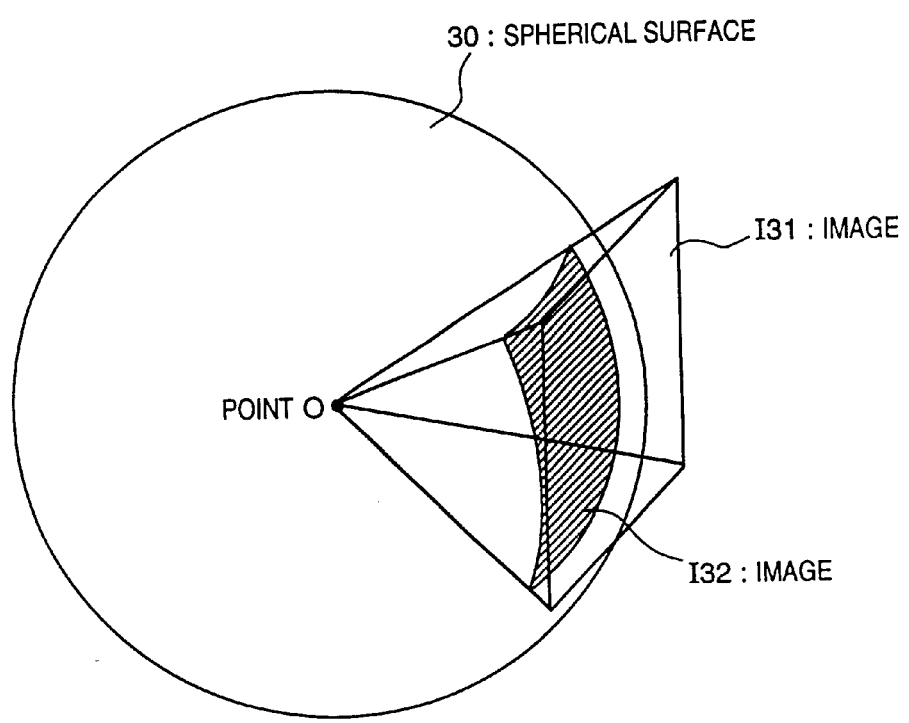
FIG. 12 is a view for explaining the spherical projection processing of the image combining unit.

The spherical mapping transformer 182a performs spherical mapping transforming processing for the plurality of pieces of image information supplied from the selector 172k. In this spherical mapping transforming processing, as shown in FIG. 12, a spherical surface 30 that contacts an arbitrary image $I_{31}$ is assumed, and the image $I_{31}$ is projected onto the spherical surface 30 in association with the principal point O of the image sensing lens 101 (FIG. 1), thereby generating a spherical image $I_{32}$.

Figure 13:
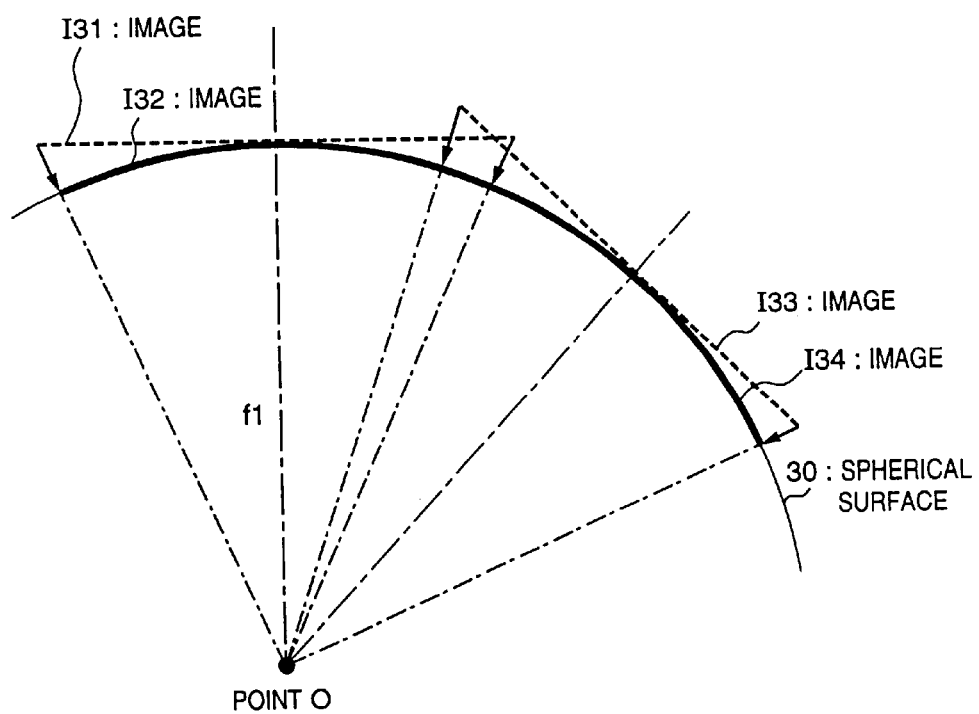
FIG. 13 is a view for explaining a spherical projection image obtained by the spherical projection processing.

When the spherical mapping transformer 182a receives, e.g., an image $I_{31}$ obtained by long-distance panoramic image sensing at an arbitrary position, and an image $I_{33}$ obtained by panning the camera by an arbitrary angle, it generates a spherical image $I_{32}$ by projecting the image $I_{31}$ onto the spherical surface 30 using the focal length $f_l$ from the selector 172k, and also generates a spherical image $I_{34}$ by projecting the image $I_{33}$ onto the spherical surface 30, as shown in FIG. 13. Accordingly, if two images have the same focal length $f_l$, and do not rotate about the optical axis, the spherical images $I_{32}$ and $I_{34}$ obtained by the spherical mapping transformer 182a are contiguous with each other on the spherical surface 30. For this reason, using only the vertical and horizontal translation amounts $\Delta x$ and $\Delta y$ shown in FIG. 3 as parameters used in the coordinate transforming processing, the spherical images $I_{32}$ and $I_{34}$ can be combined. However, in practice, since the focal length $f_l$ and the rotation angle θ about the optical axis suffer errors, the coordinate transforming processing is executed using, as the parameters, the vertical and horizontal translation amounts $\Delta x$ and $\Delta y$, the focal length $f_l$, and the rotation angle θ about the optical axis.

More specifically, in this electronic still camera, even when a plurality of images obtained by long-distance panoramic image sensing are to be combined, a combined image is obtained by performing the coordinate transforming processing using the same parameters as those used upon coordinate transformation of a plurality of images obtained by short-distance panoramic image sensing.

Accordingly, the corresponding point detector 172b receives a plurality of pieces of image information from the selector 172k or a plurality of spherical images from the spherical mapping transformer 182a in correspondence with the image sensing situation. The corresponding point detector 172b detects corresponding points of overlapping portions of the individual images in the plurality of pieces of received image information, and supplies the detected corresponding points and the plurality of pieces of image information from the selector 172k or the spherical mapping transformer 182a to the parameter extractor 172c. The parameter extractor 172c extracts, as parameters, the vertical translation amounts $\Delta x$ and $\Delta y$ shown in FIG. 3, the rotation angle θ about the optical axis, and the changes f in magnification by translation along the optical axis, and supplies the extracted parameters and the plurality of pieces of image information from the corresponding point detector 172b to the SD coordinate transformer 172i.

The SD coordinate transformer 172i generates a combined image by performing coordinate transforming processing of the plurality of pieces of image information from the parameter extractor 172c on the basis of the parameters from the parameter extractor 172c, and writes the combined image in the combined image memory 172h.

As described above, in this electronic camera, when a series of images to be processed are obtained by long-distance panoramic image sensing, since the spherical mapping transformer 182a performs the spherical mapping transforming processing, an image free from any trapezoidal distortion shown in FIG. 7 can be obtained. For this reason, even when a series of images obtained by long-distance panoramic image sensing are to be combined, a high-quality combined image can be obtained by the same processing as the image sensing parameter extraction processing and the coordinate transforming processing to be executed when a plurality of images obtained by short-distance panoramic image sensing are combined.

Hence, the electronic camera can always obtain a high-quality panoramic image independently of the image sensing situation.

Since the electronic camera need not separately comprise image sensing parameter extractors and coordinate transformers in correspondence with long- and short-distance panoramic image sensing operations, the apparatus arrangement can be simplified. This also leads to a cost reduction. <Modification of First Embodiment> . . . Second Modification The second modification of the present invention will be described below with reference to the accompanying drawings.

Figure 14:
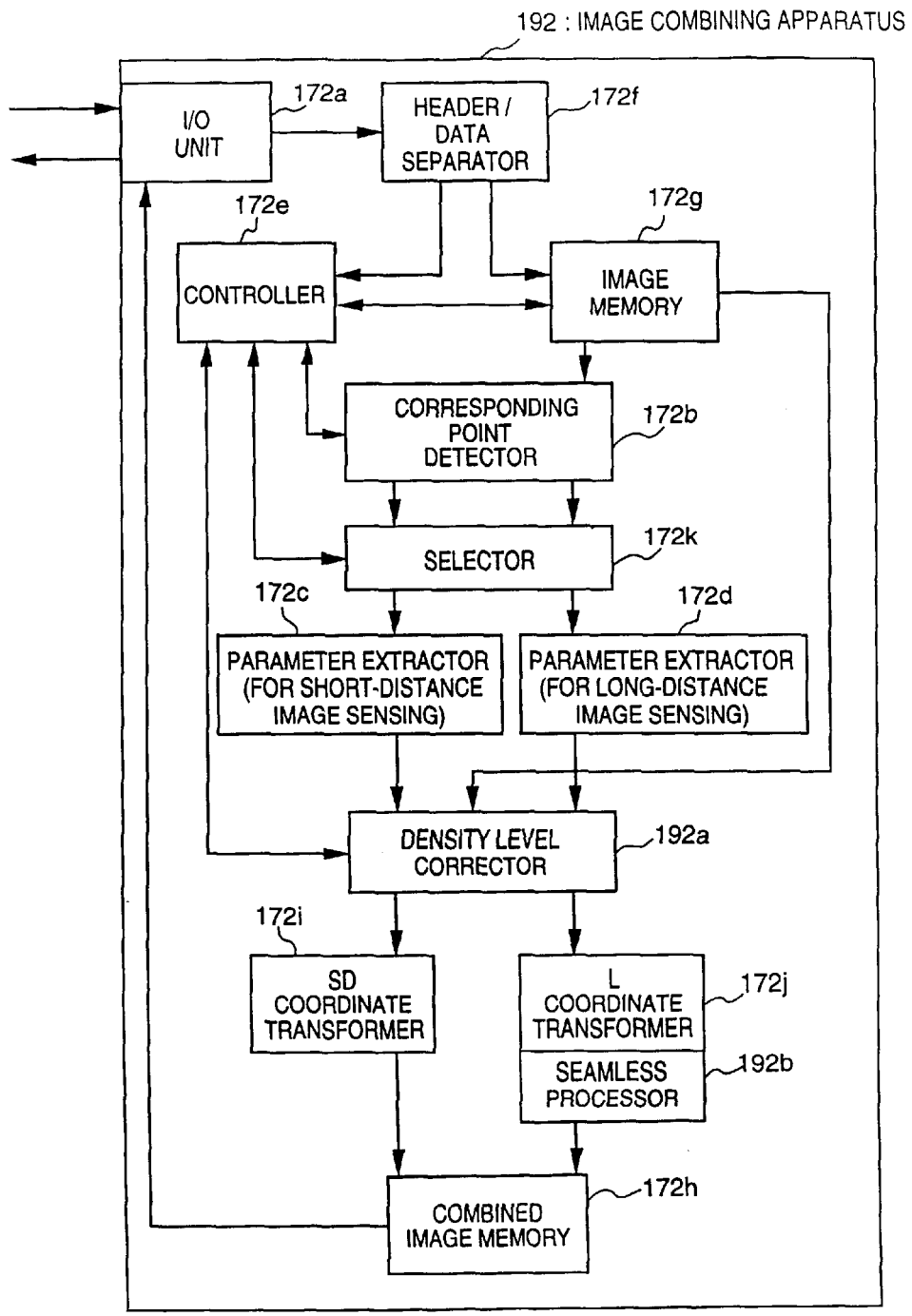
FIG. 14 is a block diagram showing the arrangement of an image combining unit of an electronic camera system to which an image sensing apparatus according to the present invention is applied in the second modification of the present invention.

An image combining apparatus according to the second modification is applied to an electronic camera system comprising an image combining unit 192, as shown in, e.g., FIG. 14.

In this electronic camera system (to be simply referred to as an electronic camera hereinafter), the image combining unit 192 shown in FIG. 14 is arranged in place of the image combining apparatus 172 (FIG. 10) arranged in the above-mentioned electronic camera 100.

In this electronic camera, the information associated with the image sensing conditions and written in the header portion H in the image memory 130 shown in FIG. 9 also includes an exposure level e and a gain level g of the AGC circuit 105 shown in FIG. 1 in addition to the focusing information $f_c$, focal length $f_l$, stop s, and shutter speed v.

In this electronic camera, since the arrangement and operations other than those of the image combining unit 192 are the same as those of the above-mentioned electronic camera 100, a detailed description of the individual units other than the image combining unit 192 will be omitted. In the image combining unit 192 shown in FIG. 14, the same reference numerals denote the units that perform the same operations as those in the image combining apparatus 172 shown in FIG. 10, and a detailed description thereof will be omitted.

As shown in FIG. 14, the image combining unit 192 comprises a density level corrector 192a, which is arranged between the parameter extractors 172c and 172d, and the SD and LD coordinate transformers 172i and 172j, and a seamless processor 192b arranged at the output side of the LD coordinate transformer 172j, in addition to the constituting elements of the image combining apparatus 172 shown in FIG. 10.

The density level corrector 192a is connected to the controller 172e, and receives the output from the image memory 172g. The combined image memory 172h receives the outputs from the SD coordinate transformer 172i and the seamless processor 192b.

The operation of the image combining unit 192 will be described below.

Figure 15:
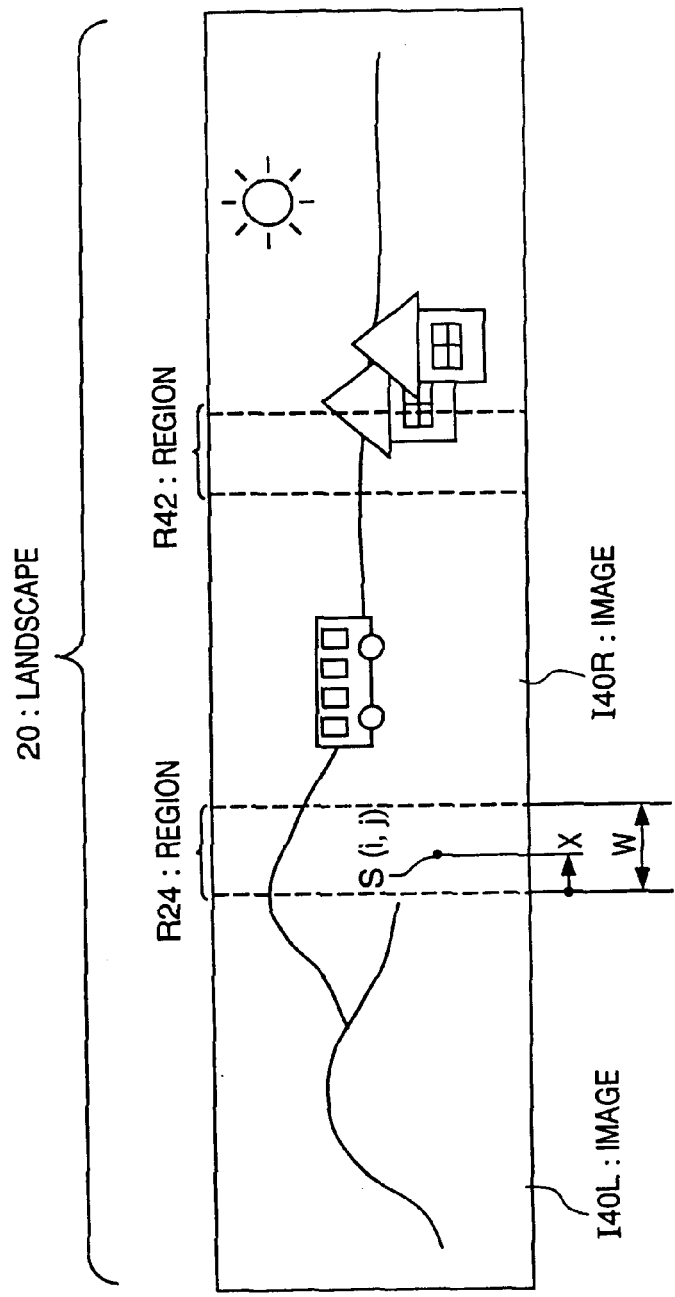
FIG. 15 is a plan view showing the image to be processed by the image combining unit.

Assume that a plurality of images to be combined by the image combining unit 192 are images $I_{40L}$ and $I_{40R}$, as shown in, e.g., FIG. 15. These images $I_{40L}$ and $I_{40R}$ are obtained by long-distance panoramic image sensing, as shown in FIG. 6. Of the three regions $R_{21}$ to $R_{23}$ shown in FIG. 6, an image obtained by sensing the left region $R_{21}$ is assumed to be the image $I_{40L}$, and an image obtained by sensing the central region $R_{22}$ is assumed to be the image $I_{40R}$, as shown in FIG. 15. Also, the overlapping area between the image $I_{40L}$ and the image $I_{40R}$ that neighbors the image $I_{40L}$ is assumed to be a region $R_{41}$, and the overlapping area between the image $I_{40R}$ and an image that neighbors the image $I_{40R}$ is assumed to be a region $R_{42}$.

The header/data separator 172f separates image data from the I/O unit 172a, i.e., each of the images $I_{40L}$ and $I_{40R}$, into a header portion and a data portion. The header/data separator 172f stores information in the data portion (image information) in the image memory 172g, and supplies information in the header portion (header information) to the controller 172e. The controller 172e reads out an exposure level $e_L$ of the image $I_{40L}$ and an exposure level $e_R$ of the image $I_{40R}$ included in the header information from the header/data separator 172f, and compares the level difference between the exposure levels $e_L$ and $e_R$ and a predetermined value. When the comparison result shows that the level difference between the exposure levels $e_L$ and $e_R$ is larger than the predetermined value, the controller 172e issues an active command to the density level corrector 192a, and at the same time, supplies the header information from the header/data separator 172f to the density level corrector 192a.

Figure 16:
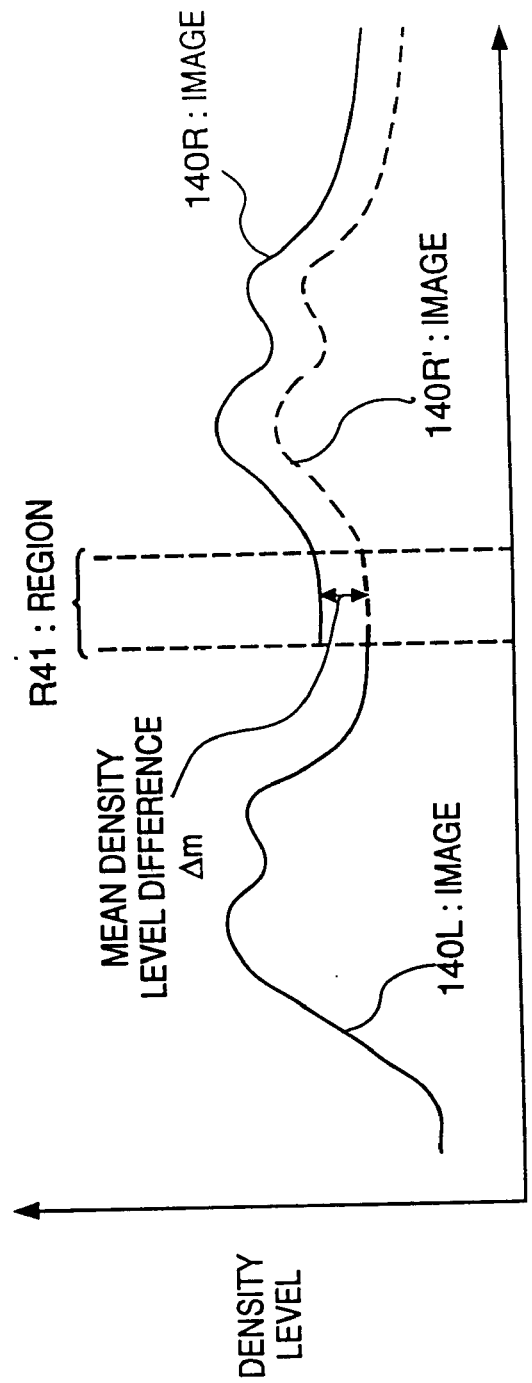
FIG. 16 is a view for explaining the density level correction processing in the image combining unit.

On the other hand, when the level difference between the exposure levels $e_L$ and $e_R$ is equal to or smaller than the predetermined value, the controller 172e issues an inactive command to the density level corrector 192a. At this time, the density level corrector 192a receives parameters obtained by the parameter extractor 172d, and also receives image information of the images $I_{40L}$ and $I_{40R}$ read out from the image memory 172g by the controller 172e. Upon reception of the active command from the controller 172e, the density level corrector 192a calculates a difference Δm between the mean density levels in the overlapping region $R_{41}$ between the images $I_{40L}$ and $I_{40R}$ in the image information of the images $I_{40L}$ and $I_{40R}$ supplied from the controller 172e, as shown in FIG. 16.

The density level corrector 192a corrects the density level of the image $I_{40R}$ using the difference Δm on the basis of the stop s, shutter speed v, the gain level g of the AGC circuit 105, and the like included in the header information supplied from the controller 172e simultaneously with the active command, so that the images $I_{40L}$ and $I_{40R}$ have nearly equal density levels in the overlapping region $R_{41}$. With this processing, an image $I'_{40R}$, the density level of which is adjusted to the mean density level in the overlapping region $R_{41}$ of the image $I_{40L}$, is generated based on the image $I_{40R}$. The density level corrector 192a supplies the image $I_{40L}$ and the image $I'_{40R}$ whose density level is corrected, and the parameters from the parameter extractor 172d, to the LD coordinate transformer 172j.

The LD coordinate transformer 172j produces a combined image of the images $I_{40L}$ and $I'_{40R}$ by performing coordinate transforming processing of the images $I_{40L}$ and $I'_{40R}$ from the density level corrector 192a on the basis of the parameters from the density level corrector 192a, and supplies the combined image to the seamless processor 192b.

As shown in FIG. 15, let SL and SR be the pixel values on the images $I_{40L}$ and $I'_{40R}$ corresponding to a position (i, j) in the overlapping region $R_{41}$, and W be the width of the overlapping region $R_{41}$. Then, the seamless processor 192b calculates a pixel value S(i, j) at the corresponding position in the combined image by the following weighting addition:

$$S(i, j) = SL\left(1.0 - \frac{X}{W}\right) + SR \cdot \frac{X}{W} \tag{1}$$

The seamless processor 192b substitutes each pixel of the overlapping region $R_{41}$ with the pixel value S(i, j) obtained by the above equation, and writes the combined image as a result of substitution in the combined image memory 172h.

Even when a plurality of images to be combined by the image combining unit 192 are obtained by short-distance panoramic image sensing, the density level corrector 192a performs the density level correction processing in the same manner as the processing for images obtained by long-distance panoramic image sensing, and thereafter, the SD coordinate transformer 172i performs the coordinate transforming processing on the basis of parameters obtained by the parameter extractor 172c to generate a combined image. The combined image is written in the combined image memory 172h.

The combined image written in the combined image memory 172h is supplied to the display device 173 (FIG. 1) via the I/O unit 172a, and is displayed on the screen by the display device 173.

As described above, since this electronic camera adjusts the images to be connected so that they have nearly equal density levels in their overlapping region, the connected portion can be prevented from standing out. Therefore, this electronic camera can obtain a panoramic image with higher image quality.

In the above-mentioned electronic camera, the image sensing conditions used in the density level corrector 192a are the exposure level e and the gain level g of the AGC circuit 105 shown in FIG. 1, but the present invention is not limited to these conditions.

In the above-mentioned electronic camera, only when a plurality of images obtained by long-distance panoramic image sensing are combined, seamless processing is executed. Also, seamless processing may be performed when a plurality of images obtained by short-distance panoramic image sensing are combined.

However, when the images to be combined are character images such as document images obtained by short-distance panoramic image sensing, since the character edges do not match due to small errors of the image sensing parameters, a double image may be formed as a result of combination.

In such case, a seamless processor corresponding to the seamless processor 192b is arranged at the output side of the SD coordinate transformer 172i, and a means (document image discriminator) for discriminating if the images to be combined are document images when it is determined that the images are obtained by short-distance panoramic image sensing is arranged. Only when the discrimination result of the document image discriminator indicates that the images to be combined are document images, the seamless processor is inactivated.

<Modification of First Embodiment> . . . Third Modification

The third modification will be described below with reference to the accompanying drawings.

Figure 17:
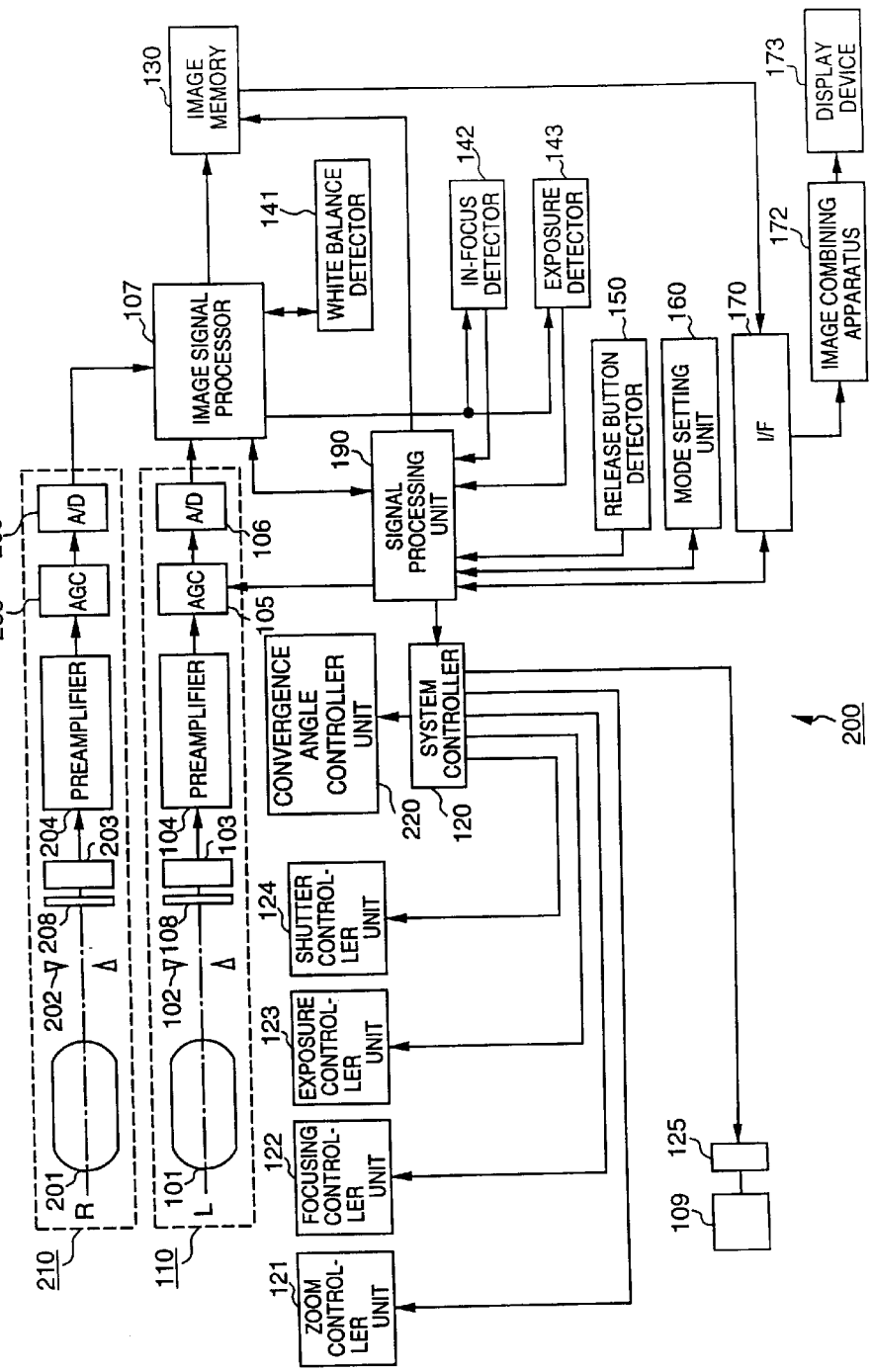
FIG. 17 is a block diagram showing the arrangement of an image combining unit of an electronic camera system to which an image sensing apparatus according to the present invention is applied in the third modification of the present invention.

An image combining apparatus according to the third modification is applied to, e.g., an electronic camera system 200 shown in FIG. 17. The electronic camera system (to be referred to as an electronic camera hereinafter) 200 comprises an image sensing unit 210 in addition to the constituting elements of the electronic camera 100 shown in FIG. 1, and is built by a multi-eye image sensing system having two image sensing units, i.e., the image sensing units 110 and 210, as shown in FIG. 17.

The image sensing unit 210 has the same arrangement as that of the image sensing unit 110, and comprises an image sensing lens 201, a stop 202, a shutter 208, and an image sensing element 203, which are arranged in turn from the object side, a preamplifier 204 which receives the output from the image sensing element 203, an AGC circuit 205 which receives the output from the preamplifier 204, and an A/D converter 206 which receives the output from the AGC circuit 205. The output from the A/D converter 206 is supplied to the image signal processor 107.

In the image sensing unit 210, the zoom, focusing, stop, and shutter control operations are attained by a zoom controller unit 121, a focusing controller unit 122, an exposure controller unit 123, and a shutter controller unit 124 as in the image sensing unit 110.

The electronic camera 220 comprises a convergence angle controller unit 220 for controlling the directions of the optical axes L and R of the image sensing units 110 and 210. The convergence angle controller unit 220 is controlled by the system controller 120. Furthermore, in the electronic camera 200, the system controller 120 and the signal processing unit 190 execute processing corresponding to the multi-eye image sensing system.

In the electronic camera 200 shown in FIG. 17, the same reference numerals denote the units that perform the same operations as those in the electronic camera 100 in FIG. 1, and a detailed description thereof will be omitted.

The operation of the electronic camera 200 will be explained below.

When an in-focus state is detected by the in-focus detector 142, the signal processing unit 190 supplies a control signal for focusing control to the system controller 120 in accordance with the detection result of the in-focus detector 142, and discriminates if the object which is being sensed is a short- or long-distance object.

When it is determined that the object is a short-distance object, the signal processing unit 190 supplies a control signal for setting the optical axes L and R of the image sensing units 110 and 210 to be parallel to each other to the convergence angle controller unit 220 via the system controller, as shown in FIG. 18A. On the other hand, when it is determined that the object is a long-distance object, the signal processing unit 190 supplies a control signal for setting the optical axes L and R of the image sensing units 110 and 210 to point outward to the convergence angle controller unit 220 via the system controller 120, as shown in FIG. 18B.

Accordingly, the convergence angle controller unit 220 controls the image sensing units 110 and 210 so that the optical axes L and R of the image sensing units 110 and 210 are parallel to each other during short-distance panoramic image sensing, or so that the optical axes L and R of the image sensing units 110 and 210 point outward during long-distance panoramic image sensing.

Note that the situations in which image sensing is performed while the directions of the optical axes L and R of the image sensing units 110 and 210 are controlled, as shown in FIGS. 18A and 18B, are respectively equivalent to the image sensing situations shown in FIGS. 3 and 6.

For this reason, a combined image can be obtained from a plurality of images obtained by sensing an object, as shown in FIG. 18A, by the above-mentioned combining processing for short-distance panoramic image sensing, and a combined image can be obtained from a plurality of images obtained by sensing an object, as shown in FIG. 18B, by the above-mentioned combining processing for long-distance panoramic image sensing.

Hence, as in the electronic camera 100 shown in FIG. 1, the image combining apparatus 172 discriminates if a plurality of images to be combined are obtained by short- or long-distance panoramic image sensing, and selects appropriate combining processing in correspondence with the discrimination result, thereby obtaining a high-quality combined image.

As described above, in this electronic camera 200, since the directions of the optical axes of the image sensing units 110 and 210 are automatically controlled in correspondence with the object distance, the user need not perform any operation for sensing images to partially overlap each other in the panoramic image sensing mode. Accordingly, the electronic camera 200 can improve operability, and can easily obtain a high-quality combined image.

Note that the image combining apparatus 172 in FIG. 17 may be replaced by the image combining unit 182 shown in FIG. 11 or the image combining unit 192 shown in FIG. 14.

<Modification of First Embodiment> . . . Fourth Modification

The fourth modification will be described below with reference to the accompanying drawings.

Figure 19:
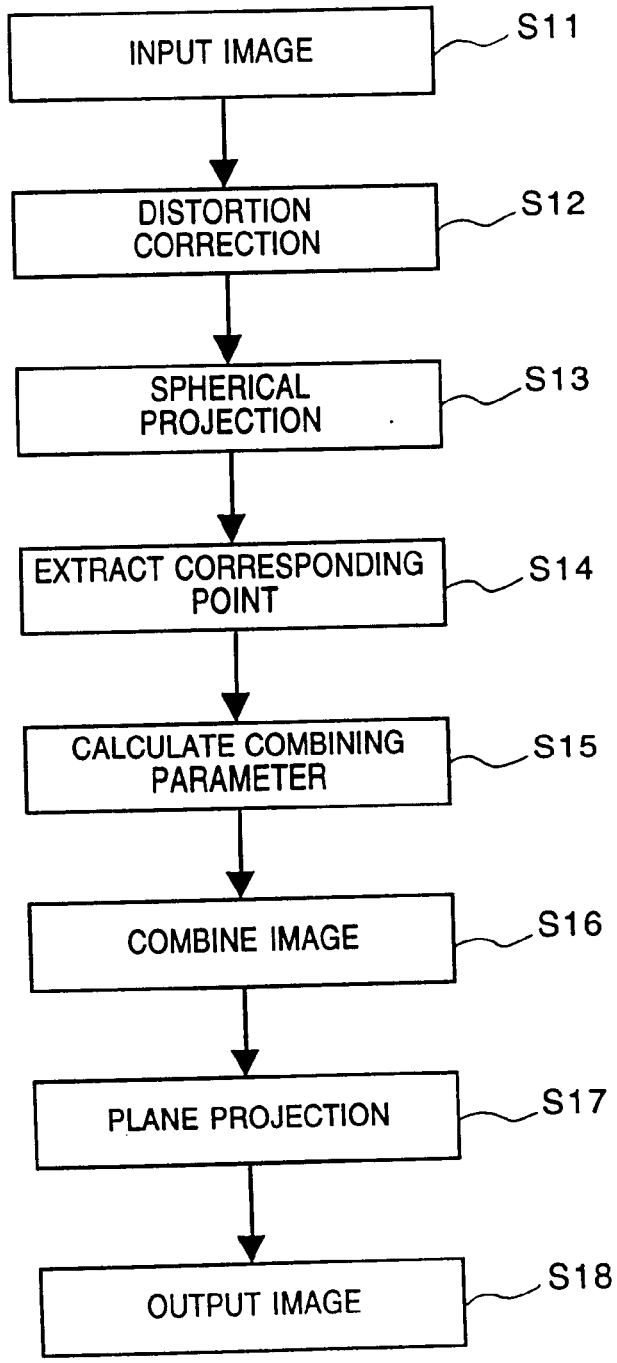
FIG. 19 is a flow chart showing the processing of an image combining unit of an electronic camera system to which an image sensing apparatus according to the present invention is applied in the fourth modification of the present invention.

An image combining apparatus according to the fourth modification is applied to, e.g., an electronic camera system that executes image combination in accordance with the flow chart shown in FIG. 19.

This electronic camera system (to be referred to as an electronic camera hereinafter) has the same arrangement as the electronic camera 100 shown in FIG. 1 and, in particular, generates a combined image with a large horizontal field angle from two images sensed by panning the electronic camera in the horizontal direction, as shown in FIG. 6. In this electronic camera, an image combining unit corresponding to the image combining apparatus 172 is pre-set with a program corresponding to the flow chart in FIG. 19, and executes the processing according to the program. Note that the electronic camera of this modification is substantially the same as the electronic camera 100 shown in FIG. 1 except for image combination executed by the image combining unit, and a detailed description other than the image combination will be omitted.

The following description will be made with reference to FIGS. 1 and 19 while assuming the electronic camera of this modification to be the electronic camera 100.

In the electronic camera 100, for example, 640×480 pixel data obtained by the image sensing unit 110 is stored in the image memory 130. Also, the image memory 130 stores a series of image data obtained in the panoramic image sensing mode as one file data.

The image combining apparatus 172 reads out arbitrary file data consisting of a series of two image data onto a memory (not shown) from those stored in the image memory 130 (step S11).

Subsequently, the individual image data read out onto the memory are corrected to remove distortion produced by the image sensing lens 101 therefrom (step S12).

More specifically, assuming that distortion of the image sensing lens 101 is rotary-symmetrical about the image center, when (x, y) represents the ideal position of a pixel having the image center as an origin when the image sensing lens 101 is free from any distortion, and ($x_d$, $y_d$) represents the position when the lens 101 suffers distortion, the following relations (2) hold:

$$x_d = x \cdot (1 + k_1 \cdot r^2 + k_2 \cdot r^4)$$
$$y_d = y \cdot (1 + k_1 \cdot r^2 + k_2 \cdot r^4) \quad (2)$$

where $k_1$ and $k_2$ are distortion correction coefficients, and the following relation holds:

$$r^2 = x^2 + y^2 \quad (3)$$

Figure 20:
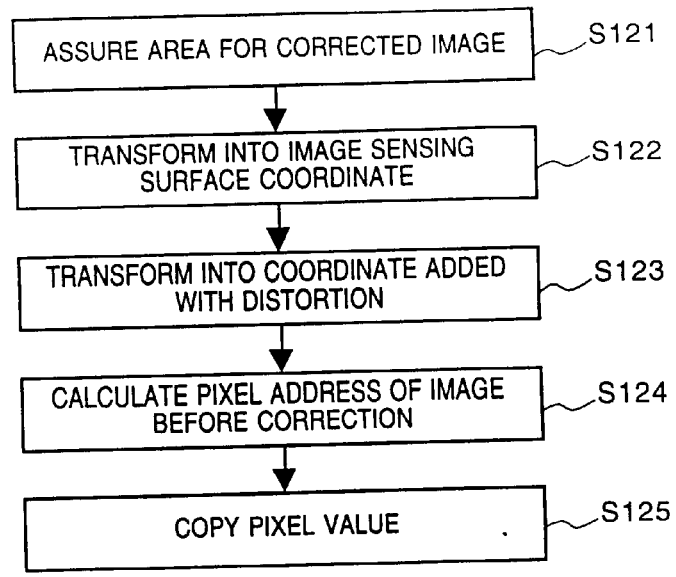
FIG. 20 is a flow chart showing the image input processing in the processing of the image combining unit in detail.

In step S12, the processing for correcting distortion of image data is executed using relations (2). In step S12, as shown in FIG. 20, an area for storing distortion-corrected image data is assured on the memory in correspondence with the same two-dimensional size as that of the input image data (step S121).

Subsequently, processing operations in steps S121 to S125 (to be described below) are performed for each pixel of the image data, thus obtaining corrected image data in which distortion of the image sensing lens 101 has been corrected. More specifically, as for each pixel of the image data, the pixel address of the corrected image data is transformed into one on a coordinate system having the image center as an origin using the horizontal and vertical sizes and pixel pitches of the image sensing surface upon acquisition of the input image data (step S122). The coordinate position obtained in step S122 corresponds to the ideal position (x, y) free from any distortion.

In step S122, substituting the ideal position (x, y) obtained in step S122 in relations (2) yields the position ($x_d$, $y_d$) suffering distortion (step S123).

In relations (2), the distortion correction coefficients $k_1$ and $k_2$ assume values proportional to the 3rd- and 5th-order distortion coefficients of the image sensing lens 101, and can be determined by configuration information including the refractive index of the material, surface shape, and lens layout of the image sensing lens 101.

Accordingly, assume that the distortion correction coefficients $k_1$ and $k_2$ take on predetermined values determined by the configuration information, and the position ($x_d$, $y_d$) suffering distortion is calculated by relations (2) using these distortion correction coefficients $k_1$ and $k_2$.

Subsequently, inverse transforming processing to the transforming processing executed in step S122 is executed using the horizontal and vertical sizes and pixel pitches of the image sensing surface upon acquisition of the input image data, thereby obtaining a pixel address corresponding to the position ($x_d$, $y_d$) suffering distortion obtained in step S123 in the image data before distortion correction (step S124).

RGB data as the pixel value at the pixel address obtained in step S124 is copied as that at the pixel address of the corrected image data (step S125). At this time, if the pixel address obtained in step S124 falls outside the image region, for example, a white pixel value is assigned thereto as a dummy pixel value.

With the above-mentioned processing in step S12, the two corrected image data in which distortion of the image sensing lens 101 is corrected are obtained from the two input image data, and thereafter, the memory area assured for storing the corrected image data in step S121 is released.

If the two input image data are images in which distortion of the image sensing lens 101 is nearly negligible, the processing in step S12 may be skipped.

Subsequently, spherical image data are generated by projecting and transforming the two corrected image data subjected to distortion correction in step S12 (step S13).

Figure 21:
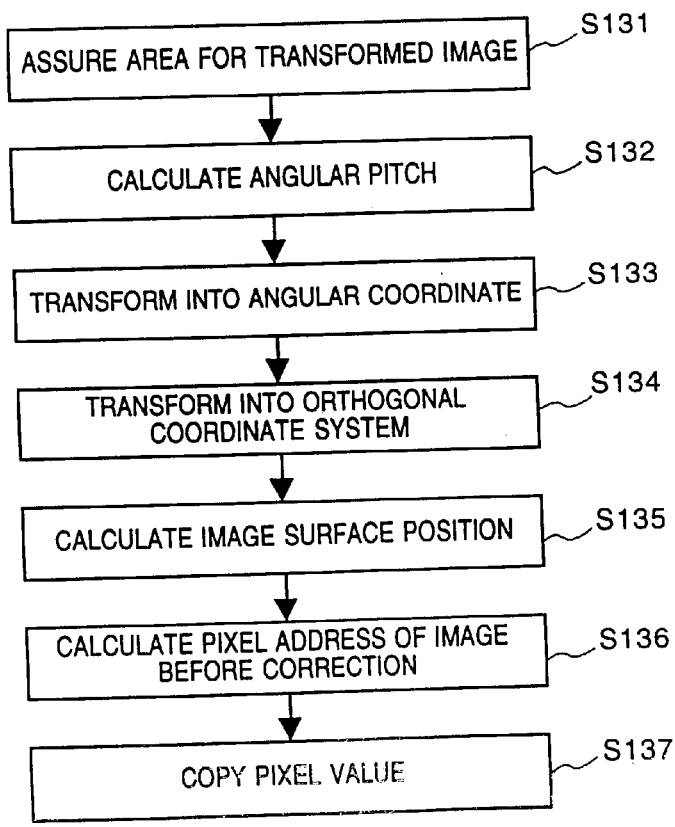
FIG. 21 is a flow chart showing spherical projection transforming processing in the processing of the image combining unit in detail.

More specifically, in step S13, as shown in FIG. 21, an area for storing image data after spherical projection transformation is assured on the memory in correspondence with the same two-dimensional size of the input image data (corrected image data) (step S131). The angular pitch of a pixel upon executing the spherical projection transformation is calculated (step S132). At this time, the horizontal and vertical angular pitches of a pixel are set at equal pitches so that the horizontal and vertical field angles of image data after the spherical projection transformation become equivalent to those of original input image data. More specifically, if the image surface upon acquisition of input image data has horizontal and vertical sizes of h×v pixels, and the image sensing lens 101 has a focal length f, the horizontal and vertical field angles are respectively given by:

$$\left(2 \cdot \tan^{-1} \frac{h}{2f}\right) \quad (4)$$
$$\left(2 \cdot \tan^{-1} \frac{v}{2f}\right)$$

Note that the focal length f represents the distance between the object image-side principal point of the image sensing lens 101 and the light-receiving surface of the image sensing element 103.

Accordingly, if the corrected image data has a size of H×V pixels, horizontal and vertical angular pitches dθ and dφ of a pixel upon executing the spherical projection are obtained by the following relations (5):

$$d\theta = \left(2 \cdot \tan^{-1} \frac{h}{2f}\right) / H \quad (5)$$
$$d\phi = \left(2 \cdot \tan^{-1} \frac{h}{2f}\right) / V$$

where $\tan^{-1}$ indicates the inverse transform of tan.

By executing processing operations in steps S133 to S137 (to be described below) for the individual pixels of image data, spherical projection image data is obtained.

More specifically, as for each pixel of image data, the pixel address of spherical projection image data is transformed into one on an angular coordinate system (θ, φ) with the image center as an origin using the horizontal and vertical angular pitches dθ and dφ obtained in step S132, and the size of the corrected image data (step S133).

The angular coordinate system (θ, φ) obtained in step S133 is transformed to an orthogonal coordinate system (X, Y, Z) using the following equations (6) (step S134):

$$X = \cos \phi \cdot \sin \theta \quad (6)$$
$$Y = \sin \phi$$
$$Z = \cos \phi \cdot \sin \theta$$

Note that since equations (6) transform a polar coordinate value having the Y-axis as a rotation axis into an orthogonal coordinate value, the coordinate value in the radial direction is set at "1" since it has no influence on the processing in step S134 and the subsequent steps.

Subsequently, a position (x, y) on the image sensing surface at the focal length f, which position corresponds to an arbitrary position (X, Y, Z) on the orthogonal coordinate system obtained in step S134 is calculated based on equations (7) below by perspective transforming processing having the focal point position (to be referred to as a view point hereinafter) of the image sensing lens 101 as the center (step S135):

$$x = X \cdot \frac{f}{Z}$$
$$y = Y \cdot \frac{f}{Z}$$
(7)

Thereafter, using the horizontal and vertical sizes and pixel pitches of the image sensing surface upon acquisition of the input image data, inverse transforming processing to the transforming processing executed in step S134 is executed in the same manner as in the processing in step S124 above, thus obtaining a pixel address corresponding to the position (x, y) obtained in step S135 (step S136).

Then, RGB data at the pixel value at the pixel address obtained in step S136 is copied as that at the pixel address of the spherical projection image data as in the processing in step S125 above (step S137).

Figure 22:
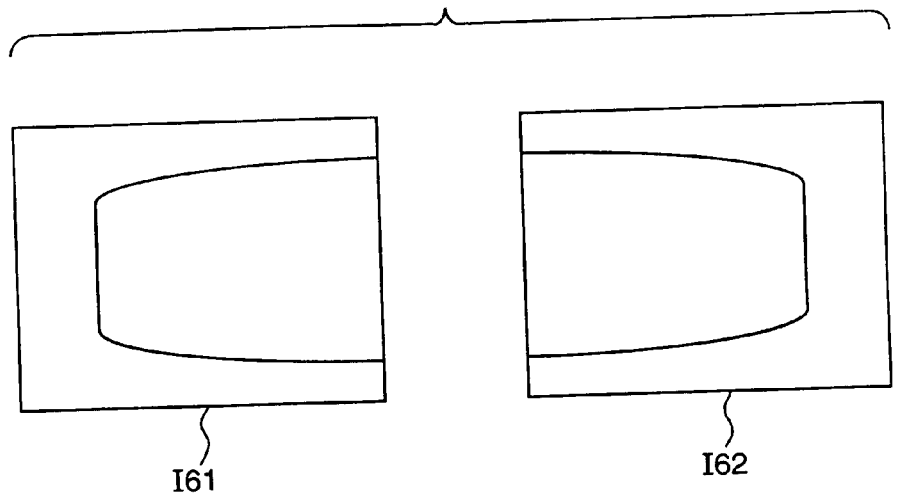
FIG. 22 is a plan views showing two spherical projection images obtained by the spherical projection transforming processing.
Figure 23:
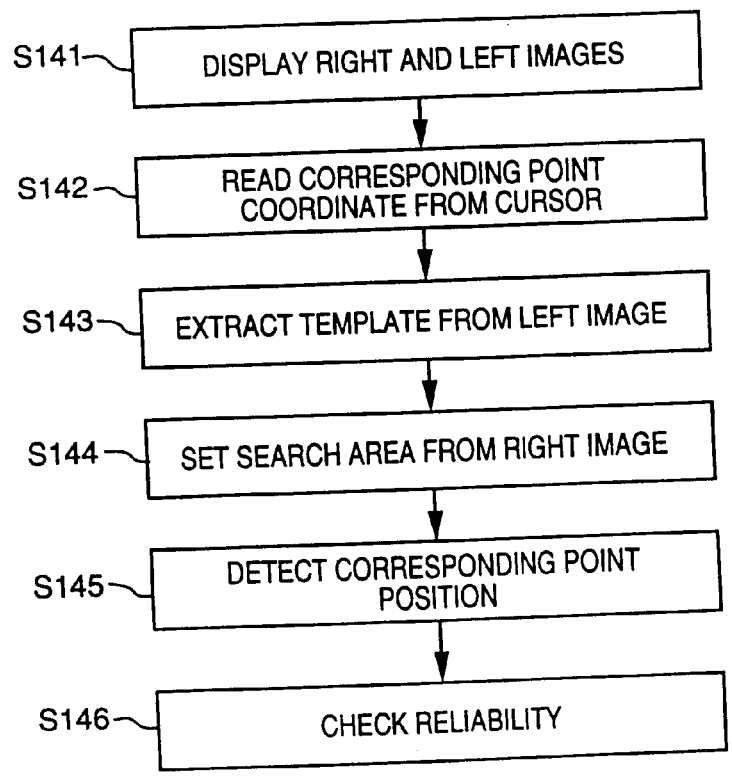
FIG. 23 is a flow chart showing the corresponding point extraction processing in the processing of the image combining unit in detail.

With the above-mentioned processing in step S13, data of two spherical images $I_{61}$ and $I_{62}$ projected onto the spherical surface, as shown in, e.g., FIG. 22, are obtained from the two corrected image data obtained in step S12. After the two spherical image data are obtained, the memory area assured for storing the spherical image data in step S131 is released.

Subsequently, corresponding points between the two spherical image data obtained in step S13 are extracted (step S14).

In this electronic camera 100, the user can designate some sets of corresponding points between the two spherical image data using, e.g., a cursor. In step S14, the accurate positions of the designated corresponding points are obtained by template matching.

More specifically, in step S14, the two spherical image data are displayed on the screen of the display device 173 (step S141). Note that the two spherical image data may also be called right and left images in the following description.

Subsequently, the user operates an operation unit (not shown) to designate several sets of corresponding points, and the coordinate positions of the several sets of designated corresponding points are read (step S142). For each of the several sets of designated corresponding points, template matching in steps S143 to S146 (to be described below) is executed.

More specifically, for each set of corresponding points, image data is extracted from the left image of the two spherical image data as a template (step S143). The extracted template corresponds to image data in a rectangular region, which has the designated point of the left image as the center, and has a predetermined size.

In step S144, an area for searching for the point corresponding to the template extracted in step S143 is set from the right image. This search area corresponds to a rectangular region which has the designated point of the right image as the center, and has a predetermined size.

In the search area set in step S144, the template extracted in step S143 is translated to calculate the differences between the right and left images. This differences are calculated based on the G components alone of the R, G, and B components of image data. Then, a position corresponding to a minimum sum total of the absolute values of the calculated differences is determined as the corresponding point position (step S145).

Subsequently, the reliability of the corresponding point position obtained in step S145 is checked (step S146). The reliability checking processing is performed using the minimum sum total of the absolute values of the differences, and the second minimum sum total of the absolute values of the differences. For example, when the minimum sum total of the absolute values of the differences is equal to or smaller than a second predetermined threshold value, and the second minimum sum total of the absolute values of the differences is equal to or larger than a first predetermined threshold value, it is determined that the corresponding point position obtained in step S145 has reliability. In this manner, the coordinate values of the corresponding point positions determined to have reliability of the right and left images are stored in the memory as corresponding point data.

With the above-mentioned processing in step S14, the coordinate positions of the corresponding points between the two spherical image data obtained in step S13 are obtained.

Subsequently, parameters for combining the two spherical image data are calculated from the coordinate positions of the corresponding points obtained in step S14 (step S15).

Assume that the focal length of the image sensing lens 101 remains the same before and after panning, and three parameters, i.e., the horizontal and vertical translation amounts and rotation angle, are calculated as the parameters. These three parameters are calculated from the coordinate positions of the two or more sets of corresponding points using the method of least squares.

Accordingly, in step S15, the horizontal and vertical translation parameters and rotation parameter of the right image with respect to the left image are obtained.

In step S15, if the focal length of the image sensing lens 101 changes before and after panning, an enlargement/reduction parameter need also be calculated.

Of the three parameters, i.e., the horizontal and vertical translation parameters and rotation parameter, the vertical translation parameter and rotation parameter assume values nearly equal to zero. For this reason, a restraint condition may be set for these two parameters to optimize the parameters, and the parameters may be calculated.

Subsequently, the right image is translated in the vertical and horizontal directions, and is rotated, in accordance with the parameters obtained in step S15, thereby combining the right and left images (step S16).

Since the two images to be combined in step S16 are images projected in advance onto the spherical surface in step S13, the horizontal and vertical translations of an image correspond to horizontal and vertical panning operations of an image before spherical projection.

Figure 24:
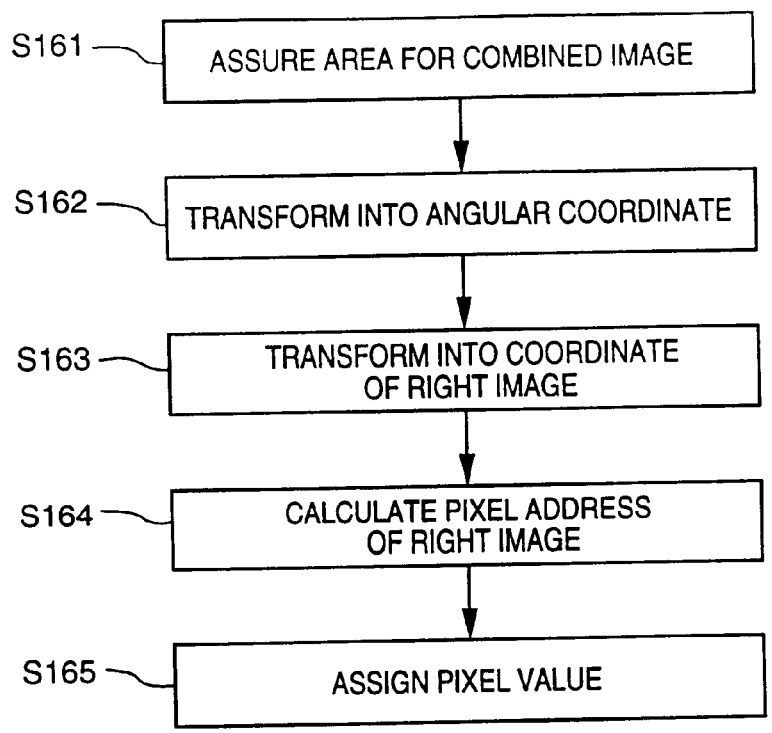
FIG. 24 is a flow chart showing the image combination in the processing of the image combining unit in detail.

More specifically, in step S16, as shown in FIG. 24, the two-dimensional size of combined image data is calculated, and an area corresponding to the calculated size is assumed on the memory as an area for storing combined image data (step S161).

Since the vertical translation parameter and rotation parameter assume values nearly equal to zero, in step S161, the vertical size is set at the same value as that of the image data before combination, and the horizontal size is set at a value as the sum of the horizontal size of image data before combination and the size corresponding to the number of pixels of the horizontal translation parameter obtained in step S15.

Subsequently, processing operations in steps S162 to S165 (to be described below) are executed for each pixel of the combined image data. More specifically, for each pixel of the combined image data, the pixel address of the combined image data is transformed into one on an angular coordinate system using the angular pitch upon spherical projection obtained in step S13 (step S162). At this time, since the origin of the angular coordinate system is matched with the central point of the left image, pixel data of the left image can be copied without any coordinate transformation.

According to the parameters obtained in step S15, the combined image data is translated in the horizontal and vertical directions, and is rotated, thereby transforming the angular coordinate system of the combined image data obtained in step S162 to that of the right image (step S163).

Then, the angular coordinate system of the right image is transformed to the pixel address of the right image using the size of the right image and the angular pitch upon spherical projection obtained in step S13 (step S164).

A pixel value is assigned to the pixel address of the combined image data (step S165). At this time, the average value of the pixel values of the right and left images is assigned to each of the R, G, and B components of a pixel corresponding to the pixel address falling within the image region of the left image, and to the pixel address obtained in step S164 falling within the image region of the right image. On the other hand, the pixel value of the right image is assigned to a pixel within the image region of the left image alone, and a white pixel value, as a dummy pixel value, is assigned to a pixel falling outside the image regions of both the right and left images.

Figure 25:
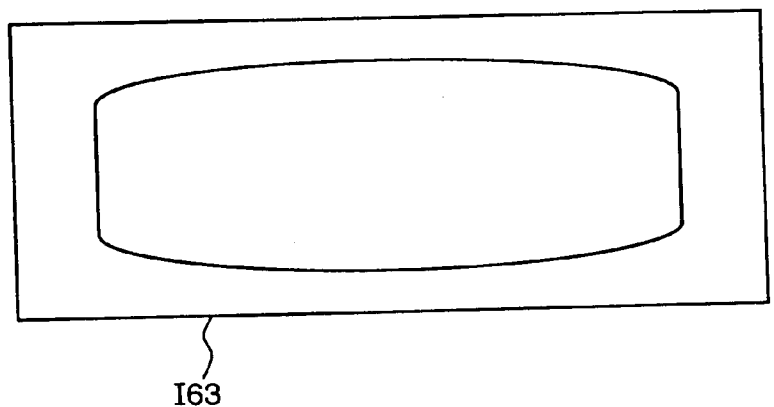
FIG. 25 is a plan view showing a combined spherical projection image obtained by the image combination.

With the above-mentioned processing in step S16, a combined image $I_{63}$, as shown in, e.g., FIG. 25, is obtained by combining the two spherical image data obtained in step S13, and thereafter, the memory area assured for storing the combined image data in step S161 is released.

Subsequently, the combined image data obtained in step S16 is projected and transformed again onto a plane (step S17).

Figure 26:
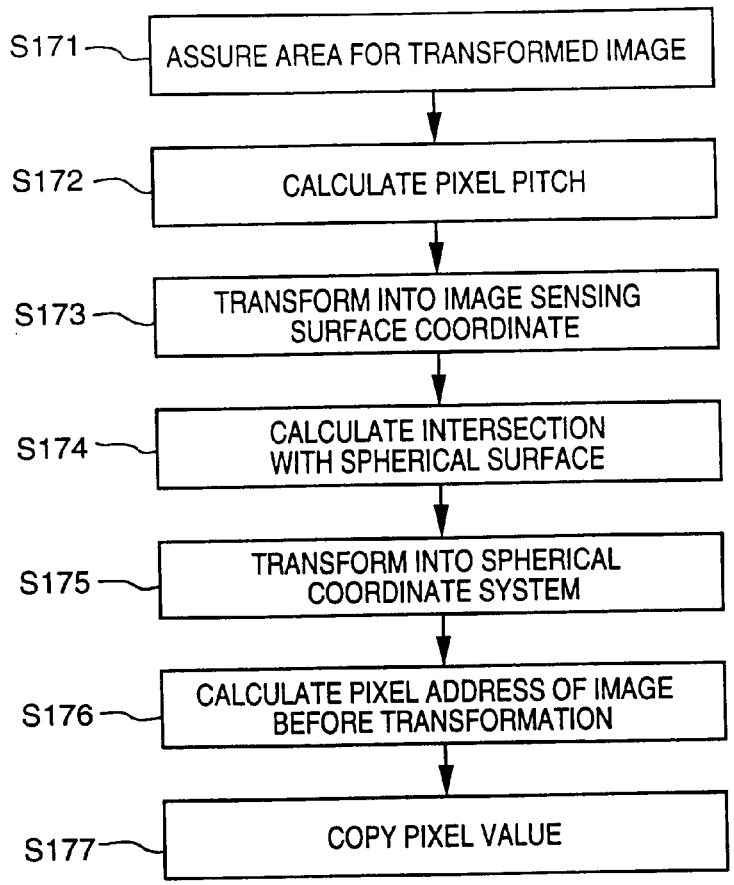
FIG. 26 is a flow chart showing the plane projection transforming processing in the processing of the image combining unit in detail.

More specifically, in step S17, as shown in FIG. 26, an area for storing image data after plane projection transformation is assumed on the memory in correspondence with the same two-dimensional size as the combined image data (step S171).

Subsequently, the pixel pitch upon plane projection is calculated (step S172).

At this time, the horizontal and vertical pixel pitches are set at pitches equivalent to the horizontal and vertical field angles of image data after plane projection transformation (plane combined image data) on the image sensing surface at the focal length f.

More specifically, when the combined image data is assumed to have a size of H×V pixels, the horizontal and vertical half field angles are expressed by formulas (8) below using the angular pitches $d\theta$ and $d\phi$ of the spherical projection image data obtained in step S13:

$$\left(\tan\left(d\theta \cdot \frac{H}{2}\right)\right) \quad (8)$$

$$\left(\tan\left(d\phi \cdot \frac{V}{2}\right)\right)$$

Accordingly, the pixel pitches of the image subjected to plane projection transformation are obtained by the following equations (9):

$$dx = f \cdot \tan\left(d\theta \cdot \frac{H}{2}\right) / H/2 \quad (9)$$

$$dy = f \cdot \tan\left(d\phi \cdot \frac{V}{2}\right) / V/2$$

The pixel pitches obtained by equations (9) above equal those of the images obtained by image sensing when an image projected onto the image sensing surface at the same focal length as that upon image sensing is to be generated.

Plane combined image data is obtained by executing processing operations in steps S173 to S177 (to be described below) for each pixel of the image data.

More specifically, for each pixel of the image data, the pixel address of the combined image data is transformed into one on a coordinate system (x, y) with the image center as an origin using the horizontal and vertical pixel pitches obtained in step S172 and the size of the image data (step S173) as in the processing in step S122.

Subsequently, the intersection (X, Y, Z) between the straight line drawn from the view point to a point (x, y, f) on the image sensing surface, and the spherical surface having the view point as the center is calculated (step S174). At this time, the radius of the spherical surface is set at "1" since it has no influence on the processing in step S174 and the subsequent steps.

The intersection obtained in step S174, i.e., the orthogonal coordinate system (X, Y, Z), is transformed to a spherical coordinate system using the following equations (10) (step S175):

$$\theta = \sin^{-1}\left(\frac{X}{\sqrt{X^2 + Z^2}}\right) \quad (10)$$

$$\phi = \sin^{-1}(Y/Z)$$

where $\sin^{-1}$ indicates the inverse transform of sin.

Then, using the horizontal and vertical sizes and angular pitches of the image sensing surface of the combined image data, the pixel address of the image data before plane projection transformation corresponding to the spherical coordinate system obtained in step S175 is calculated (step S176).

As in the processing in step S125, RGB data as the pixel value at the pixel address obtained in step S176 is copied as that at the pixel address of the image data after plane projection transformation (step S177).

Figure 27:
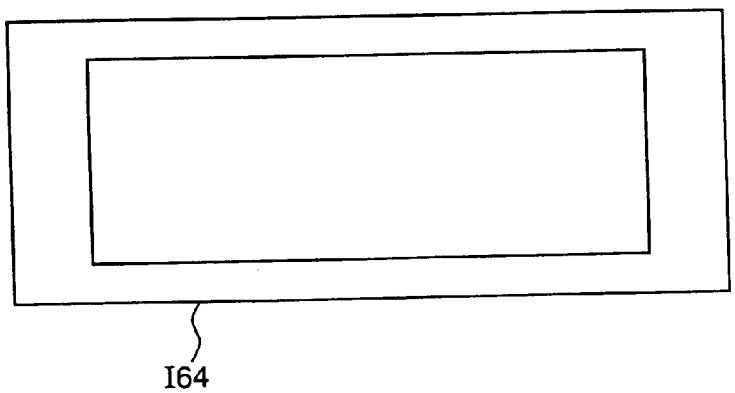
FIG. 27 is a plan view showing a plane projection combined image obtained by the plane projection transforming processing.

With the above-mentioned processing in step S17, the plane combined image $I_{64}$ obtained by projecting the combined image data obtained in step S16 onto the plane, as shown in, e.g., FIG. 27, is obtained, and thereafter, the memory area assured for storing the plane combined image data in step S171 is released.

Finally, the plane combined image data obtained in step S17 is displayed on the screen of the display device 173, and is stored in the image memory 130 as needed (step S18).

As described above, since the electronic camera 100 is designed so that translations of an image upon image combination correspond to horizontal and vertical panning operations of an image upon image sensing, when two images obtained by sensing an object image while panning the camera about the focal point position of the image sensing lens 101 are to be combined, frame lines can be prevented from duplicating themselves in the overlapping portion of the combined image even when the camera slightly tilts during image sensing.

Therefore, the electronic camera 100 can obtain a natural combined image as if it were sensed by a camera lens having a wider angle than that of the camera lens actually used.

Note that the above-mentioned electronic camera is assumed to have the same arrangement as that of the electronic camera 100 shown in FIG. 1. For example, the electronic camera may have the same arrangement as that of the electronic camera 200 shown in FIG. 17.

<Modification of First Embodiment> . . . Fifth Modification

The fifth modification will be described below with reference to the accompanying drawings.

Figure 28:
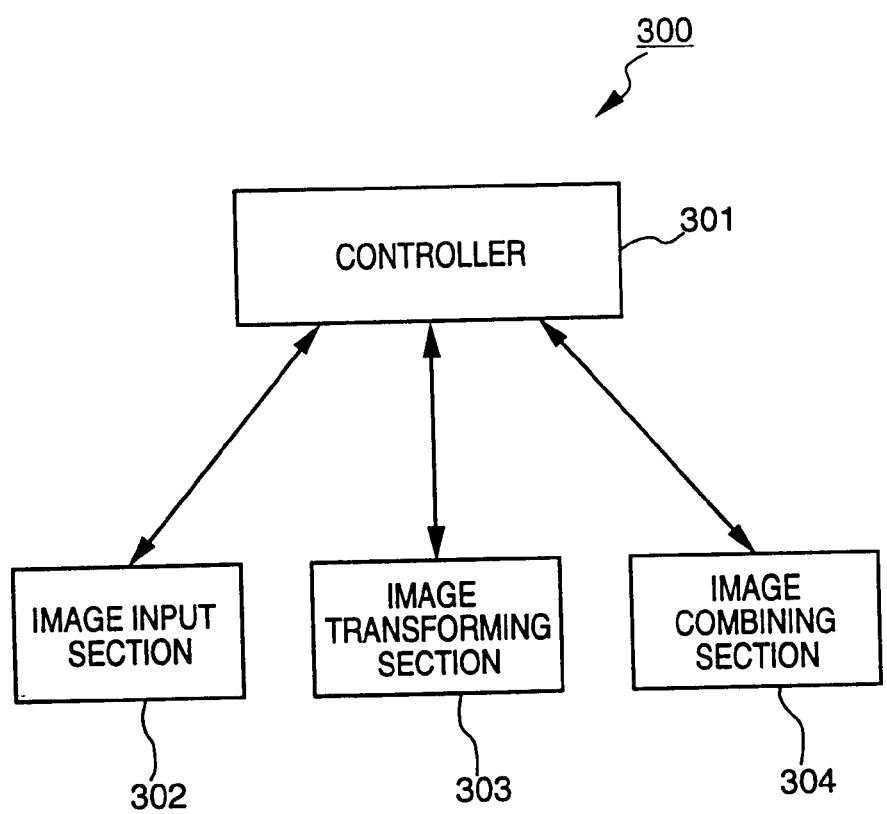
FIG. 28 is a block diagram showing the arrangement of an image combining unit of an electronic camera system to which an image sensing apparatus according to the present invention is applied in the fifth modification of the present invention.

An image combining apparatus according to the fifth modification is applied to, e.g., an electronic camera system which comprises an image combining unit 300, as shown in FIG. 28.

The electronic camera system (to be referred to as an electronic camera hereinafter) has substantially the same arrangement as that of the electronic camera 100 shown in FIG. 1, and the image combining unit 300 shown in FIG. 28 is arranged in place of the image combining apparatus 172. The image combining unit 300 is pre-set with a predetermined program, and executes processing in accordance with the program.

Note that the electronic camera of this modification is substantially the same as the electronic camera 100 shown in FIG. 1 except for the image combining unit 300, and a detailed description other than the image combining unit 300 will be omitted.

As shown in FIG. 28, the image combining unit 300 comprises a controller 301, and an image input section 302, an image transforming section 303, and an image combining section 304, which are connected to the controller 301.

The controller 301 controls the operation of the overall apparatus to execute the processing in accordance with the program, and supplies control signals to the image input section 302, the image transforming section 303, and the image combining section 304 in accordance with user's operations at an operation unit (not shown). With this processing, a combined image or the like obtained by the image combining section 300 is displayed on the screen of the display device 173 shown in FIG. 1.

The image input section 302 is pre-set with a program that executes the same processing as in step S11 shown in FIG. 19. With this program, the image input section 302 reads out a series of image data designated by the user onto a memory (not shown) on the basis of the control signal from the controller 301.

The image transforming section 303 is pre-set with a program that executes the same processing as in steps S12, S13, and S17 shown in FIG. 19. With this program, the image transforming section 303 executes distortion correction, spherical projection transformation, and plane projection transformation for the plurality of image data read out by the image input section 302 on the basis of the control signal from the controller 301.

The image combining section 304 is pre-set with a program that executes the same processing as in steps S14 to S16 shown in FIG. 19. With this program, the image combining section 304 executes corresponding point extraction, calculations of the parameters used for combining the plurality of image data on the basis of the coordinate positions of corresponding points obtained by the corresponding point extraction, and combining processing for generating a combined image by translating and rotating images in accordance with the parameters obtained by the parameter calculations.

Figure 54:
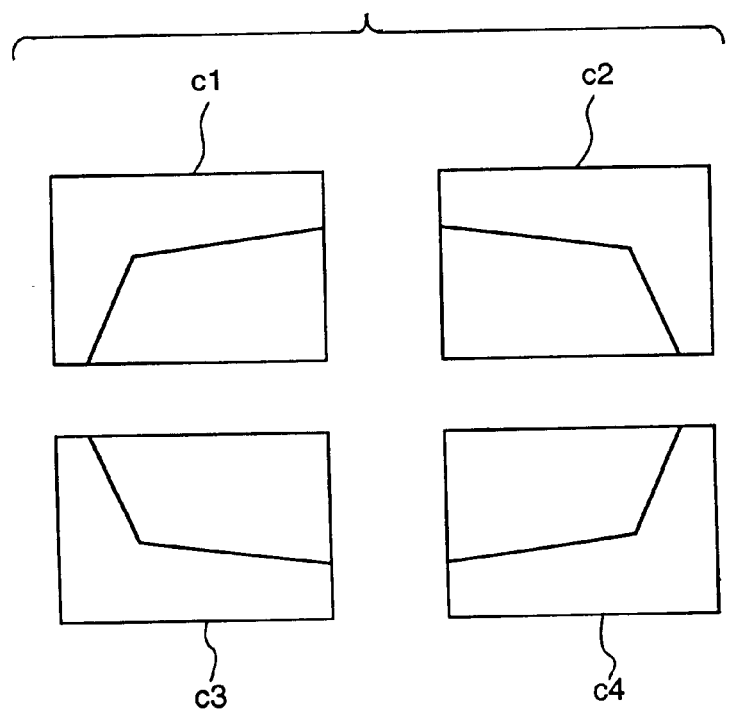
FIG. 54 is a plan view showing four images obtained by sensing a rectangular frame at four framing positions by the electronic camera system.
Figure 55:
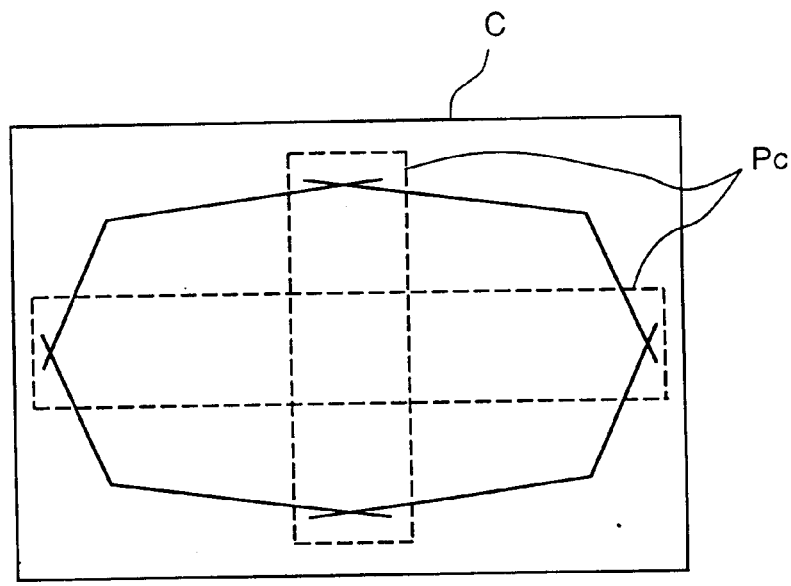
FIG. 55 is a plan view showing a combined image obtained by combining the four images by only translation without projecting images onto a columnar surface.
Figure 56:
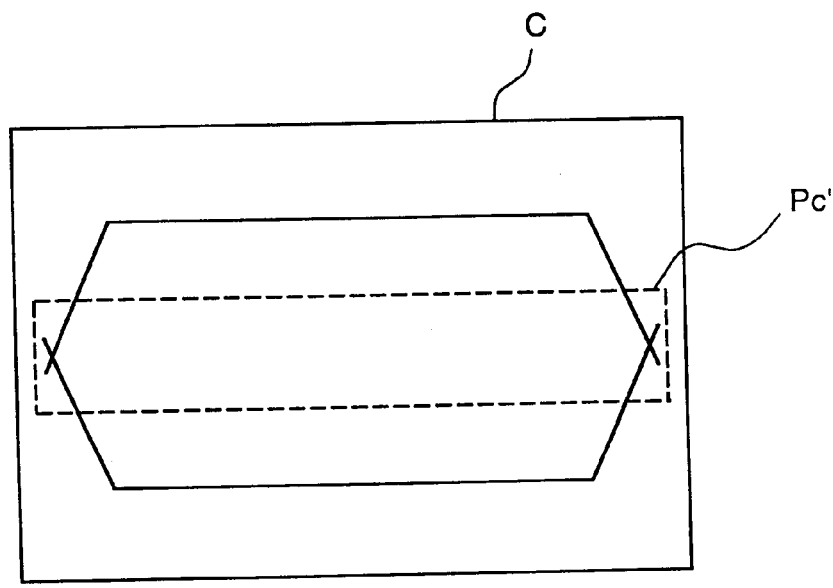
FIG. 56 is a plan view showing a combined image obtained by combining the four images by temporarily projecting the images onto a columnar surface and then translating the projected images.

A case will be explained below wherein images $c_1$ to $c_4$ obtained by sensing an object at four framing positions by panning the camera in both the horizontal and vertical directions, as shown in, e.g., FIG. 54, are to be combined by the above-mentioned image combining unit 300. In this case, the user operates an operation unit (not shown) to input instructions (commands) for combining the images $c_1$ and $c_2$, and the images $c_3$ and $c_4$. and combining the obtained combined images to the apparatus. The images $c_1$ to $c_4$ are stored in the image memory 130, and the parameters such as the image size, pixel pitches, focal length, and the like required in image transformation are given in advance.

Figure 29:
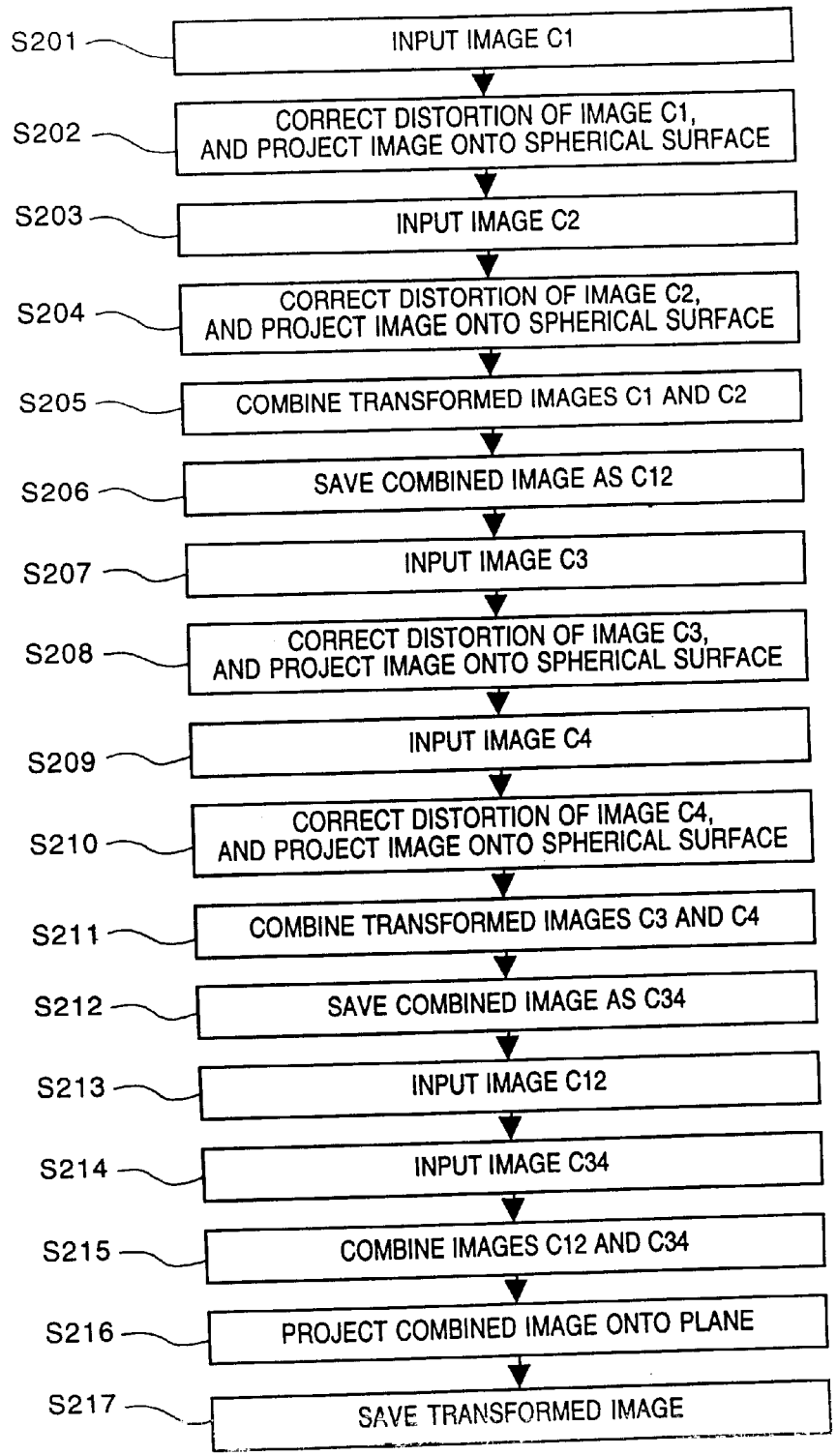
FIG. 29 is a flow chart showing the processing of the image processing unit.

FIG. 29 is a flow chart showing the processing of the image combining unit 300 in the above-mentioned case. The operations of the individual sections of the image combining unit 300 and image combination will be explained below with reference to FIG. 29.

The image input section 302 reads out the data of the image $c_1$ stored in the image memory 130 onto a memory (not shown) on the basis of a control signal from the controller 301 (step S201). The readout image $c_1$ is displayed on the screen of the display device 173 under the control of the controller 301.

The user confirms the image $c_1$ displayed on the screen of the display device 173, and operates the operation unit (not shown) to input commands to the apparatus, so that the image transforming unit 303 executes distortion correction and spherical projection transformation for the image $c_1$. When the controller 301 supplies a control signal to the image transforming section 303 on the basis of the command, the image transforming section 303 executes distortion correction and spherical projection transformation for the image $c_1$ (step S202).

The controller 301 displays the image $c_1$, which has been subjected to the distortion correction and spherical projection transformation by the image transforming section 303, on the screen of the display device 173.

Also, as in the processing in steps S201 and S202, the image $c_2$ is read out onto the memory, is subjected to the distortion correction and spherical projection transformation, and is then displayed on the screen of the display device 173 (steps S203 and S204). Subsequently, the user operates the operation unit (not shown) to designate a plurality of sets of corresponding points between the two images $c_1$ and $c_2$ displayed on the display device 173. When the controller 301 supplies a control signal to the image combining section 304 on the basis of these designations, the image combining section 304 executes template matching for the individual corresponding points so as to calculate the coordinate positions of the plurality of sets of designated corresponding points and to detect the accurate positions of the corresponding points. The image combining section 304 calculates the translation parameters and rotation parameter between the two images $c_1$ and $c_2$ on the basis of the corresponding point positions detected by the plate matching using the method of least squares, and combines the two images $c_1$ and $c_2$ on the basis of the calculated parameters (step S205). The controller 301 displays a combined image $c_{12}$ (FIG. 30) obtained by the image combining section 304 on the screen of the display device 173. The controller 301 temporarily stores the combined image $c_{12}$ in the image memory 130 (step S206).

Figure 30:
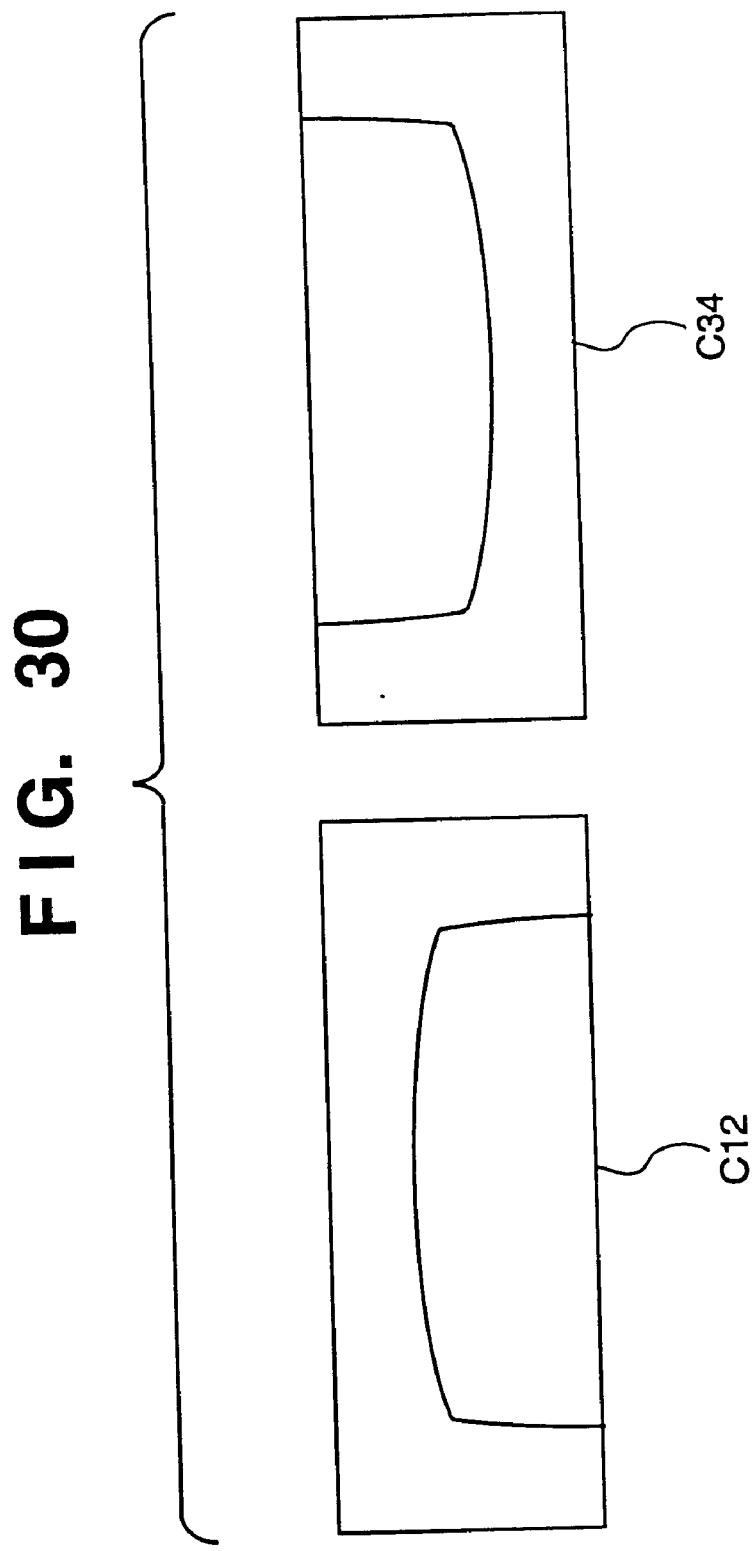
FIG. 30 is a plan view showing two combined images each obtained by combining two spherical projection images by the image combining unit.

As in steps S201 to S206, the two images $c_3$ and $c_4$ are combined to generate a combined image $c_{34}$, as shown in FIG. 30, and the combined image $c_{34}$ is temporarily stored in the image memory 130 (steps S207 to S212).

The image input section 302 reads out the two combined images $c_{12}$ and $c_{34}$ stored in the image memory 130 onto the memory (not shown) on the basis of a control signal from the controller 301 (steps S213 and S214).

Figure 31:
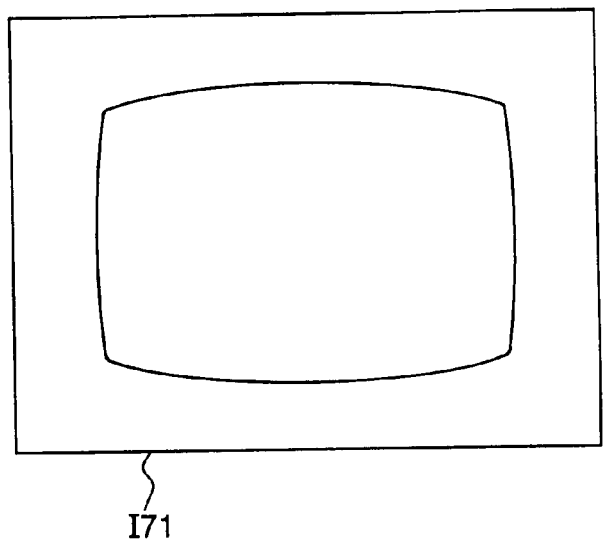
FIG. 31 is a plan view showing a combined image obtained by combining the two combined images.

Subsequently, the image combining section 304 combines the two combined images $c_{12}$ and $c_{34}$ as in the processing in steps S205 and S211 (step S215). Since the combined images $c_{12}$ and $c_{34}$ are images which have already been subjected to the distortion correction and spherical projection transformation in the image transforming section 303, the image transforming section 303 need not execute the distortion correction and spherical projection transformation. In step S215, a combined image $I_{71}$ is obtained by combining the four images $c_1$ to $c_4$, as shown in FIG. 31. Note that the combined image $I_{71}$ will be referred to as a spherical combined image hereinafter since it is obtained by combining two images subjected to spherical projection transformation.

Figure 32:
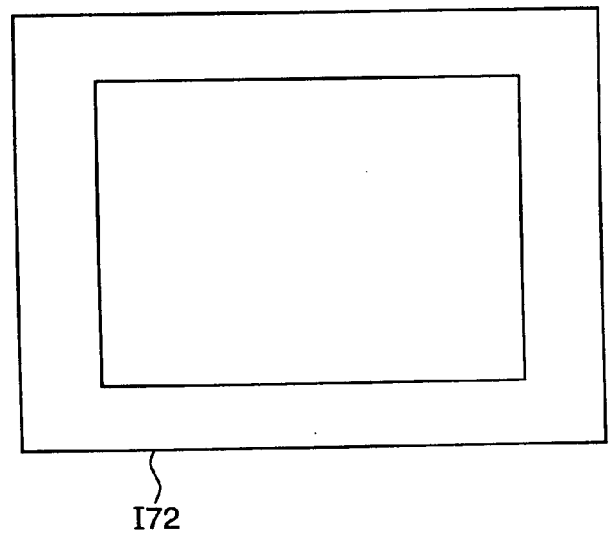
FIG. 32 is a plan view showing an image obtained as a result of plane projection transforming processing of the combined image.

The image transforming section 303 obtains a plane combined image $I_{72}$ shown in FIG. 32 by projecting and transforming the spherical combined image $I_{71}$ obtained by the image combining section 304 onto a plane (step S216).

The controller 301 stores the plane combined image $I_{72}$ obtained by the image transforming section 303 in the image memory 130 (step S217).

As described above, since the electronic camera executes image combination in accordance with predetermined commands input by user's operations at the operation unit (not shown), the user can obtain a desired combined image.

Since this electronic camera generates a combined image by sequentially repeating processing for combining two out of a plurality of images obtained by sensing an object image by panning the camera in both the horizontal and vertical directions about the focal point position of the camera, and projects and transforms the combined image onto the plane again, a natural combined image with a wide field angle can be obtained as if it were sensed using a camera lens having a wider angle than the camera lens actually used.

When the images to be combined by the image combining unit 300 shown in FIG. 28 are always images subjected to spherical projection transformation, the processing of the image transforming section 303 may be automated. More specifically, a flag indicating if the data has already been subjected to distortion correction (distortion correction flag), and a flag indicating if data has already been subjected to spherical or plane projection transformation (projection surface flag) are added as additional information to the image data to be combined by the image combining unit 300.

When the image transforming section 303 performs distortion correction, it sets the distortion correction flag to indicate that the data has already been subjected to distortion correction; when the section 303 performs spherical projection transformation, it sets the projection surface flag to indicate that the data has already been subjected to spherical projection transformation; and when the section 303 performs plane projection transformation, it sets the projection surface flag to indicate that the data has already been subjected to plane projection transformation.

Upon executing image combination, the image combining section 304 always outputs a combined image subjected to plane projection transformation on the basis of the additional information of the image data to be combined.

With the above arrangement, a high-quality combined image can be obtained efficiently.

The above-mentioned electronic camera can obtain a natural combined image as if it were sensed by a camera lens with a wider angle than the camera lens actually used, by executing the plane projection transformation. However, the camera need not always output a combined image subjected to plane projection transformation.

More specifically, since the electronic camera generates a combined image by sequentially repeating processing for combining two images, it can combine five or more images.

However, when the field of view of the combined image has reached 180°, plane projection transformation can no longer be performed. In such case, it is preferable to output a combined image subjected to spherical projection transformation.

Accordingly, one of an image obtained by plane projection transformation and an image obtained by spherical projection transformation may be selectively output in correspondence with the field of view of the combined image.

In the above-mentioned electronic camera, the parameters such as the image size, pixel pitches, focal length, and the like required in image transformation are given in advance. Alternatively, these parameters may be added to the image data to be combined by the image combining unit 30 as additional information. In this case, the image transforming section 303 and the image combining section 304 read out the parameters from the additional information added to the image data to be combined, and execute processing on the basis of the readout parameters. At this time, preferably, the pitches on the image sensing surface are used as pixel pitch parameters for an image subjected to the plane projection transformation, and angular pitches are used as pixel pitch parameters for an image subjected to spherical projection transformation.

The above-mentioned electronic camera has the same arrangement as that of the electronic camera 100 shown in FIG. 1. Alternatively, the electronic camera may have the same arrangement as that of the electronic camera 200 shown in FIG. 17.

<Modification of First Embodiment> . . . Sixth Modification

The sixth modification will be described below with reference to the accompanying drawings.

Figure 33:
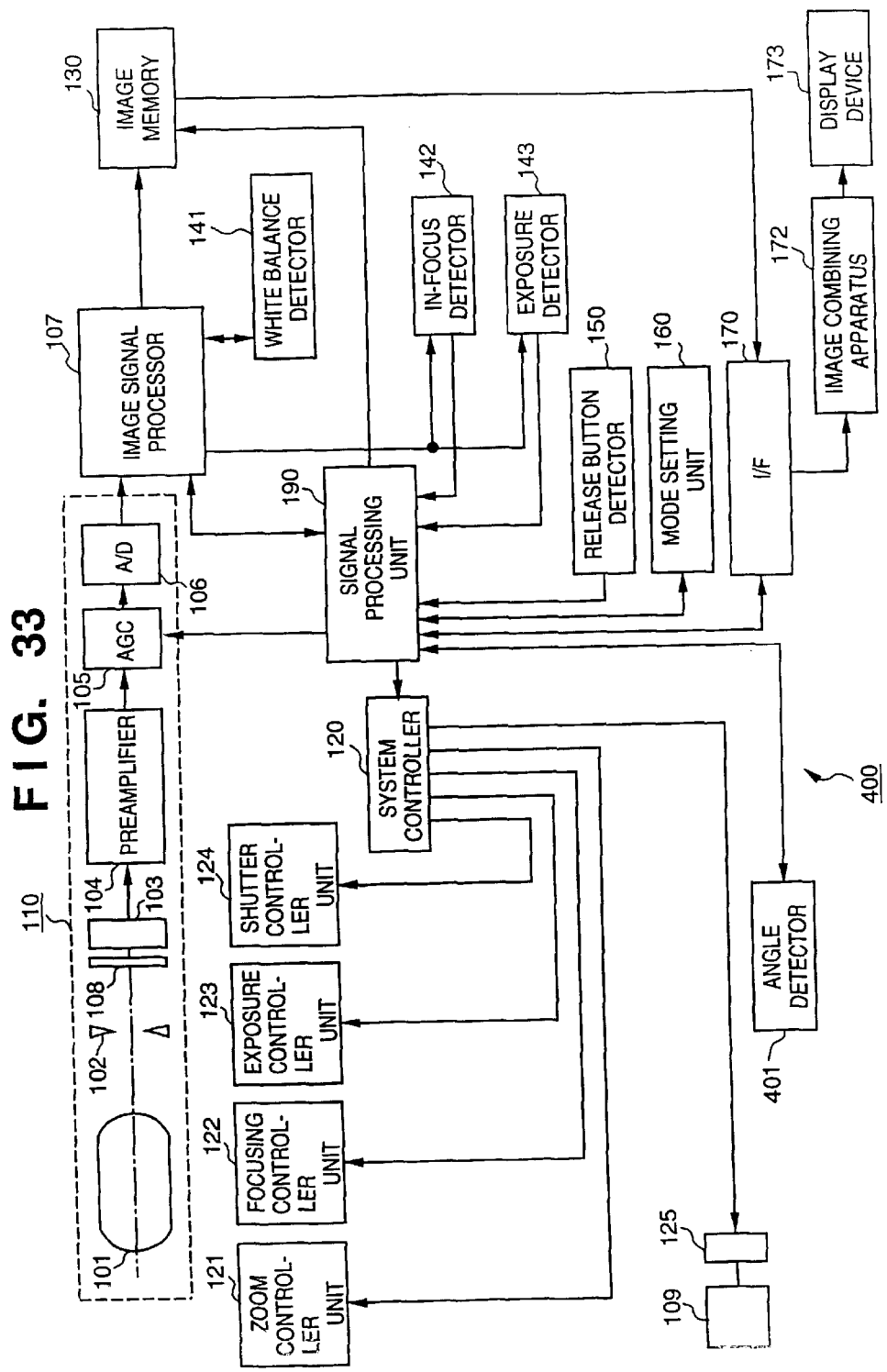
FIG. 33 is a block diagram showing the arrangement of an electronic camera system to which an image combining apparatus according to the present invention is applied in the sixth modification of the present invention.

An image combining apparatus according to the sixth modification is applied to, e.g., an electronic camera system 400 shown in FIG. 33.

The electronic camera system (to be simply referred to as an electronic camera hereinafter) 400 comprises an angle detector 401 connected to the signal processing unit 190 in addition to the constituting elements of the electronic camera 100 shown in FIG. 1, as shown in FIG. 33. The angle detector 401 uses a gyro or the like, and detects the panning angle produced upon movement of the electronic camera during image sensing. The electronic camera 400 performs image combination on the basis of the panning angle information detected by the angle detector 401.

Note that the same reference numerals in the electronic camera 400 shown in FIG. 33 denote the same parts as in the electronic camera 100 shown in FIG. 1, and a detailed description thereof will be omitted.

As for the operation of the image combining apparatus 172 to be described later, the operations different from those in the first embodiment will be described in detail, and a detailed description of the same operations as in the first embodiment will be omitted.

Figure 34:
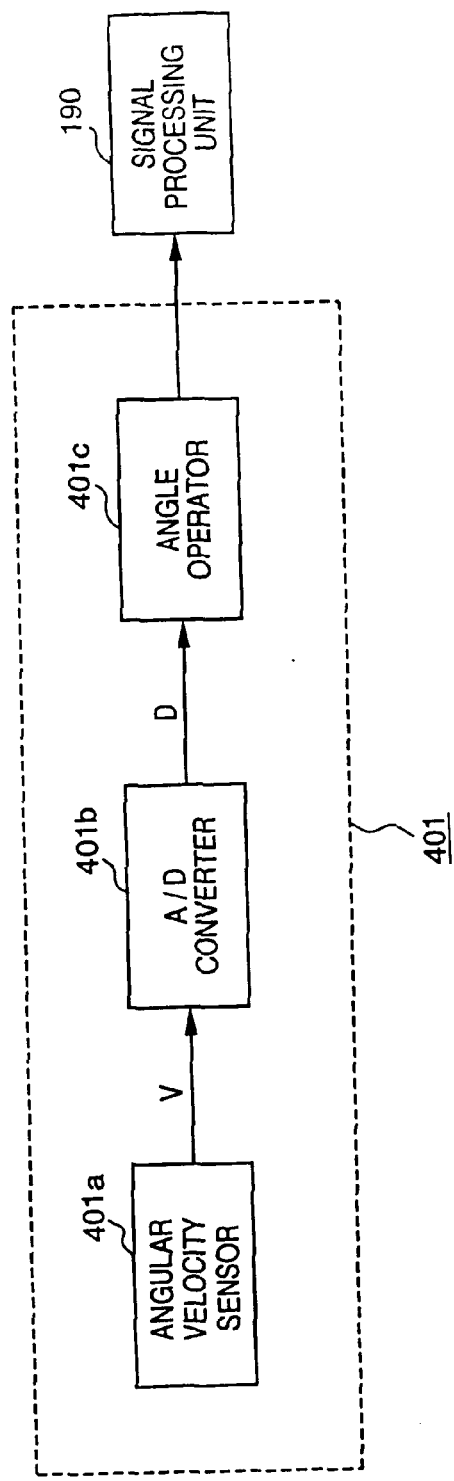
FIG. 34 is a block diagram showing the arrangement of an angle detector of the electronic camera system.

More specifically, as shown in FIG. 34, the angle detector 401 comprises an angular velocity sensor 401a, an A/D converter 401b which receives the output from the angular velocity sensor 401a, and an angle operator 401c which receives the output from the A/D converter 401b. The output from the angle operator 401c is supplied to the signal processing unit 190.

The angular velocity sensor 401a supplies an output signal V according to changes in angle produced upon movement of the apparatus to the A/D converter 401b. The level of the angular velocity sensor 401a is proportional to the angular velocity. The A/D converter 401b converts the output signal V from the angular velocity sensor 401a into digital data D, and supplies it to the angle operator 401c. The angle operator 401c integrates the digital data D from the A/D converter 401b for, e.g., one second to obtain an average level $D_{avg}$, and converts the average level $D_{avg}$ into an angular component to obtain an angle signal. The angle signal obtained by the angle operator 401c is supplied to the signal processing unit 190. The signal processing unit 190 writes the information of the angle signal obtained by the angle detector 401 in a header portion in the image memory 130 in correspondence with image data to be written in the image memory 130.

In the image combining apparatus 172, as shown in FIG. 10, the header/data separator 172f separates each image data read out from the image memory 130 into a header portion and a data portion, supplies information in the header portion (header information) to the controller 172e, and writes information in the data portion (image information) in the image memory 172g.

The controller 172e compares the information of the angular component upon image sensing included in the header information supplied from the header/data separator 172f with a predetermined threshold value. When the angular component is equal to or larger than the threshold value, the controller 172e determines long-distance panoramic image sensing; when the angular component is smaller than the threshold value, it determines short-distance panoramic image sensing, and in either case supplies the discrimination result to the selector 172k.

The selector 172k selects one of the parameter extractors 172c and 172d in accordance with the discrimination result from the controller 172e, and supplies information of corresponding points obtained by the corresponding point detector 172b to the selected parameter extractor.

Thereafter, a combined image is produced by executing the same processing as in the first embodiment described above.

As described above, since the electronic camera 400 automatically selects the image combining method on the basis of the angular component produced upon movement of the apparatus during image sensing, appropriate image combination can be done in correspondence with movement of the apparatus such as panning. Accordingly, the electronic camera 400 can efficiently obtain a high-quality panoramic image.

Note that the above-mentioned electronic camera 400 detects the angular component produced upon movement of the electronic camera 400 by arranging the angular velocity sensor 401a. Alternatively, the electronic camera 400 may detect the translation component (translation amount) produced upon movement of the electronic camera 400 by arranging an acceleration sensor or the like. In this case, in the image combining apparatus 172, when the detected translation amount upon image sensing is larger than a predetermined threshold value, the controller 172e determines short-distance panoramic image sensing; when the translation amount is smaller than the threshold value, it determines long-distance panoramic image sensing. In this case as well, a high-quality panoramic image can be efficiently obtained as in the case wherein the angular component is detected.

<Advantages> . . . First Embodiment

As described above, according to the image combining apparatus of the first embodiment, since a combined image is produced by an appropriate image combining method selected in correspondence with the image sensing conditions, a high-quality combined image can always be obtained.

Since a combined image is automatically generated without requiring any user's operations for image combination, the load on the user can be reduced, and combining processing can be easily realized.

Since it is automatically discriminated based on focal point position information if the images to be combined are obtained by short- or long-distance image sensing, and a combined image is generated by an appropriate image combining method selected in correspondence with the discrimination result, a high-quality combined image can be easily obtained independently of the object distance.

Upon combining a plurality of images, since the image portion to be connected to a neighboring one of the plurality of images is transformed on the basis of the image sensing conditions to prevent the connected portions from standing out, a natural combined image with high image quality can be obtained.

Also, since the density level of the image portion to be connected to a neighboring one of a plurality of images is corrected on the basis of the image sensing conditions to prevent the connected portion from becoming conspicuous, a natural combined image with high image quality can be obtained.

Since a plurality of images to be combined are subjected to spherical transforming processing on the basis of the image sensing conditions, a natural combined image with high image quality, from which distortion is removed, can be obtained.

Even when a plurality of images obtained by panning the camera in both the horizontal and vertical directions about the focal point position upon image sensing are to be combined, the image portion to be connected to a neighboring one of the plurality of images can be prevented from overlapping, thus obtaining a natural combined image with high image quality.

Since the combined image is projected and transformed onto a plane again, a high-quality combined image can be obtained as if it were sensed using a camera lens having a wider angle than that of the camera lens actually used. For example, when the combining processing of two images is sequentially repeated, a combined image with a wider field angle can be obtained from a large number of images sensed at free framing positions.

Since spherical projection transformation and plane projection transformation are automatically executed without requiring any instructions, a high-quality combined image can be easily obtained.

Since a combined image is generated by an appropriate image combining method corresponding to the field angle of the combined image, a high-quality combined image can always be obtained independently of the field of view of the images to be sensed.

Since short- or long-distance image sensing is automatically performed in accordance with the object distance without requiring any use's operations for short- or long-distance image sensing, a combined image can be easily obtained.

Since the image combining method is switched in correspondence with image sensing information upon image sensing, image combination can be optimized for the movement information of the apparatus. Therefore, a high-quality combined image can be efficiently obtained. For example, image combination can be optimized for the movement of the apparatus such as panning.

<Second Embodiment>

An image combining system (electronic camera system) according to the second embodiment of the present invention will be described hereinafter with reference to the accompanying drawings.

Figure 35:
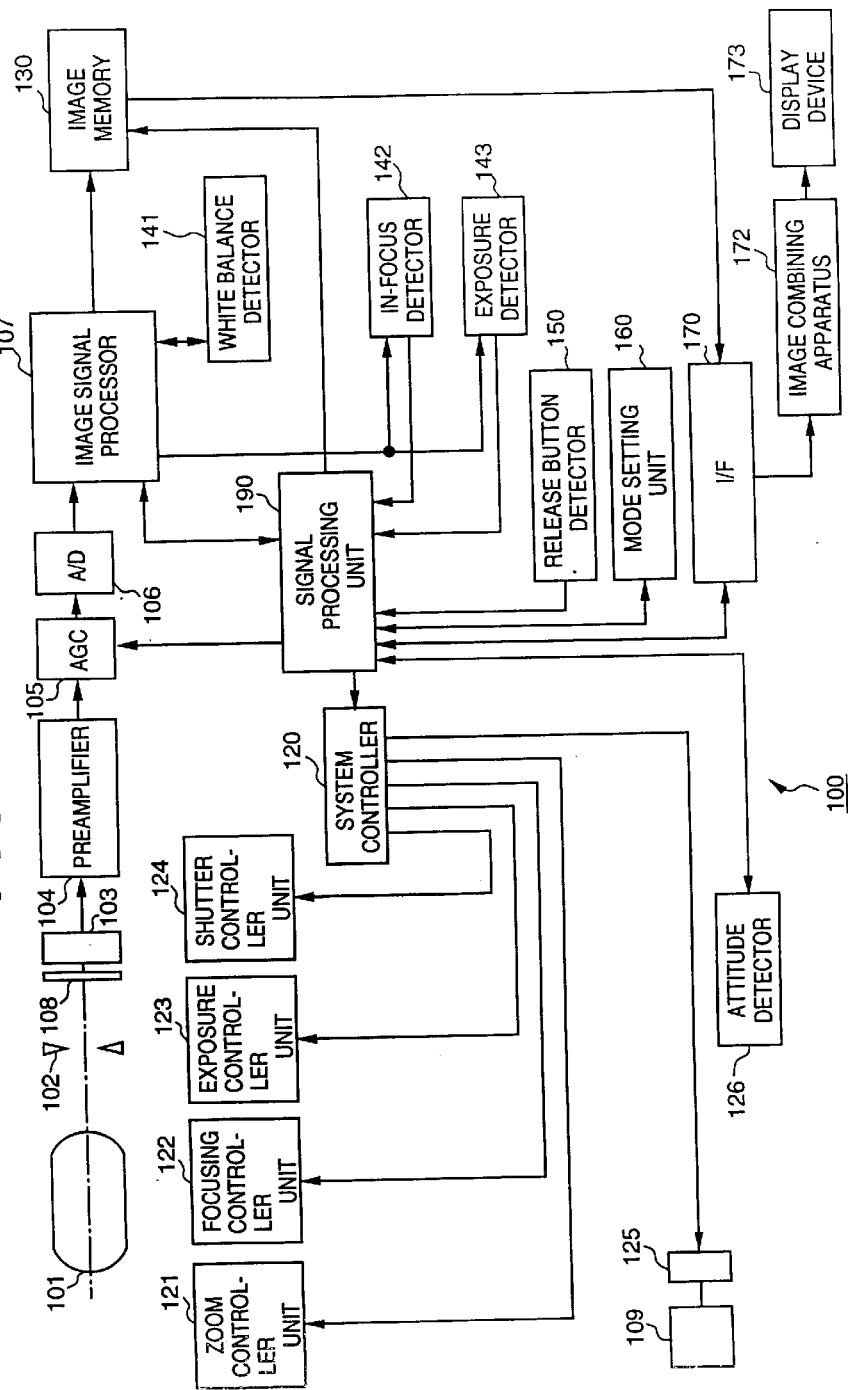
FIG. 35 is a block diagram showing the arrangement of an electronic camera system in the second embodiment of the present invention.

The electronic camera system according to the second embodiment is applied to, e.g., an electronic camera system shown in FIG. 35.

<Arrangement of Electronic Camera> . . . Second Embodiment

The electronic camera system (to be simply referred to as an electronic camera hereinafter) 100 is substantially the same as the electronic camera 100 of the first embodiment (FIG. 1), except that it comprises an attitude detector 126, as shown in FIG. 35. The attitude detector 126 is substantially equivalent to the angle detector 401 used in the sixth modification.

The attitude detector 126 uses a gyro or the like, and detects, as an angular component, the attitude of the camera 100 produced upon movement of the electronic camera 100 during image sensing. The attitude detector 126 is connected to a signal processing unit 190.

Figure 36:
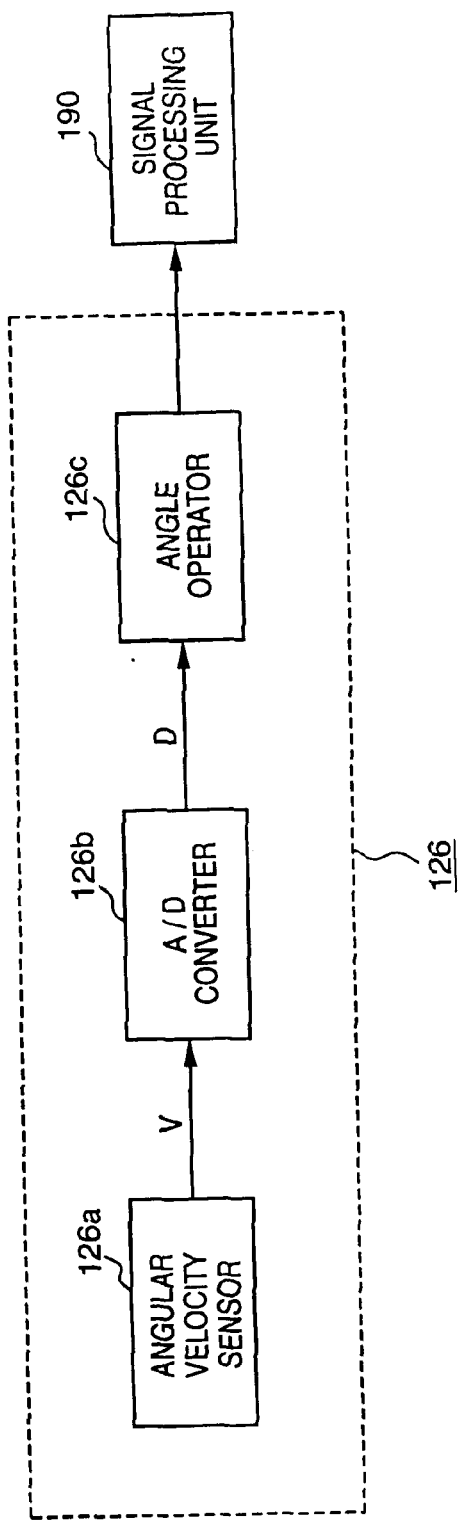
FIG. 36 is a block diagram showing the arrangement of an angle detector in the electronic camera system.

As shown in FIG. 36, the attitude detector 126 comprises an angular velocity sensor 126a, an A/D converter 126b which receives the output from the angular velocity sensor 126a, and an angle operator 126c which receives the output from the A/D converter 126b. The angle operator 126c outputs the attitude of the camera as angle data on the basis of the angular velocity. The output from the angle operator 126c is supplied to the signal processing unit 190. The angular velocity sensor 126a supplies an output signal V according to changes in angle produced upon movement of the apparatus to the A/D converter 126b. The level of the angular velocity sensor 126a is proportional to the angular velocity. The A/D converter 126b converts the output signal V from the angular velocity sensor 126a into digital data D, and supplies it to the angle operator 126c.

The angle operator 126c integrates the digital data D from the A/D converter 126b for, e.g., one second to obtain an average level $D_{avg}$, and converts the average level $D_{avg}$ into an angular component to obtain an angle signal. The angle signal obtained by the angle operator 126c is supplied to the signal processing unit 190.

Accordingly, the electronic camera 100 generates a panoramic image using the angle signal obtained by the attitude detector 126, as described above, in addition to information associated with the image sensing conditions upon image sensing.

Panoramic image sensing will be explained below.

In the electronic camera 100, an image sensing mode such as the normal image sensing mode, the panoramic image sensing mode, or the like can be set by operating a mode setting unit 160. For example, when the panoramic image sensing mode is set, and a landscape 20 at the long-distance position shown in FIG. 38 is to be sensed, the image sensing region changes little even by translating the electronic camera 100 in the vertical and horizontal directions unlike in the case wherein an object at the short-distance position is to be sensed.

For this reason, as shown in FIG. 37, in the state wherein the electronic camera 100 is set at a position $P_{21}$ (state 1), a region $R_{21}$ of the landscape 20 is sensed by rotating the camera about the Y-axis (panning) or rotating the camera about the X-axis (tilting) (XYZ coordinate system; $\Psi$, $\Phi$, and $\theta$ respectively represent the rotation angles about the X-, Y-, and Z-axes).

Even in the states wherein the electronic camera 100 is set at positions $P_{22}$ and $P_{23}$ (state 2 and state 3), regions $R_{22}$ and $R_{23}$ of the landscape 20 are sensed by panning or tilting the camera as in the case at the position $P_{21}$. In this case, image sensing is done so that the regions $R_{21}$ and $R_{22}$ partially overlap each other, and the regions $R_{22}$ and $R_{23}$ partially overlap each other. Accordingly, image sensing at the position $P_{21}$ produces an image $I_{21}$, image sensing at the position $P_{22}$ an image $I_{22}$, and image sensing at the position $P_{23}$ an image $I_{23}$, as shown in FIG. 38.

These three images $I_{21}$, $I_{22}$, and $I_{23}$ are combined by an image combining apparatus 172 using the angle signals obtained by the attitude detector 126 described above, thus obtaining a panoramic image 124 having smoothly connected portions (dotted line portions), as shown in FIG. 39.

<Operation of Electronic Camera> . . . Second Embodiment

The operation of the electronic camera 100 according to the second embodiment will be described in detail below.

An object image is projected by an image sensing lens 101 onto the light-receiving surface of an image sensing element 103 via a stop 102.

At this time, the zoom position and focusing position of the image sensing lens 101 are respectively controlled by a zoom controller unit 121 and a focusing controller unit 122 connected to a system controller 120. Also, the aperture value of the stop 102 is controlled by an exposure controller unit 123 connected to the system controller 120.

The image sensing element 103 comprises, e.g., a CCD (Charge Coupled Device) or the like, which converts the received object image into an electrical signal, and supplies the electrical signal to a preamplifier 104. The preamplifier 104 amplifies the electrical signal (to be referred to as a video signal hereinafter) from the image sensing element 103, and supplies the amplified video signal to an AGC circuit 105. The AGC circuit 105 amplifies or attenuates the video signal from the preamplifier 104 on the basis of a control signal from the signal processing unit 190, and supplies the signal to an A/D converter 106.

The A/D converter 106 converts the video signal from the AGC circuit 105 into digital image data, and supplies the digital image data to an image signal processor 107. At this time, the signal processing unit 190 detects the signal level of the image data supplied to the image signal processor 107. When the detected signal level is lower than a predetermined level, the signal processing unit 190 generates a control signal for raising the gain of the image signal in the AGC circuit 105 and supplies the control signal to the AGC circuit 105; when the detected signal level is higher than the predetermined level, the signal processing unit 190 generates a control signal for lowering the gain of the image signal in the AGC circuit 105 and supplies the control signal to the AGC circuit 105. With this control, the video signal output from the AGC circuit 105 becomes a signal having a predetermined level width, which is suitable for signal processing executed in the image signal processor 107.

The image signal processor 107 executes predetermined signal processing for the image data supplied from the A/D converter 106, and stores the processed data in an image memory 130. Also, the image signal processor 107 supplies the image data to a white balance detector 141, in-focus detector 142, and exposure detector 143. The white balance detector 141 detects the white balance state of the image data supplied from the image signal processor 107, and supplies the detection result to the image signal processor 107.

The in-focus detector 142 detects the focal point of the image sensing lens 101 on the basis of the image data supplied from the image signal processor 107, and supplies the detection result to the signal processing unit 190.

The exposure detector 143 detects the exposure amount in the image sensing element 103 on the basis of the image data supplied from the image signal processor 107, and supplies the detection result to the signal processing unit 190.

The image signal processor 107 adjusts the color balance of the image data supplied from the A/D converter 106 on the basis of the detection result from the white balance detector 141. Therefore, the image memory 130 stores the image data whose color balance has been adjusted.

The signal processing unit 190 generates a control signal for setting image sensing conditions on the basis of the detection results from the in-focus detector 142 and the exposure detector 143, and supplies the control signal to the system controller 120. The signal processing unit 190 stores information associated with the image sensing conditions in the image memory 130.

The system controller 120 supplies control signals to the zoom controller unit 121, the focusing controller unit 122, the exposure controller unit 123, the shutter controller unit 124, and a flash controller unit 125 on the basis of the control signal from the signal processing unit 190.

Accordingly, the zoom controller unit 121, the focusing controller unit 122, and the exposure controller unit 123 respectively control the zoom position of the image sensing lens 101, the focusing position of the image sensing lens 101, and the aperture value of the stop 102 to attain appropriate states on the basis of the control signals from the system controller 120.

As described above, the image sensing conditions in the electronic camera 100 are appropriately set.

The photographer operates the mode setting unit 160 to set the image sensing mode in, e.g., the panoramic image sensing mode, and starts image sensing.

Also, the photographer instructs setting (locking) of the image sensing conditions or execution of image sensing by operating a release button (not shown).

The mode setting unit 160 detects the image sensing mode set by photographer's operations, and supplies a detection signal to the signal processing unit 190.

A release button detector 150 detects whether the release button is pressed to its first or second stroke position, and supplies a detection signal to the signal processing unit 190.

The attitude detector 126 generates an angle signal on the basis of changes in angle produced upon movement of the electronic camera 100, as described above, and supplies it to the signal processing unit 190.

A position sensor (not shown) detects the three-dimensional position, direction, and the like of the electronic camera 100, and supplies a detection signal to the signal processing unit 190.

The signal processing unit 190 generates a control signal corresponding to the set image sensing mode on the basis of the detection signal from the mode setting unit 160, and supplies it to the system controller 120.

When it is determined based on the detection signal from the release button detector 150 that the release button is pressed to its first stroke position, the signal processing unit 190 generates a control signal for locking the image sensing conditions, and supplies it to the system controller 120.

At the same time, the signal processing unit 190 resets the detection signal from the position sensor and the angle signal from the attitude detector 126.

On the other hand, when it is determined based on the detection signal from the release button detector 150 that the release button is pressed to its second stroke position, the signal processing unit 190 generates a control signal for performing a shutter operation, and supplies it to the system controller 120.

The system controller 120 supplies control signals to the zoom controller unit 121, the focusing controller unit 122, the exposure controller unit 123, the shutter controller unit 124, and the flash controller unit 125 on the basis of the control signals from the signal processing unit 190, and also supplies control signals to the shutter controller unit 124 and the flash controller unit 125.

Therefore, the zoom position and focusing position of the image sensing lens 101, and the aperture value of the stop 102 are set in the states corresponding to photographer's operations. When the shutter controller unit 124 controls a shutter 108 on the basis of the control signal from the system controller 120, the shutter 108 is controlled to a shutter speed corresponding to photographer's operations. When the flash controller unit 125 controls a flash 109 on the basis of the control signal from the system controller 120, the ON/OFF operation of the flash 109 is controlled in accordance with photographer's operations.

When image sensing is started, as described above, image data output from the image signal processor 107 is stored in the image memory 130.

At this time, the signal processing unit 190 stores information associated with the image sensing conditions such as the focus position, focal length, identification information of the image sensing mode, and the like, the detection signal of the position sensor, and the angle signal from the attitude detector 126 in the image memory 130 as additional information in correspondence with image data output from the image signal processor 107.

The image combining apparatus 172 reads out data stored in the image memory 130 via an I/F 170 and generates a panoramic image.

Figure 40:
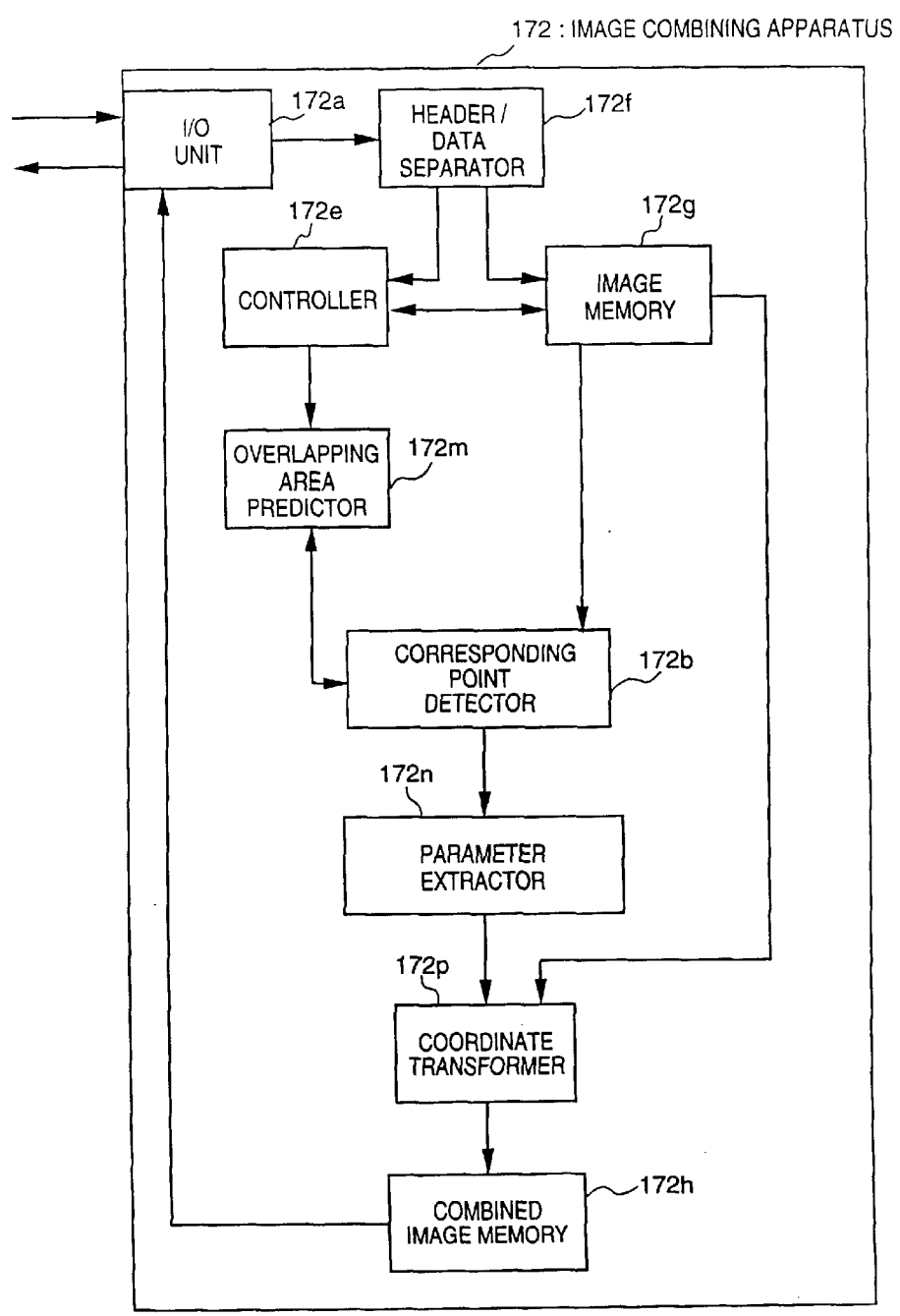
FIG. 40 is a block diagram showing the arrangement of an image combining apparatus of the electronic camera system.

More specifically, as shown in FIG. 40, the image combining apparatus 172 comprises a header/data separator 172*f* which receives image data from the I/F 170 shown in FIG. 35 via an input/output (I/O) unit 172*a*, a controller 172*e* and an image memory 172*g* which receive the output from the header/data separator 172*f*, a corresponding point detector 172*b* which receives the output from the image memory 172*g*, a parameter extractor 172*n* which receives the output from the corresponding point detector 172*b*, a coordinate transformer 172*p* which receives the output from the parameter extractor 172*n*, and a combined image memory 172*h* which receives the output from the coordinate transformer 172*p*. The output from the combined image memory 172*h* is supplied to a display device 173 shown in FIG. 35 via the I/O unit 172*a*.

Also, the image combining apparatus 172 comprises an overlapping area predictor 172*m* that receives the output from the controller 172*e*. The output from the overlapping area predictor 172*m* is supplied to the corresponding point detector 172*b*.

The controller 172*e* is connected to the image memory 172*g*, the output of which is also supplied to the coordinate transformer 172*p*.

In the image combining apparatus 172 with the above-mentioned arrangement, the header/data separator 172*f* separates data supplied from the I/O unit 172*a*, i.e., data stored in the image memory 130 and consisting of image data and additional information, stores the image data in the image memory 172*g*, and supplies the additional information to the controller 172*e*. The controller 172*e* controls the individual units on the basis of the additional information from the header/data separator 172*f*.

The controller 172*e* sequentially reads out image data corresponding to a series of images obtained by panoramic image sensing from the image memory 172*g* on the basis of the identification information of the image sensing mode included in the additional information, and supplies them to the corresponding point detector 172*b* and the coordinate transformer 172p. Furthermore, the controller 172e supplies the information of the detection signals of the focal length, three-dimensional position, and the like, and the angle signal included in the additional information to the overlapping area predictor 172m.

The overlapping area predictor 172m calculates the overlapping area between adjacent images by decoding the information of the detection signals of the focal length, three-dimensional position, and the like, and the angle signal supplied from the controller 172e.

The processing for calculating the overlapping area will be explained in detail below. For example, when images are panoramically sensed by panning the camera about an origin O, as shown in FIG. 41, the three-dimensional position information and the angle signal information are associated with only the rotation angle Φ about the Y-axis shown in FIG. 37.

Figure 41:
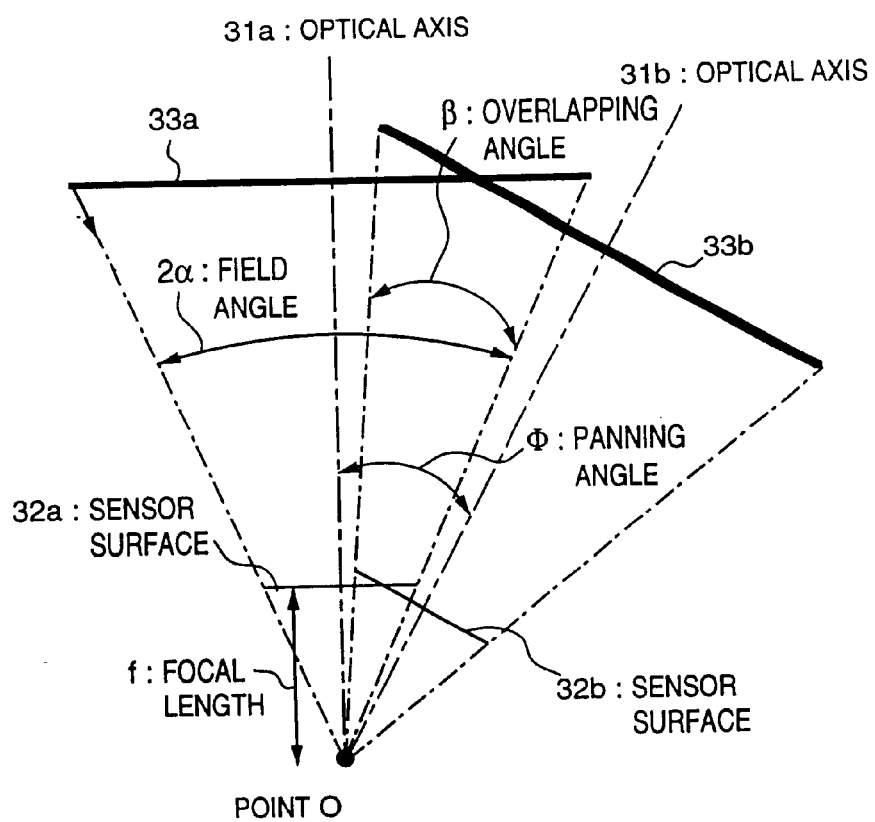
FIG. 41 is a view for explaining the processing for predicting the overlapping area by the image combining apparatus.

If Φ represents the panning angle (the angle an optical axis 31a makes with an optical axis 31b before and after panning), 2α represents the field angle of the electronic camera 100, and f represents the focal length (the distance from the origin O to sensor surfaces 32a and 32b) in FIG. 41, an overlapping angle β is obtained by the following equation (11):

$$\beta = 2\alpha - \Phi \quad (11)$$

On the other hand, if each of the sensor surfaces 32a and 32b has a size of H (mm)×V (mm), an area dx on each of the sensor surfaces 32a and 32b is obtained by the following equation (12):

$$dx = f \cdot (\tan(\alpha) - \tan(\alpha - \beta)) \quad (12)$$

If each of images 33a and 33b read out from the image memory 172g has a size of $n_x \times n_y$, an overlapping area S between the images 33a and 33b is obtained by the following equation (13):

$$S = n_x \cdot d_x / H \quad (13)$$

The overlapping area predictor 172m calculates the overlapping area between the images using equations (11) to (13) above. More specifically, the predictor 172m predicts the overlapping area on the basis of the information of the detection signals of the three-dimensional position and the like and the angle signal.

The overlapping area predictor 172m supplies the predicted overlapping area information to the corresponding point detector 172b.

Figure 42:
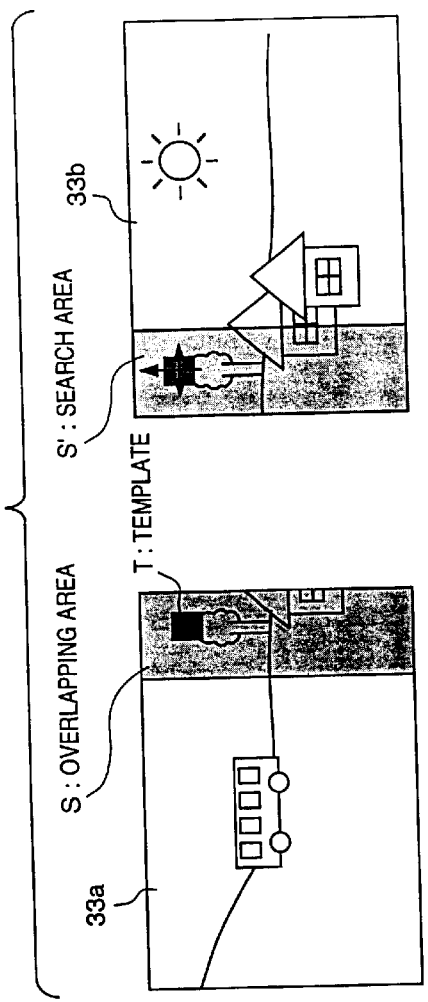
FIG. 42 is a view for explaining the processing for detecting corresponding points in the overlapping area by the image combining apparatus.

The corresponding point detector 172b extracts an arbitrary template T having a size of m×m from the area (overlapping area) S indicated by the overlapping area information supplied from the overlapping area predictor 172m in the image 33a read out from the image memory 172g, as shown in, e.g., FIG. 42, and performs calculations based on template matching between the extracted template T and an image in a search area S' of the image 33b adjacent to the image 33a, thereby determining a position corresponding to the template T from the search area S'. Note that the search area S' has the same size as that of the overlapping area S.

Figure 43:
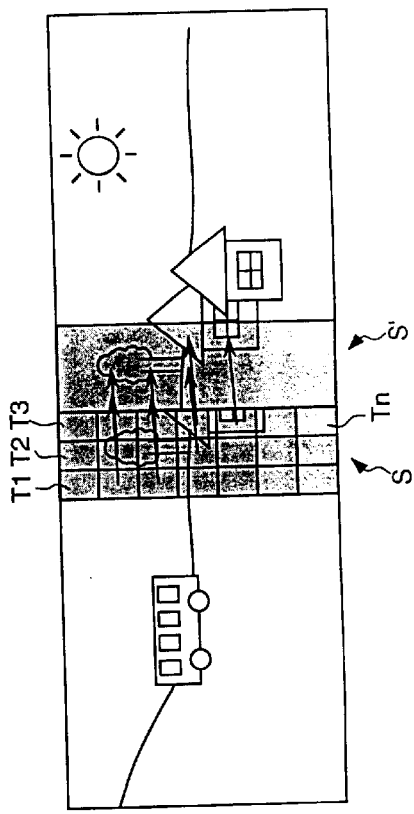
FIG. 43 is a view for explaining the corresponding points obtained by the corresponding point detection.

Accordingly, when the above-mentioned calculations based on template matching are sequentially done for templates $T_1, T_2, \ldots, T_n$ included in the overlapping area S, as shown in FIG. 43, corresponding points indicated by arrows in FIG. 43 are detected.

The corresponding point information detected by the corresponding detector 172b is supplied to the parameter extractor 172n. The parameter extractor 172n extracts parameters used in combining processing on the basis of the corresponding point information supplied from the corresponding point detector 172b, and supplies the parameters to the coordinate transformer 172p.

The coordinate transformer 172p generates a panoramic image by performing coordinate transforming processing such as the affine transformation for a series of image data read out by the controller 172e using the parameters supplied from the parameter extractor 172n, and writes the panoramic image in the combined image memory 172h.

The panoramic image written in the combined image memory 172h is supplied to the display device 173 (FIG. 35) via the I/F unit 172a, and is displayed on the screen by the display device 173.

As described above, since the electronic camera 100 executes combining processing by predicting the overlapping area between adjacent images on the basis of the three-dimensional position and angle component of the apparatus, and detecting the correspondence between the images in the predicted overlapping area, a natural panoramic image with a smoothly connected portion can be obtained.

Since the electronic camera 100 stores the angle component information in the image memory 130 in correspondence with the individual images, the angle component information corresponding to each image can be instantaneously obtained upon detecting the correspondence between the images in the overlapping area. For this reason, as compared to a case wherein the correspondence between images in the overlapping area is detected based on image data alone, correspondence errors can be reduced, and the detection processing time can be remarkably shortened.

In the above-mentioned electronic camera 100, the angle component produced upon movement of the electronic camera 100 is detected by arranging the angular velocity sensor 126a. Alternatively, a translation component produced upon movement of the electronic camera 100 may be detected by arranging, e.g., an acceleration sensor.

The panoramic image obtained by the image combining apparatus 172 is displayed on the screen by the display device 173. Alternatively, the panoramic image may be stored in a storage medium such as a hard disk.

The image combining apparatus 172 comprises the image memory 172g for storing the images to be combined, and the combined image memory 172h for storing a panoramic image. Alternatively, a single image memory may be shared by the images to be combined and the panoramic image.

Also, even when panoramic image sensing is made by tilting the electronic camera, a high-quality panoramic image can be generated by predicting the overlapping area between the images on the basis of the three-dimensional position and angle component of the apparatus as in the image sensing by panning the camera, needless to say.

<Modification of Second Embodiment> . . . Seventh Modification

A modification of the second embodiment, i.e., the seventh modification will be explained below with reference to the accompanying drawings.

Figure 44:
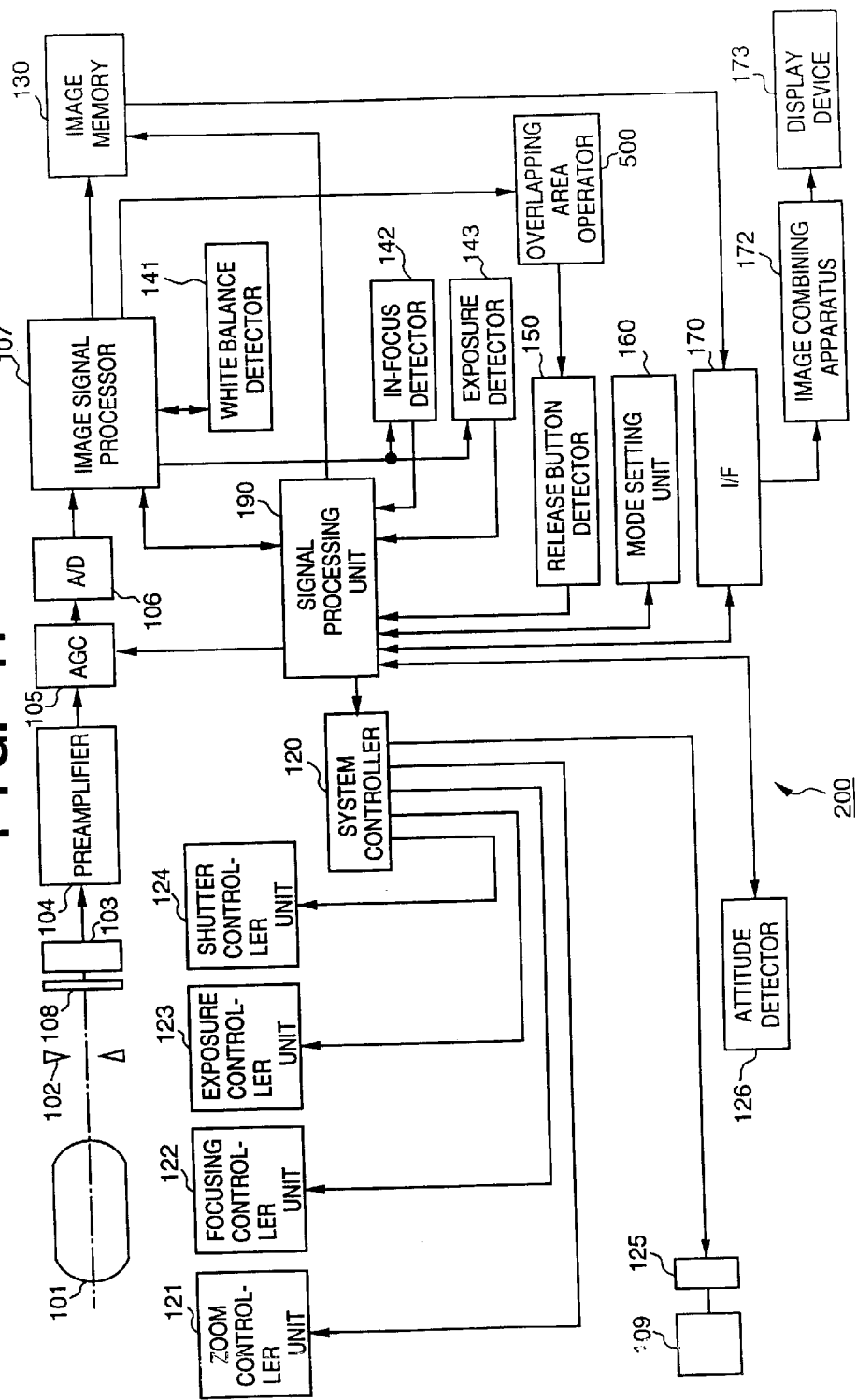
FIG. 44 is a block diagram showing the arrangement of an electronic camera system according to the seventh modification.

An electronic camera system according to the seventh modification is applied to, e.g., an electronic camera system 200 shown in FIG. 44. The electronic camera system (to be simply referred to as an electronic camera hereinafter) 200 comprises an overlapping area operation unit 500 in addition to the components of the electronic camera 100 shown in FIG. 35.

The overlapping area operation unit 500 receives the output from the image signal processor 107, and its output is supplied to the release button detector 150.

Note that the same reference numerals in the electronic camera 200 shown in FIG. 44 denote the units that perform the same operations as in the electronic camera 100 (FIG. 35) of the second embodiment, and a detailed description thereof will be omitted.

In order to sense the images of the landscape 20 at the long-distance position so that they partially overlap each other, and to generate a panoramic image on the basis of image information of overlapping areas 25 and 26, as shown in FIG. 37, the overlapping areas 25 and 26 need be appropriately set upon image sensing.

In view of this problem, in this electronic camera 200, the overlapping area operation unit 500 sequentially detects an overlapping area every time an image is input.

Figure 45:
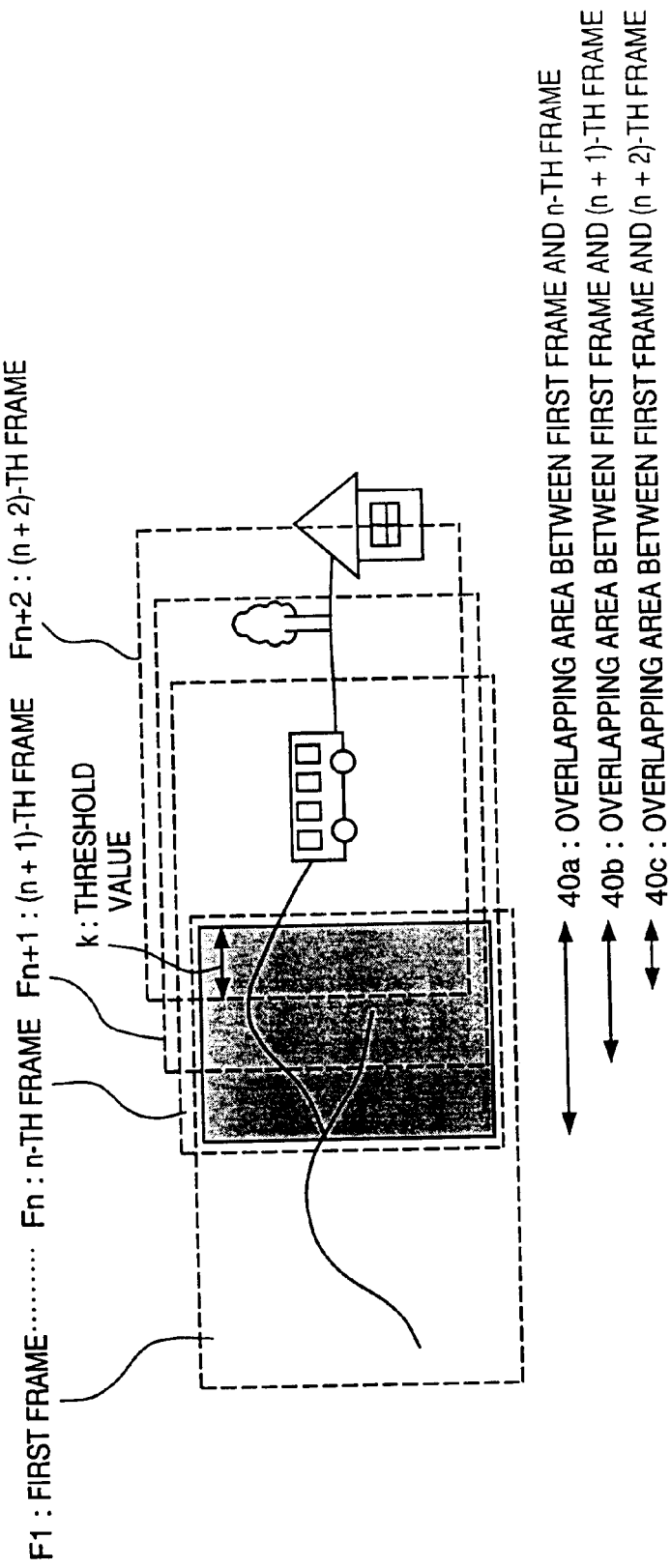
FIG. 45 is a view for explaining the processing for predicting the overlapping area in the electronic camera system.

For example, as shown in FIG. 45, the image signal processor 107 receives a first frame image $F_1$, and thereafter, sequentially receives a second frame image $F_2$, . . . , an n-th frame image $F_n$, an (n+1)-th frame image $F_{n+1}$, and an (n+2)-th frame image $F_{n+2}$ by panning. The individual frame image data subjected to predetermined signal processing in the image signal processor 107 are sequentially supplied to the overlapping area operation unit 500.

Every time the overlapping area operation unit 500 receives image data from the image signal processor 107, it sequentially calculates an overlapping area $40a$ between the first frame image $F_1$ and n-th frame image $F_n$, an overlapping area $40b$ between the first frame image $F_1$ and (n+1)-th frame image $F_{n+1}$, and an overlapping area $40c$ between the first frame image $F_1$ and the (n+2)-th frame image $F_{n+2}$.

More specifically, the overlapping area operation unit 500 obtains the panning angle using the information of the three-dimensional position, angle component, and the like of the electronic camera 200 as in the overlapping area detection processing in the electronic camera 100 shown in FIG. 35, and calculates the overlapping area using equations (11) and (12) above. The overlapping area operation unit 500 sequentially compares the calculated overlapping areas with a predetermined threshold value k, and supplies a shutter control signal to the release button detector 150 when the overlapping area nearly equals the threshold value k.

Accordingly, in FIG. 45, the shutter control signal is supplied to the release button detector 150 when the (n+2)-th frame image $F_{n+2}$ is input.

Upon reception of the shutter control signal from the overlapping area operation unit 500, the release button detector 150 supplies a signal corresponding to a detection signal that indicates that the release button is pressed to its second stroke position, i.e., a detection signal for instructing a shutter operation, to the signal processing unit 190. The signal processing unit 190 supplies a control signal to the shutter controller unit 124 on the basis of the detection signal from the release button detector 150. In response to this signal, the shutter controller unit 124 controls the operation of the shutter 108 to close the shutter.

As described above, the electronic camera 200 sequentially calculates the overlapping areas of sequentially input images as in the overlapping area detection processing in the electronic camera 100 (second embodiment) shown in FIG. 35, and automatically executes the shutter operation when the calculated overlapping area nearly equals the predetermined threshold value. For this reason, a series of images can be obtained to have an appropriate degree of overlapping for generating a panoramic image. Hence, a natural panoramic image with smoothly connected portions can be obtained without failing image sensing.

<Modification of Second Embodiment> . . . Eighth Modification

Another modification of the second embodiment, i.e., the eighth modification, will be explained below with reference to the accompanying drawings.

Figure 46:
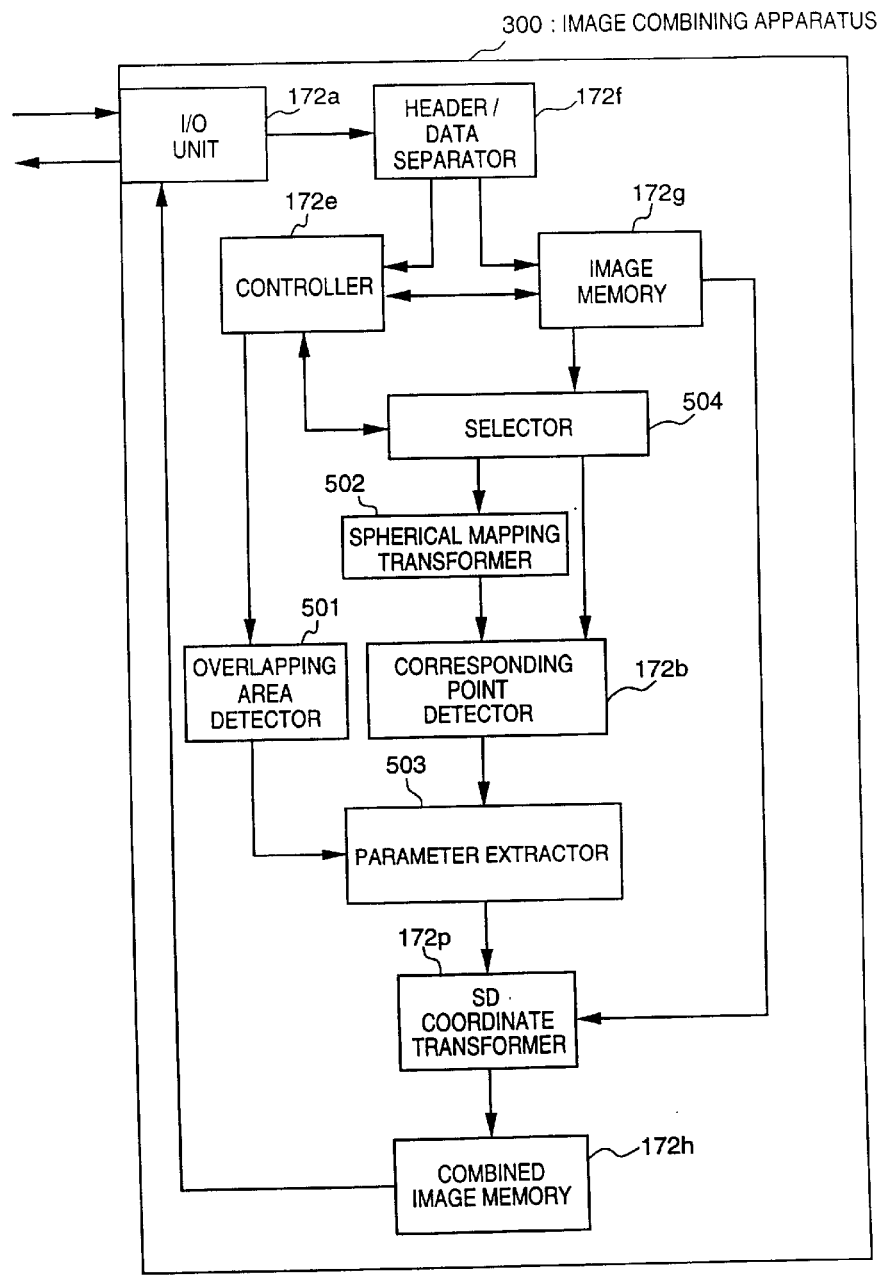
FIG. 46 is a block diagram showing the arrangement of an image combining apparatus in an electronic camera system according to the present invention in the eighth modification.

An electronic camera system according to the eighth modification is applied to, e.g., an electronic camera system comprising an image combining apparatus 300 shown in FIG. 46.

The electronic camera system (to be simply referred to as an electronic camera hereinafter) comprises the image combining apparatus 300 in place of the image combining apparatus 172 (FIG. 40) arranged in the electronic camera 100 shown in FIG. 35. The electronic camera comprises a detector such as an acceleration sensor for detecting a translation component produced upon the above-mentioned movement of the electronic camera in addition to the constituting elements of the electronic camera 100 (FIG. 35), although not shown.

Note that the electronic camera of this modification is substantially the same as the electronic camera 100 shown in FIG. 35 except for the arrangement and operation of the image combining apparatus 300, and a detailed description of the individual units except for the image combining apparatus 300 will be omitted. Also, the same reference numerals in the image combining apparatus 300 denote the units that perform the same operations as in the image combining apparatus 172 shown in FIG. 40, and a detailed description thereof will be omitted.

Figure 47:
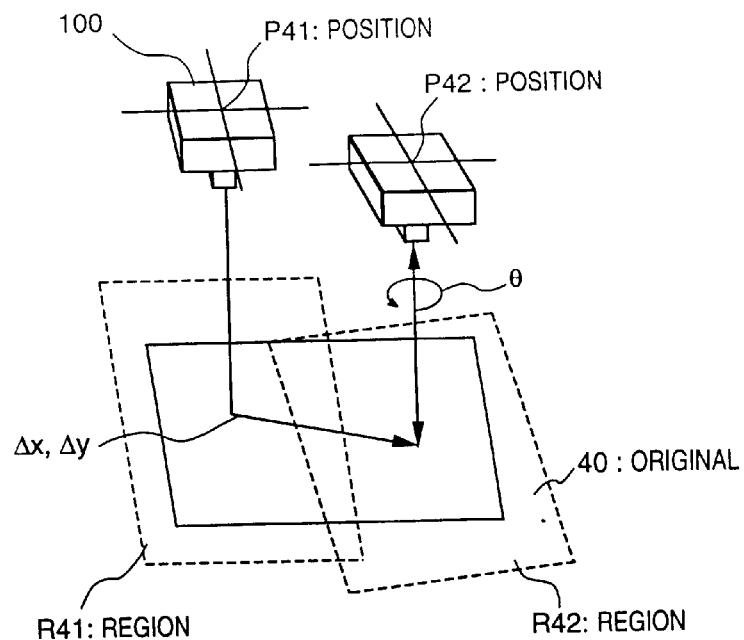
FIG. 47 is a view for explaining the case wherein panoramic image sensing of a short-distance object is done by translation according to the eighth modification.

For example, assume that an original 40 at the short-distance position shown in FIG. 47 is panoramically sensed using the electronic camera 100. A region $R_{41}$ of the original 40 is sensed by setting the electronic camera 100 at a position $P_{41}$, and a region $R_{42}$ of the original 40 is sensed by translating the electronic camera 100 (by vertical and horizontal translation amounts $\Delta x$ and $\Delta y$) from the position $P_{41}$ to a position $P_{42}$.

In contrast to this, when an object at the long-distance position is to be sensed, the image sensing region changes little even when the electronic camera 100 is translated in the vertical and horizontal directions. For this reason, the landscape 20 or the like is sensed by panning the camera, as shown in FIG. 37. Upon image sensing by panning the camera, for example, trapezoidal distortions are produced in the images of the regions $R_{21}$ and $R_{23}$ at the two ends of the landscape 20 with reference to the image of the central region $R_{22}$ of the landscape 20. However, since such image distortion produced upon image sensing by panning the camera is not generally taken into consideration in image combining processing upon image sensing by translating the camera, if the same image combining processing is executed for images obtained by image sensing by panning the camera and for those obtained by image sensing by translating the camera, the image quality may deteriorate.

To solve this problem, in the electronic camera of this modification, the image combining apparatus 300 predicts the overlapping areas of the individual images to be combined, and executes optimal image combining processing for images obtained by image sensing by panning the camera and for those obtained by image sensing by translating the camera.

More specifically, as shown in FIG. 46, the image combining apparatus 300 comprises a selector 504 that receives the outputs from the controller 172e and the image memory 172g, and a spherical mapping transformer 502 that receives the output from the selector 504, in addition to the constituting elements of the image combining apparatus 172 shown in FIG. 40. The corresponding point detector 172b directly receives the output from the selector 504, and also receives the output from the selector 504 via the spherical mapping transformer 502.

The operation of the image combining apparatus 300 will be explained below.

The controller 172e obtains the panning angle by extracting information of the three-dimensional position and angle component included in the additional information supplied from the header/data separator 172f. The controller 172e compares the panning angle with a predetermined threshold value. When the panning angle is larger than the threshold value, the controller 172e determines that images are sensed by panning the camera, as shown in FIG. 37, and supplies a discrimination signal to the selector 504. In this case, when the controller 172e determines that images are sensed by panning the camera, it also supplies focal length information included in the additional information to the selector 504.

Furthermore, the controller 172e supplies information of the focusing position (object distance), focal length, three-dimensional position, and angle component included in the additional information supplied from the header/data separator 172f to an overlapping area predictor 501.

When the discrimination signal from the controller 172e indicates that the images are sensed by panning the camera, the selector 504 reads out a series of image data written in the image memory 172g and supplies them to the spherical mapping transformer 502, and also supplies the focal length information supplied from the controller 172e to the spherical mapping transformer 502.

On the other hand, when it is determined that images are sensed by translating the camera, the selector 504 directly supplies a series of image data read out from the image memory 172g to the corresponding point detector 172b. The spherical mapping transformer 502 performs spherical mapping transforming processing for the image data supplied from the selector 504.

Figure 48:
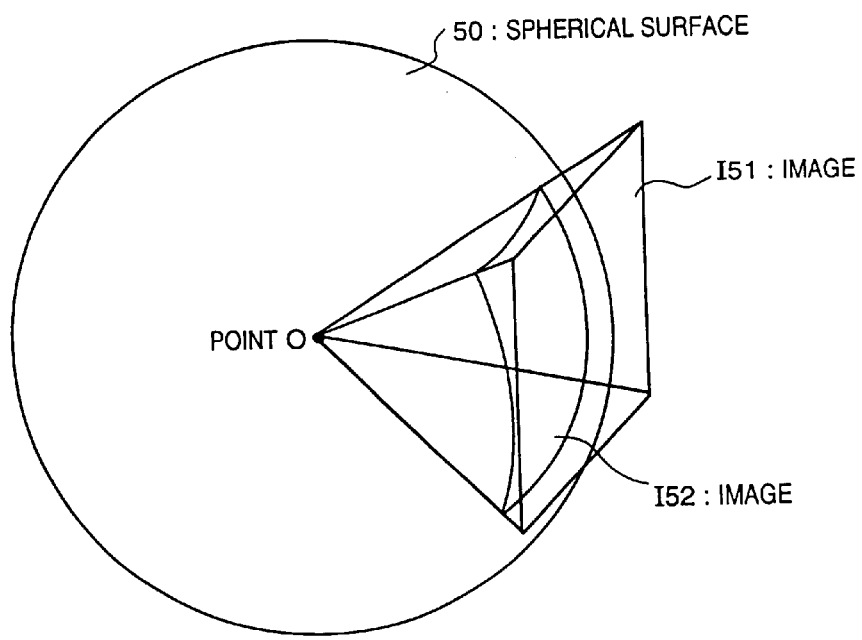
FIG. 48 is a view for explaining a spherical mapped image of the eighth modification.
Figure 49:
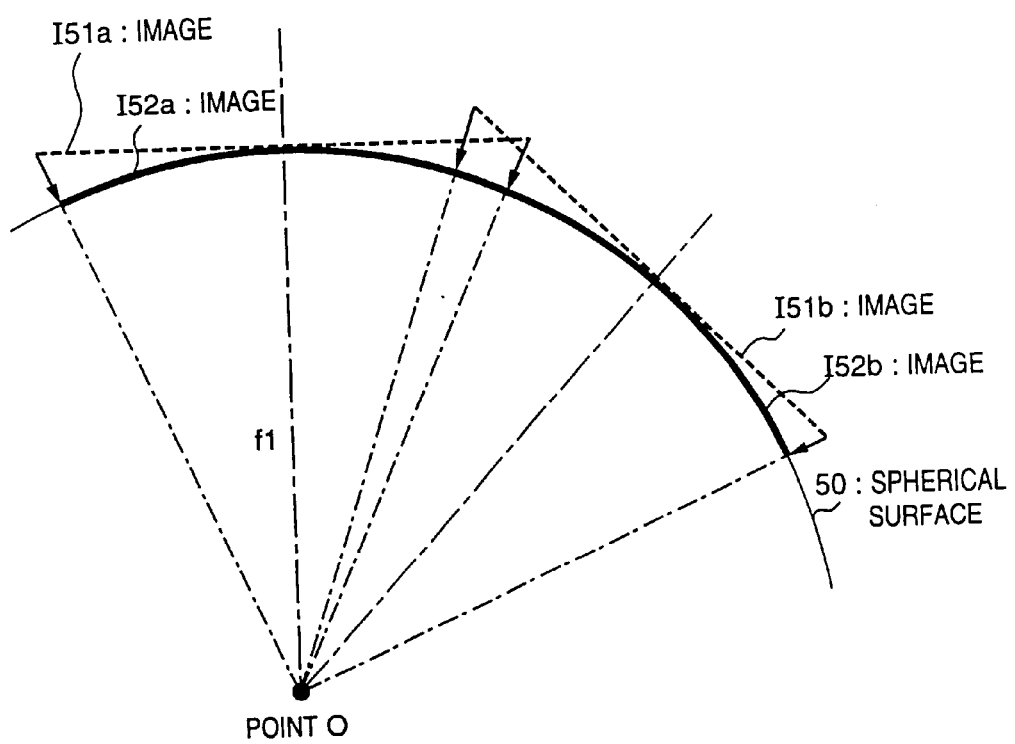
FIG. 49 is a view for explaining the processing for performing spherical mapping transformation by the image combining apparatus.
Figure 50:
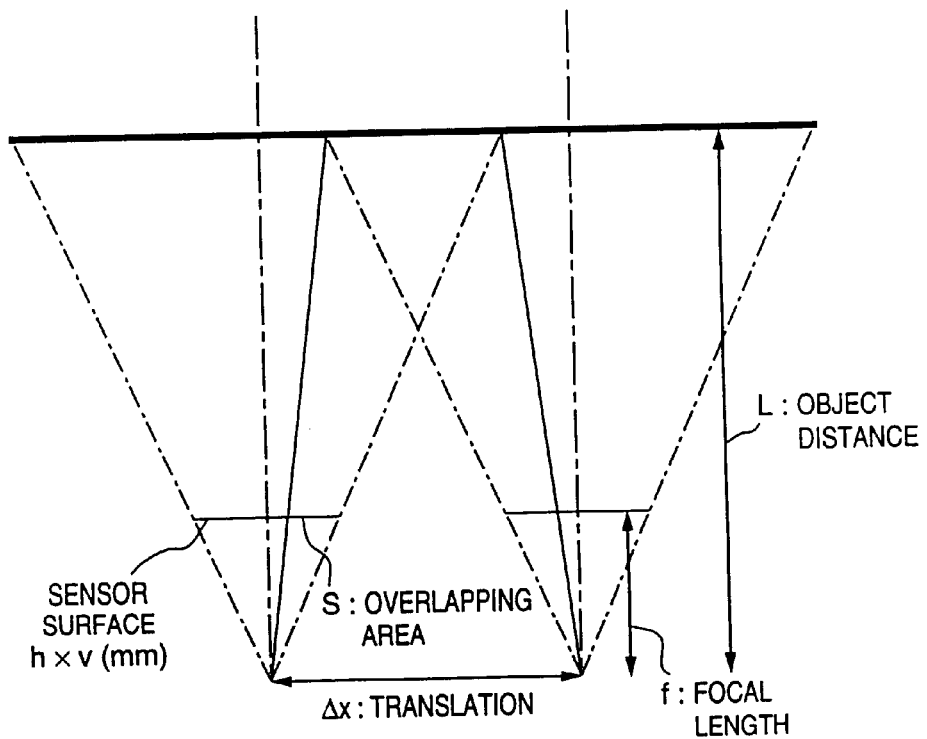
FIG. 50 is a view for explaining the processing for predicting the overlapping area by the image combining apparatus.
Figure 51:
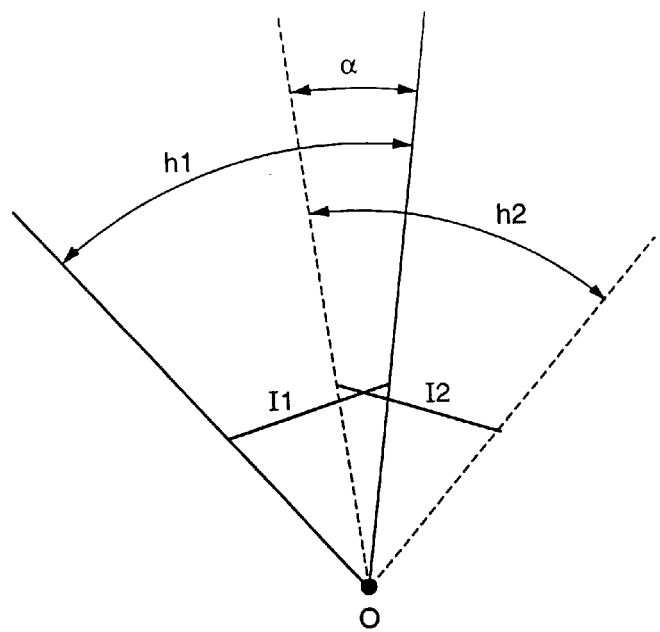
FIG. 51 is a view for explaining the case wherein two images are sensed by panning a conventional electronic camera system in the horizontal direction.
Figure 52:
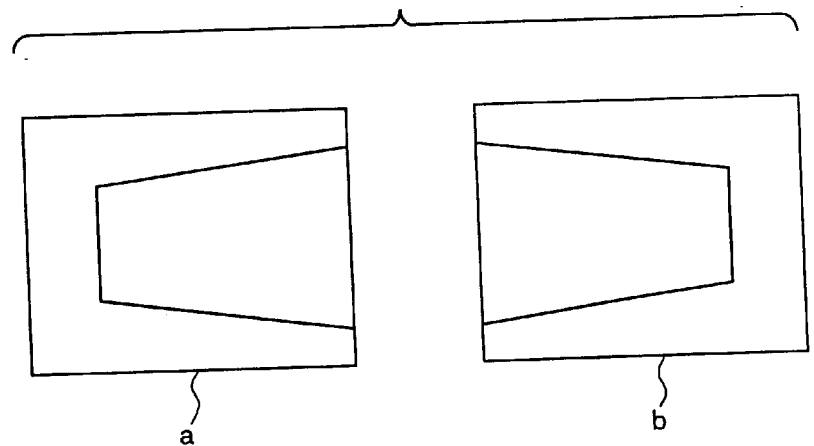
FIG. 52 is a plan view showing the two images obtained by the electronic camera system.
Figure 53:
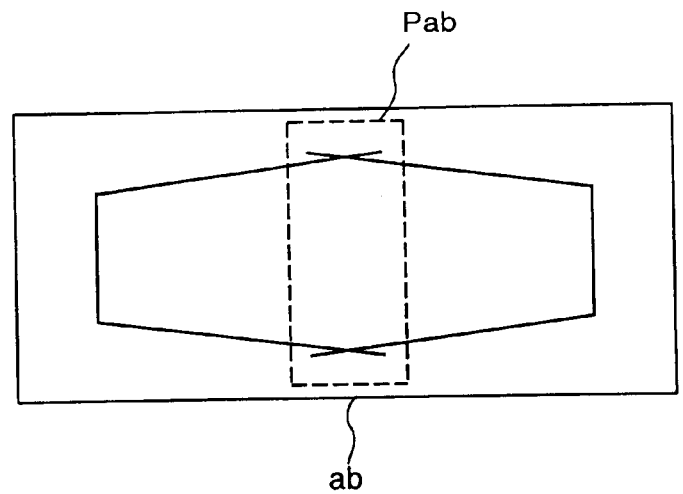
FIG. 53 is a plan view showing a combined image obtained by combining the two images.

More specifically, in the spherical mapping transforming processing, as shown in FIG. 48, a spherical surface 50 that contacts an arbitrary image $I_{51}$ is assumed, and the image $I_{51}$ is projected onto the spherical surface 50 in association with a principal point O of the image sensing lens 101 (FIG. 35), thereby generating a spherical image $I_{52}$. Assuming that the image data to be supplied to the spherical mapping transformer 502 are an image $I_{51a}$ sensed at an arbitrary long-distance position, and an image $I_{51b}$ sensed by panning the camera by an arbitrary angle, as shown in FIG. 49, the spherical mapping transformer 502 generates a spherical image $I_{52a}$ by projecting the image $I_{51a}$ onto the spherical surface 50 to have a focal length $f_I$ using the focal length information supplied from the selector 504, and also generates a spherical image $I_{52b}$ by projecting the image $I_{51b}$ onto the spherical surface 50 to have the focal length $f_I$.

Accordingly, if the focal length $f_I$ remains the same and there is no rotation about the optical axis, the spherical images $I_{52a}$ and $I_{52b}$ obtained by the spherical mapping transformer 502 are contiguous with each other on the spherical surface 50. For this reason, these spherical images can be coordinate-transformed using only the vertical and horizontal translation amounts Δx and Δy shown in FIG. 37 as parameters. However, in practice, since the focal length $f_I$ and the rotation angle θ about the optical axis suffer errors, the coordinate transforming processing is executed using, as the parameters, the vertical and horizontal translation amounts Δx and Δy, the focal length $f_I$, and the rotation angle θ about the optical axis.

In this manner, the coordinate transforming processing upon image sensing by panning can use the same parameters as those used upon image sensing by translation.

As described above, when it is determined that images are sensed by panning the camera, the spherical mapping transformer 502 performs spherical mapping transforming processing, and supplies a series of spherical image data obtained by the processing to the corresponding point detector 172b. On the other hand, when it is determined that images are sensed by translating the camera, a series of image data written in the image memory 172g are directly supplied to the corresponding point detector 172b.

On the other hand, the overlapping area predictor 501 predicts the overlapping areas of the individual images using the information of the object distance, focal length, three-dimensional position, and angle component supplied from the controller 172e.

For example, assuming that the positional relationship between the images can be approximately expressed by the vertical and horizontal translation amounts Δx and Δy, an overlapping area S can be obtained by the following equation (15):

$$S = h - f \cdot \frac{\Delta x}{L} \tag{15}$$

where L is the object distance, Δx is the translation amount, h is the width of the sensor surface, and f is the focal length.

Hence, the overlapping area predictor 501 predicts the overlapping areas by transforming the overlapping area S to a size of image data written in the image memory 172g using equation (15) above, and supplies the predicted overlapping area information to the corresponding point detector 172b.

The corresponding point detector 172b detects corresponding points within the overlapping areas of the individual images supplied from the selector 504 or the spherical mapping transformer 502, and supplies them to the parameter extractor 172n. The parameter extractor 172n extracts parameters for combining processing on the basis of the corresponding point information supplied from the corresponding point detector 172b, and supplies the extracted parameters to the coordinate transformer 172p. The coordinate transformer 172p generates a panoramic image by performing coordinate transforming processing such as affine transformation for a series of image data read out by the controller 172e, and writes the panoramic image in the combined image memory 172h.

As described above, since this electronic camera performs spherical mapping transforming processing for only images which are determined as those obtained by panning the camera, identical image combining processing can be executed independently of the image sensing situation such as image sensing by panning, image sensing by translation, or the like. More specifically, appropriate image combining processing can always be executed independently of the image sensing situation. Therefore, even when images are sensed by panning or translating the camera, a high-quality panoramic image can always be obtained.

Since a panoramic image is generated by predicting the overlapping areas of the individual images on the basis of the information of the three-dimensional position and angle component, the processing time can be shortened, and a panoramic image can be generated with high precision.

Note that the above-mentioned electronic camera comprises the image combining apparatus 300 in place of the image combining apparatus 172 arranged in the electronic camera 100 shown in FIG. 35. Alternatively, the image combining apparatus 300 may be arranged in place of the image combining apparatus 172 arranged in the electronic camera 200 shown in FIG. 44.

<Advantages> . . . Second Embodiment

As described above, according to the image combining apparatus of the second embodiment, the image sensing conditions and moving state information of the apparatus produced upon movement of the apparatus during image sensing, which are held together with sensed images are instantaneously obtained, and the overlapping area between adjacent images is predicted based on such information to obtain the correspondence between the images in the overlapping area. For this reason, as compared to a case wherein the correspondence between images in the overlapping area is to be obtained based on sensed images alone, the processing time can be shortened. Also, detection errors of the correspondence can be remarkably reduced. Accordingly, a high-quality panoramic image can be obtained within a short period of time. That is, a high-performance apparatus can be realized, and a high-quality panoramic image can be easily obtained.

Since the overlapping area between the images to be combined is predicted on the basis of the image sensing condition and the angle component information produced upon movement of the apparatus upon image sensing, a high-quality panoramic image can be obtained within a short period of time.

Since the angle component is obtained by an angle sensor, a high-quality panoramic image can be obtained within a short period of time.

Since the overlapping area between the images to be combined is predicted on the basis of the image sensing condition and the translation component information produced upon movement of the apparatus upon image sensing, a high-quality panoramic image can be obtained within a short period of time.

Since the translation component is obtained by an acceleration sensor, a high-quality panoramic image can be obtained within a short period of time.

Since the overlapping area between the images to be combined is instantaneously predicted on the basis of the position information of the apparatus produced upon movement of the apparatus upon image sensing, a high-quality panoramic image can be obtained within a shorter period of time.

Since the overlapping area between the images to be combined is more instantaneously predicted on the basis of the three-dimensional position information of the apparatus produced upon movement of the apparatus upon image sensing, a high-quality panoramic image can be obtained within a shorter period of time.

Since the overlapping areas between images are sequentially calculated based on the moving state information of the apparatus produced upon movement of the apparatus upon image sensing every time an image is input, and image sensing is automatically done at an appropriate degree of overlapping for combining images, the performance of the apparatus can be further improved. For example, image sensing can be prevented from failing, and the operability can be greatly improved.

Since appropriate image combining processing is executed with respect to the image sensing conditions determined on the basis of the moving state information of the apparatus produced upon movement of the apparatus upon image sensing, a high-quality panoramic image can always be easily obtained.

Since the generated panoramic image is externally output, the panoramic image can be supplied to an externally connected apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image combining apparatus for generating a combined image by combining a plurality of images of an object sensed so that frames partially overlap each other, comprising:

detection means for detecting an image sensing condition upon sensing the plurality of images;

storage means for storing the plurality of images, and the image sensing condition detected by said detection means in correspondence with the images;

image combining means for generating a combined image by combining a series of images stored in said storage means, said image combining means having a plurality of combining means corresponding to individual image sensing conditions; and control means for controlling said image combining means to select one of said plurality of combining means and to combine the series of images into a single image on the basis of an image sensing condition corresponding to the series of images, wherein said image combining means comprises:

corresponding point detection means for detecting a set of corresponding points in an overlapping area of the series of images;

coordinate transforming means for generating the combined image by performing coordinate transforming processing for the series of images; and parameter generation means for generating an image sensing parameter on the basis of the set of corresponding points detected by said corresponding point detection means, wherein said coordinate transforming means performs the coordinate transforming processing using the image sensing parameter generated by said parameter generation means.

2. The apparatus according to claim 1, wherein said detection means detects focal point position information upon image sensing as the image sensing condition, said image combining means comprises:

first combining means for combining a series of images obtained by short-distance image sensing; and second combining means for combining a series of images obtained by long-distance image sensing, and said control means discriminates based on the focal point position information corresponding to the images if the series of images are obtained by short-or-long-distance image sensing, and selects one of said first and second combining means on the basis of the discrimination result.

3. The apparatus according to claim 1, wherein said image combining means comprises conversion means for converting a pixel value in an overlapping area between the images on the basis of the image sensing condition corresponding to the images.

4. The apparatus according to claim 3, wherein said detection means detects exposure information upon image sensing as the image sensing condition, and said conversion means corrects a density level of the overlapping area of the images on the basis of the exposure information corresponding to the images.

5. The apparatus according to claim 1, wherein said image combining means comprises spherical projection transforming means for generating a spherical projection image by projecting and transforming images onto a spherical surface on the basis of the image sensing condition corresponding to the images, and combines a plurality of spherical projection images obtained by said spherical projection transforming means.

6. The apparatus according to claim 5, wherein said spherical projection transforming means projects and transforms the images onto the spherical surface having a focal point position upon image sensing as a center.

7. The apparatus according to claim 5, wherein said image combining means comprises plane projection transforming means for generating a plane projection combined image by projecting and transforming a combined image obtained by combining the plurality of spherical projection images obtained by said spherical projection transforming means onto a plane.

8. The apparatus according to claim 7, wherein said image combining means comprises addition means for adding, to the image projection surface type information indicating whether the image to be processed is the spherical projection image or the plane projection combined image.

9. The apparatus according to claim 7, wherein said image combining means comprises output means for selectively outputting one of a combined image and the plane projection combined image in correspondence with a field of view of the combined image obtained by combining the plurality of spherical projection images obtained by said spherical projection transforming means.

10. The apparatus according to claim 1, further comprising:
    means for, when the series of images are sensed by a plurality of image sensing means, outputting a control signal to the plurality of image sensing means to control directions of optical axes of the plurality of image sensing means on the basis of the image sensing condition detected by said detection means.

11. An image combining apparatus for generating a single image by combining a plurality of sensed images, comprising:
    means for setting a panoramic image sensing mode;
    means for detecting an image sensing angle;
    means for holding the image sensing angle information together with a plurality of sensed images obtained in the panoramic image sensing mode; and
    means for combining the plurality of sensed images,
    wherein a combining method is adaptively selected on the basis of the image sensing angle information upon combining the plurality of sensed images.

12. An image combining apparatus for generating a single image by combining a plurality of sensed images, comprising:
    means for setting a panoramic image sensing mode;
    means for detecting an image sensing position;
    means for holding the image sensing position information together with a plurality of sensed images obtained in the panoramic image sensing mode; and
    means for combining the plurality of sensed images,
    wherein a combining method is adaptively selected on the basis of the image sensing position information upon combining the plurality of sensed images.

13. An image combining method for generating a combined image by combining a plurality of images of an object sensed so that frames partially overlap each other, comprising the steps of:
    a detection step of detecting an image sensing condition upon sensing a plurality of images;
    a storing step of storing the plurality of images, and information relative to a respective image sensing condition associated with each sensed image detected by said detection step;
    an image combining step of generating a combined image by combining a plurality of images stored in said storing step, by using a plurality of combining algorithms corresponding to individual image sensing conditions; and
    a control step of controlling said image combining step to select the most suitable one of said plurality of combining algorithms on the basis of a respective image sensing condition corresponding to each stored image to combine the plurality of images into a single image
    wherein said image combining step includes:
    corresponding point detection steps of detecting a set of corresponding points in an overlapping area of the series of images;
    coordinate transforming step of generating the combined image by performing coordinate transforming processing for the series of images; and
    parameter generation step of generating an image sensing parameter on the basis of the set of corresponding points detected in said corresponding point detection step, wherein said coordinate transforming step performs the coordinate transforming processing using the image sensing parameter generated in said parameter generation step.

14. An image combining method for generating a single image by combining a plurality of sensed images, comprising the steps of:
    a setting step of a panoramic image sensing mode;
    a detection step of detecting an image sensing angle;
    a storing step of storing the image sensing angle information together with a plurality of sensed images obtained in the panoramic image sensing mode; and
    an image combining step of combining the plurality of sensed images by using the most suitable combining method adaptively selected from a plurality of combining methods on the basis of the image sensing angle information upon combining the plurality of sensed images.

15. The method according to claim 13, wherein said detection step detects focal point position information upon image sensing as the image sensing condition, said image combining step comprises:
    a first combining step of combining a series of images obtained by short-distance image sensing; and
    a second combining step of combining a series of images obtained by long-distance image sensing, and said control step discriminates the focal point position information corresponding to the images if the series of images are obtained by short- or long-distance image sensing, and selects one of said first and second combining step on the basis of the discrimination result.

16. The method according to claim 13, wherein said image combining step comprises converting a pixel value in an overlapping area between the images on the basis of the image sensing condition corresponding to the images.

17. The method according to claim 16, wherein said detection step detects exposure information upon image sensing as the image sensing condition, and
    said conversion step corrects a density level of the overlapping area of the images on the basis of the exposure information corresponding to the images.

18. The method according to claim 13, wherein said image combining step includes a spherical projection transforming step of generating a spherical projection image by projecting and transforming images onto a spherical surface on the basis of the image sensing condition corresponding to the images, and combining a plurality of spherical projection images obtained by said spherical projection transforming step.

19. The method according to claim 18, wherein said spherical projection transforming step projects and transforms the images onto the spherical surface having a focal point position upon image sensing as a center.

20. The method according to claim 18, wherein said image combining step includes a plane projection transforming step of generating a plane projection combined image by projecting and transforming a combined image obtained by combining the plurality of spherical projection images obtained by said spherical projection transforming step onto a plane.

21. The method according to claim 20, wherein said image combining step includes adding, to the image, projection surface type information indicating whether the image to be processed is the spherical projection image or the plane projection combined image.

22. The method according to claim 20, wherein said image combining step includes selectively outputting one of a combined image and the plane projection combined image in correspondence with a field of view of the combined image obtained by combining the plurality of spherical projection images obtained by said spherical projection transforming step.

23. The method according to claim 14, wherein said image combining step comprises:

a corresponding point detection step of detecting a set of corresponding points in an overlapping area of the series of images;

a coordinate transforming step of generating the combined image by performing coordinate transforming processing for the series of images; and a parameter generation step of generating an image sensing parameter on the basis of the set of corresponding points detected in said corresponding point detection step, and said coordinate transforming step performs the coordinate transforming processing using the image sensing parameter generated in said parameter generation step.

24. The method according to claim 14, wherein said detection step detects focal point position information upon image sensing as the image sensing condition, said image combining step comprises:

a first combining step of combining a series of images obtained by short-distance image sensing; and a second combining step of combining a series of images obtained by long-distance image sensing and discriminating the focal point position information corresponding to the images if the series of images are obtained by short- or long-distance image sensing, and selecting one of said first and second combining steps on the basis of the discrimination results.

25. The method according to claim 14, wherein said image combining step comprises conversion step of converting a pixel value in an overlapping area between the images on the basis of the image sensing condition corresponding to the images.

26. The method according to claim 25, wherein said detection step detects exposure information upon image sensing as the image sensing condition, and said conversion step corrects a density level of the overlapping area of the images on the basis of the exposure information corresponding to the images.

* * * * *